(12) United States Patent
Ciampa et al.

(10) Patent No.: US 9,126,669 B2
(45) Date of Patent: Sep. 8, 2015

(54) LIGHTER-THAN-AIR SYSTEMS, METHODS, AND KITS FOR OBTAINING AERIAL IMAGES

(71) Applicants: John Ciampa, Coral Gables, FL (US); Bertrand Dano, Coral Gables, FL (US)

(72) Inventors: John Ciampa, Coral Gables, FL (US); Bertrand Dano, Coral Gables, FL (US)

(73) Assignee: John Ciampa, Coral Gables, FL (US)

( * ) Notice: Subject to any disclaimer, the term of this patent is extended or adjusted under 35 U.S.C. 154(b) by 95 days.

(21) Appl. No.: 14/104,059

(22) Filed: Dec. 12, 2013

(65) Prior Publication Data
US 2014/0203138 A1    Jul. 24, 2014

Related U.S. Application Data

(63) Continuation of application No. 13/942,964, filed on Jul. 16, 2013, now Pat. No. 8,622,338, which is a continuation of application No. 13/717,881, filed on Dec. 18, 2012, now Pat. No. 8,505,847, which is a continuation-in-part of application No. 13/405,562, filed on Feb. 27, 2012, now abandoned.

(60) Provisional application No. 61/448,145, filed on Mar. 1, 2011, provisional application No. 61/566,776, filed on Dec. 5, 2011.

(51) Int. Cl.
| | |
|---|---|
| *B64B 1/06* | (2006.01) |
| *B64B 1/02* | (2006.01) |
| *B64B 1/62* | (2006.01) |
| *B64B 1/08* | (2006.01) |
| *B64C 39/02* | (2006.01) |
| *B64D 47/08* | (2006.01) |
| *G05D 1/00* | (2006.01) |

(52) U.S. Cl.
CPC ... *B64B 1/02* (2013.01); *B64B 1/08* (2013.01); *B64B 1/62* (2013.01); *B64C 39/024* (2013.01); *B64D 47/08* (2013.01); *G05D 1/0094* (2013.01); *B64C 2201/022* (2013.01); *B64C 2201/101* (2013.01); *B64C 2201/127* (2013.01); *B64C 2201/146* (2013.01)

(58) Field of Classification Search
CPC ............ B64D 47/08; B64B 1/58; B64B 1/62; B64B 1/64; B64B 2201/022; B64B 2201/123; B64B 2201/127; G05D 1/0094
See application file for complete search history.

(56) References Cited

U.S. PATENT DOCUMENTS

| | | | |
|---|---|---|---|
| 367,610 A | 8/1887 | Fairman | |
| 578,980 A | 3/1897 | Eddy | |

(Continued)

FOREIGN PATENT DOCUMENTS

GB    2027403 A    2/1980

OTHER PUBLICATIONS

Bode Technical Services, "Crane Cable Reel, Cable Reel, LSI Mini Cable Reel", http://www.bodetechnicalservices.com/parts/lsi/mini-cable-reel, May 30, 2012.

(Continued)

*Primary Examiner* — Philip J Bonzell
(74) *Attorney, Agent, or Firm* — Buchanan Nipper

(57) ABSTRACT

Lighter-than-air systems, methods, and kits for obtaining aerial images are described. For example, various methods for determining planned ascent, drift, and/or descent of a lighter-than-air system are described. In addition, various structural arrangements of lighter-than-air systems for accomplishing planned ascent, drift, and/or descent and obtaining aerial images are described.

20 Claims, 26 Drawing Sheets

(56) References Cited

U.S. PATENT DOCUMENTS

| | | |
|---|---|---|
| 894,348 A | 7/1908 | Seele |
| 1,301,967 A | 4/1919 | Parks |
| 1,549,570 A | 8/1925 | Boothby |
| 1,576,859 A | 3/1926 | Sieck, Jr. |
| 1,577,756 A | 3/1926 | Reagan |
| 1,682,405 A | 8/1928 | Naatz |
| 1,729,020 A | 9/1929 | Szymanski |
| 1,802,586 A | 4/1931 | Stokes |
| 1,857,963 A | 5/1932 | Lehmann |
| 2,428,656 A | 10/1947 | Elliott et al. |
| 3,079,106 A | 2/1963 | Whitnah |
| 3,443,776 A | 5/1969 | Moore |
| 3,485,151 A | 12/1969 | Taylor |
| 3,503,570 A | 3/1970 | Coshow |
| 3,917,199 A | 11/1975 | Dewitt |
| 3,971,533 A | 7/1976 | Slater |
| 4,102,519 A | 7/1978 | Crosby, Jr. |
| 4,204,656 A | 5/1980 | Seward |
| 4,238,095 A | 12/1980 | Slater |
| 4,253,165 A | 2/1981 | Christiansen |
| 4,272,042 A | 6/1981 | Slater |
| 4,382,336 A | 5/1983 | Call |
| 4,620,371 A | 11/1986 | Murakami et al. |
| 4,635,136 A | 1/1987 | Ciampa et al. |
| 4,669,843 A | 6/1987 | Bozzolato |
| 4,697,758 A | 10/1987 | Hirose et al. |
| 4,711,416 A | 12/1987 | Regipa |
| 4,752,791 A | 6/1988 | Allred |
| 4,773,617 A | 9/1988 | McCampbell |
| 4,825,232 A | 4/1989 | Howdle |
| 4,891,029 A | 1/1990 | Hutchinson |
| 5,034,759 A | 7/1991 | Watson |
| 5,071,090 A | 12/1991 | Takahashi et al. |
| 5,131,165 A | 7/1992 | Benson |
| 5,247,356 A | 9/1993 | Ciampa |
| 5,348,254 A | 9/1994 | Nakada |
| 5,537,928 A | 7/1996 | Schneider |
| 5,752,088 A | 5/1998 | Desselle |
| 5,755,402 A | 5/1998 | Henry |
| 6,253,461 B1 | 7/2001 | Fischer |
| 6,434,122 B2 | 8/2002 | Barabash et al. |
| 6,578,797 B2 | 6/2003 | Fischer |
| 6,726,120 B2 | 4/2004 | Schaffter et al. |
| 6,739,549 B2 | 5/2004 | Senepart |
| 6,805,319 B2 | 10/2004 | Senepart |
| 6,808,144 B1 | 10/2004 | Nicolai et al. |
| 7,046,934 B2 | 5/2006 | Badesha et al. |
| 7,055,778 B2 | 6/2006 | Eberle et al. |
| 7,156,342 B2 | 1/2007 | Heaven, Jr. et al. |
| 7,236,885 B2 | 6/2007 | MacFarlane et al. |
| 7,274,868 B2 | 9/2007 | Segal et al. |
| 7,341,224 B1 | 3/2008 | Osann, Jr. |
| 7,350,746 B2 | 4/2008 | Gili et al. |
| 7,356,390 B2 | 4/2008 | Knoblach et al. |
| 7,424,133 B2 | 9/2008 | Schultz et al. |
| 7,469,857 B2 | 12/2008 | Voss |
| 7,500,637 B2 | 3/2009 | Marimon et al. |
| 7,510,142 B2 | 3/2009 | Johnson |
| 7,568,656 B2 | 8/2009 | Handley |
| 7,734,245 B2 | 6/2010 | Ravela et al. |
| 7,787,659 B2 | 8/2010 | Schultz et al. |
| 7,873,238 B2 | 1/2011 | Schultz et al. |
| 8,033,045 B2 | 10/2011 | Pekin |
| 2005/0224638 A1 | 10/2005 | Goodey |
| 2005/0247809 A1 | 11/2005 | Terauchi et al. |
| 2005/0258305 A1 | 11/2005 | Piers et al. |
| 2006/0000945 A1 | 1/2006 | Voss |
| 2008/0289242 A1 | 11/2008 | Cecil |
| 2008/0300821 A1 | 12/2008 | Frank et al. |
| 2009/0114768 A1 | 5/2009 | Voorhees |
| 2009/0216444 A1 | 8/2009 | Crowell |
| 2010/0040354 A1 | 2/2010 | Becerra |
| 2010/0201970 A1 | 8/2010 | Pellen |
| 2011/0197881 A1 | 8/2011 | Abulrassoul et al. |

OTHER PUBLICATIONS

W.W. Moriarty, :Tether corrections for Tethered Balloon Wind Measurement, Research Note, Mar. 26, 1992.

International Preliminary Report on Patentability for International Application No. PCT/2012/026716, Sep. 3, 2013, p. 1-6.

International Search Report and Written Opinion, PCT/US2012/026716, dated Oct. 30, 2012.

KCF Technologies, "Smarth Tether", http://www.smarttethercom/, May 30, 2012.

Shanghai Longsone Electronic Tech Ltd, "Length/angle sensor (0-60m)", http://www.longsone.com/html_products/Lengthangle-sensor-sensor(-cable-reel-sensor)-41.html, May 30, 2012.

Office Action dated May 8, 2013, U.S. Appl. No. 13/405,562.

LIGHTER-THAN-AIR SYSTEMS, METHODS, AND KITS FOR OBTAINING AERIAL IMAGES

PRIORITY/CROSS-REFERENCE TO RELATED APPLICATIONS

This application is a continuation of co-pending U.S. Nonprovisional application Ser. No. 13/942,964, filed Jul. 16, 2013, which is a continuation of U.S. Nonprovisional application Ser. No. 13/717,881, now U.S. Pat. No. 8,505,847, which was filed on Dec. 18, 2012, which is a continuation-in-part of U.S. Nonprovisional application Ser. No. 13/405, 562, filed on Feb. 27, 2012, and which claims the benefit of U.S. Provisional Application No. 61/448,145 filed on Mar. 1, 2011, and U.S. Provisional Application No. 61/566,776 filed on Dec. 5, 2011. The disclosure of each of these applications is hereby incorporated by reference into this disclosure in its entirety.

TECHNICAL FIELD

The invention relates generally to lighter-than-air systems, methods, and kits. More particularly, the invention relates to lighter-than-air systems, methods, and kits for obtaining one or more aerial images.

BACKGROUND

Satellites and heavier-than-air aircraft, both manned and unmanned, have been used for many years to perform tasks associated with gathering aerial images. However, these techniques generally obtain the images from relatively high altitudes, which presents several disadvantages such as precluding optimal look angles for the imaging device and introducing the potential for cloud cover to occlude the imaging device. In addition, these techniques generally include on-board continuous propulsion and steering systems, which increase the weight of the overall system, and increase the costs in obtaining the images. Furthermore, the continuous propulsion and steering systems tend to interfere with the quality of the images collected.

In addition to satellites and heavier-than-air aircraft, lighter-than-air aircraft (e.g., balloons, airships, dirigibles) have been used to obtain aerial images. However, these devices have disadvantages associated with the use of on-board propulsion systems as the sole means of lateral movement and being able to maintain a particular altitude during flight to obtain images at a desired look angle.

Therefore, there is a need for lighter-than-air systems, methods, and kits for gathering aerial images.

SUMMARY OF THE DISCLOSURE

Various lighter-than-air systems for obtaining aerial images are described herein. For example, various structural arrangements of lighter-than-air systems having one or more balloons defining one or more chambers adapted to contain a volume of fluid are described herein. In addition, various structural arrangements of an instrument case containing one or more sensing devices, location devices, computing devices, communication devices, storage devices, and/or energy storage devices are described herein. Furthermore, various structural arrangements of a thruster are described herein.

A first exemplary lighter-than-air system comprises an airship and a thruster. The airship comprises a first balloon and a second balloon. The first balloon is movable between a deflated configuration and an inflated configuration and comprises a wall defining a first balloon chamber. The second balloon is disposed within the first balloon chamber. The second balloon is movable between a deflated configuration and an inflated configuration and comprises a wall defining a second balloon chamber. The thruster is attached to the airship and comprises a thruster body and a container. The thruster body defines a cavity, a first passageway, and a second passageway. The container is attached to the thruster body and comprises a wall that defines a container chamber. The cavity is in communication with the first balloon chamber. The first passageway is in communication with the second balloon chamber. The second passageway is in communication with the container chamber.

A second exemplary lighter-than-air system comprises an airship and a thruster. The airship comprises a first balloon and a second balloon. The first balloon is movable between a deflated configuration and an inflated configuration and comprises a wall defining a first balloon chamber. The second balloon is disposed within the first balloon chamber. The second balloon is movable between a deflated configuration and an inflated configuration and comprises a wall defining a second balloon chamber. The thruster is attached to the airship and comprises a thruster body, a container, and a first valve. The thruster body defines a cavity, a first passageway, and a second passageway. The container is attached to the thruster body and comprises a wall that defines a container chamber. The cavity is in communication with the first balloon chamber. The first passageway is in communication with the second balloon chamber. The second passageway is in communication with the container chamber. The first valve is in communication with the first passageway and is configured to have a first configuration and a second configuration. In the first configuration, the first valve holds fluid within the second balloon chamber. In the second configuration, the first valve releases fluid held within the second balloon chamber.

A third exemplary lighter-than-air system comprises an airship and a thruster. The airship comprises a first balloon and a second balloon. The first balloon is movable between a deflated configuration and an inflated configuration and comprises a wall defining a first balloon chamber. The second balloon is disposed within the first balloon chamber. The second balloon is movable between a deflated configuration and an inflated configuration and comprises a wall defining a second balloon chamber. The thruster is attached to the airship and comprises a thruster body, a container, a first valve, and a second valve. The thruster body defines a cavity, a first passageway, and a second passageway. The container is attached to the thruster body and comprises a wall that defines a container chamber. The cavity is in communication with the first balloon chamber. The first passageway is in communication with the second balloon chamber. The second passageway is in communication with the container chamber. The first valve is in communication with the first passageway and is configured to have a first configuration and a second configuration. In the first configuration, the first valve holds fluid within the second balloon chamber. In the second configuration, the first valve releases fluid held within the second balloon chamber. The second valve is in communication with the second passageway and is configured to have a first configuration and a second configuration. In the first configuration, the second valve holds fluid within the container chamber. In the second configuration, the second valve releases fluid held within the container chamber.

Additionally, various methods for obtaining aerial images using one or more lighter-than-air systems are described herein. For example, various methods for preparing one or more lighter-than-air systems and at least determining a launch site, and/or determining a landing site are described herein.

Kits useful in obtaining one or more aerial images are also described.

Additional understanding of the systems, methods, and kits contemplated and/or claimed by the inventors can be gained by reviewing the detailed description of exemplary systems, methods, and kits presented below, and the referenced drawings.

DETAILED DESCRIPTION

The following description and the referenced drawings provide illustrative examples of that which the inventors regard as their invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The use of "e.g.," "etc.," "for instance," "in example," and "or" and grammatically related terms indicates non-exclusive alternatives without limitation, unless otherwise noted. The use of "including" and grammatically related terms means "including, but not limited to," unless otherwise noted. The use of the articles "a," "an," and "the" are meant to be interpreted as referring to the singular as well as the plural, unless the context clearly dictates otherwise. The use of "exemplary" means an example of and is not intended to convey a meaning of an ideal or preferred embodiment. The use of "fluid" refers to any lighter-than-air fluid, and/or gas, including, but not limited to, helium, or hydrogen, unless the context clearly dictates otherwise. The use of "lighter-than-air aircraft" refers to an aircraft at least partially, or entirely, supported by lighter-than-air fluids, unless the context clearly dictates otherwise. The use of "lighter-than-air system" refers to an aircraft that can be at least partially, or entirely, supported by one or more lighter-than-air fluids and that can include one or more devices that can be used individually or in combination with other devices to obtain one or more images, unless the context clearly dictates otherwise. The use of "attached" refers to the fixed, releasable, or integrated association of two or more elements and/or devices, unless the context clearly dictates otherwise. Thus, the term "attached" includes releasably attaching or fixedly attaching two or more elements. The use of "aerial images" and "images" refers to images obtained at any altitude and includes a singular image or multiple images, unless the context clearly dictates otherwise. The use of "ground control software" means any configuration and/or structural arrangement of one or more devices and/or components used to remotely control, receive information, send information, and/or communicate with a lighter-than-air system and/or aircraft, unless the context clearly dictates otherwise. The use of "balloon" refers to any material that is capable of forming a chamber and moving between a first deflated configuration and a second inflated configuration. The use of "tubular" refers to any structure that defines a passageway and is not intended to require any structural arrangement or dimension, unless the context clearly dictates otherwise.

Figure 1:
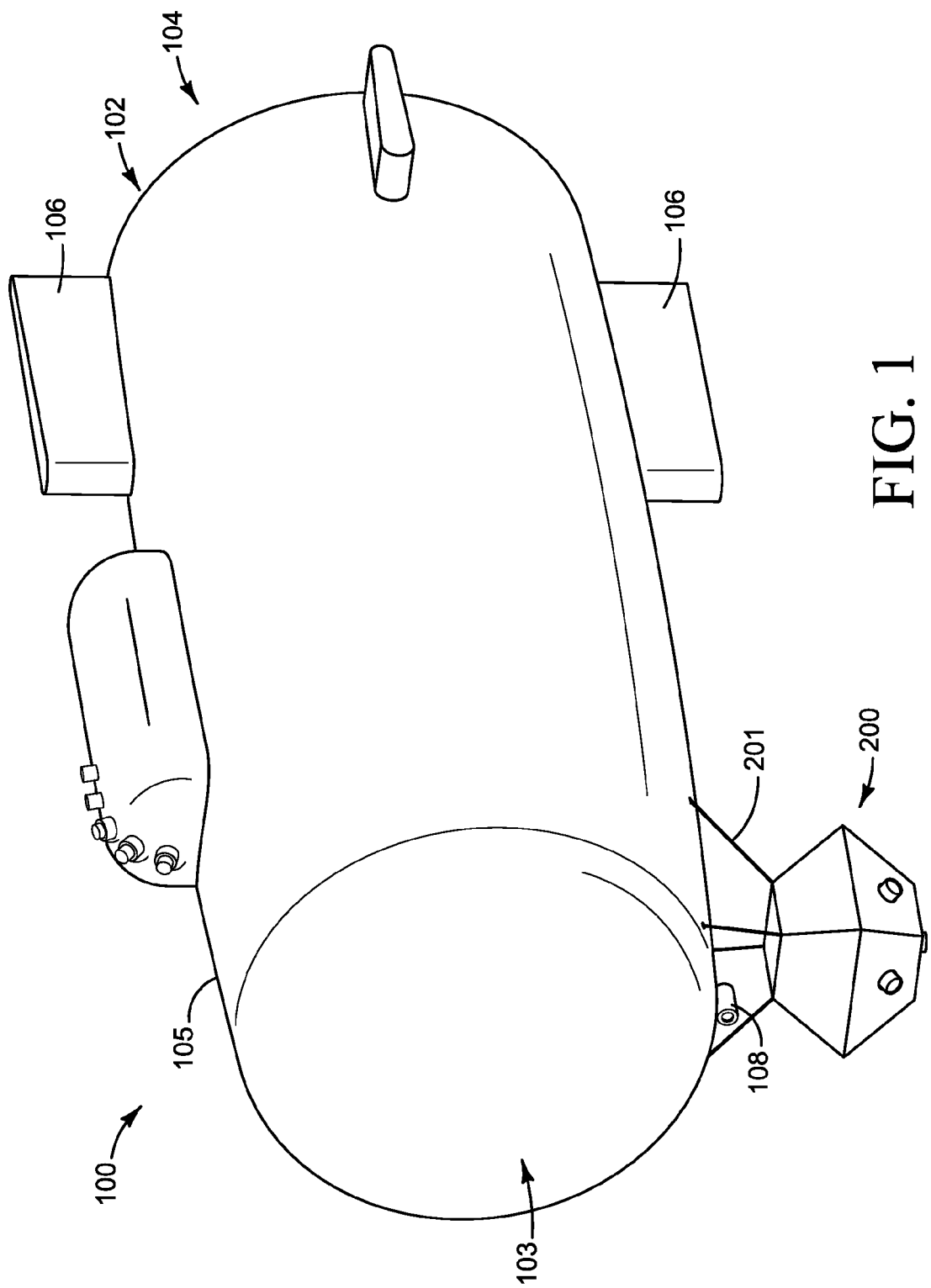
FIG. 1 is a perspective view of an exemplary lighter-than-air system.
Figure 2:
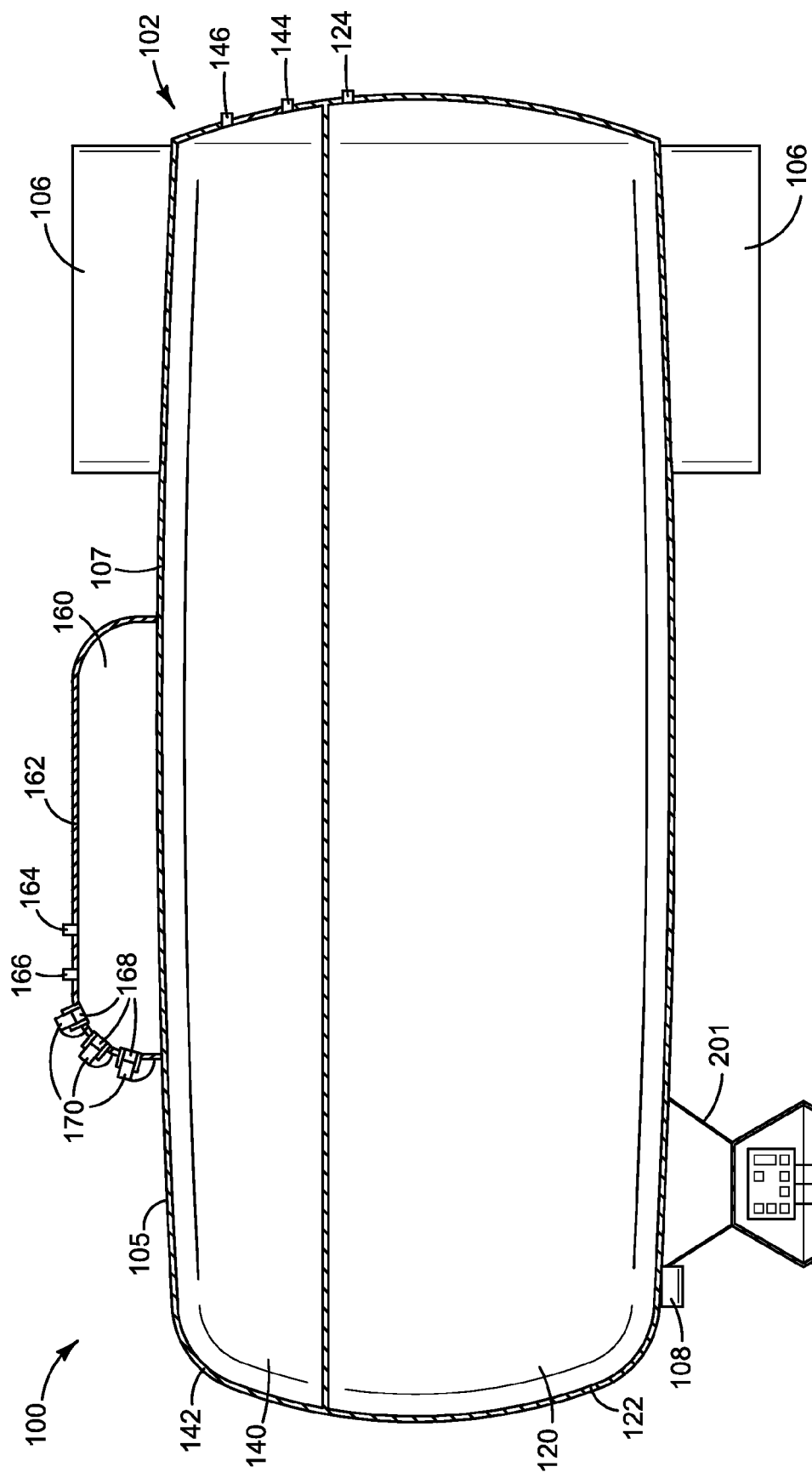
FIG. 2 is a sectional view of the lighter-than-air system illustrated in FIG. 1.

FIGS. 1 and 2 illustrate an exemplary lighter-than-air system 100 for obtaining one or more aerial images (e.g., aerial photography system). The system 100 comprises an airship 102 and an instrument case 200 attached to the airship 102. The airship 102 comprises a first end 103, a second end 104, a balloon 105, and one or more fins 106. The balloon 105 comprises a wall 107 defining a reserve chamber 120, cruise chamber 140, and a spill chamber 160. Each of the reserve chamber 120, cruise chamber 140, and spill chamber 160 is an independent chamber, separate from, and not in fluid communication, with the other chambers. The one or more fins 106 can be formed from the wall 107 of the balloon 105, or be separate elements attached to the wall 107 of the balloon 105.

The one or more fins 106 are illustrated as attached to the second end 104 of the balloon 105, however, the fins 106 may be positioned at any suitable location on the of the wall 107, and skilled artisans will select an appropriate position for the one or more fins based on various considerations, such as the desired stability of the system 100 during flight.

The balloon 105 is formed of a transparent fabric (e.g., polyester films (e.g., biaxially-oriented polyethylene terephthalate (Mylar®), latex), synthetic fabrics, non-metallic materials, lightweight materials). The balloon 105 illustrated in FIGS. 1 and 2 is shown in an inflated configuration. While the balloon 105 has been described as formed of a particular material, other materials having any suitable degree of transparency, translucency, or opaqueness, or any suitable degree of flexibility, are considered suitable, and skilled artisans will be able to select a suitable material for a particular embodiment based on various considerations, including the desired visibility of the system while in flight, and/or the desired flexibility of the balloon.

In addition, while the wall 107 of the balloon 105 is described as defining the reserve chamber 120, cruise chamber 140, and spill chamber 160, one or more of the chambers can alternatively be formed from one or more separate identical, substantially identical, or different, balloons attached to one another, and/or a frame, in various configurations and defining each of the reserve chamber, cruise chamber, and/or spill chamber. Thus, one or more balloons having a wall defining a chamber can define, or be combined (e.g., summed), to define one or more of the reserve chamber, cruise chamber, and/or spill chamber. In a further alternative, one or more of the chambers can alternatively be formed from multiple separate chambers and/or balloons. Example methods of attachment considered suitable between one or more balloons forming the reserve chamber, cruise chamber, and/or spill chamber, or a frame, include, but are not limited to, using one or more hook-and-loop fasteners (e.g., Velcro®), mechanical fasteners, straps, wire, string, adhesive, sonic welds, and any other suitable form of attachment. Example inflated balloon diameters considered suitable for inclusion in any system described herein, include, but are not limited to, diameters in the range from about 1 foot (0.3048 meters) to about 5 feet (1.524 meters). Other examples of inflated balloon diameters considered suitable for inclusion in any system described herein, include, but are not limited to, diameters in the range from about 1 foot (0.3048 meters) to about 10 feet (3.048 meters). Further examples of inflated balloon diameters considered suitable for inclusion in any system described herein, include, but are not limited to, diameters in the range from about 2 feet (0.6096 meters) to about 7 feet (2.1336 meters). While a particular range has been described, other inflated balloon diameters and/or ranges are considered suitable, and skilled artisans will be able to select a suitable inflated diameter and/or range based on various considerations, such as the desired cruising altitude of a system. Example balloons considered suitable include, but are not limited to, off the shelf balloons, and custom balloons.

The reserve chamber 120 is movable between a deflated configuration and an inflated configuration. The reserve chamber 120 comprises a wall 122 and a bi-directional valve 124 disposed in the wall 122. The bi-directional valve 124 is adapted to introduce fluid into, hold fluid within, and remove fluid from the reserve chamber 120. The reserve chamber 120 is configured to receive and contain a volume of fluid sufficient to offset about 50% to 90% of the weight of the system 100. Stated otherwise, the reserve chamber 120 is configured to receive and contain a volume of fluid sufficient to provide about 50% to 90% of the neutral buoyancy of the system 100. Example volumes of fluid considered suitable include volumes of fluid that offset about 70% of the weight of the system 100. Further example volumes of fluid considered suitable include volumes of fluid that offset about 1% to about 100% of the weight of the system 100.

In the illustrated embodiment, the fluid is contained within the reserve chamber 120 throughout the flight of the system and at least advantageously allows for the system 100 to slowly descend when the cruise chamber 140 and the spill chamber 160 have been moved from an inflated configuration to a deflated configuration and have released a portion, or the entirety, of the volume of fluid contained within the cruise chamber 140 and spill chamber 160. The reserve chamber 120 can optionally include a one-way flow valve disposed in the wall 122 of the reserve chamber 120 that is adapted to release the fluid contained within the reserve chamber 120, or a portion thereof, upon receipt of a signal, as described below.

The cruise chamber 140 is movable between a deflated configuration and an inflated configuration. The cruise chamber 140 comprises a wall 142, bi-directional valve 144, and a one-way flow valve 146. The bi-directional valve 144 is disposed in the wall 142 of the cruise chamber 140 and is adapted to introduce fluid into, hold fluid within, and remove fluid from the cruise chamber 140. The one-way flow valve 146 is disposed in the wall 142 of the cruise chamber 140 and is adapted to release the fluid contained within the cruise chamber 140, or a portion thereof, upon receipt of a signal, as described below. The cruise chamber 140 is configured to receive and contain a volume of fluid sufficient to offset about 100% of the weight of the system 100 when taking into account the volume of fluid disposed within the reserve chamber 120 (e.g., buoyancy provided by the volume of fluid contained in the reserve chamber 120). Stated otherwise, the cruise chamber 140 is configured to receive and contain a volume of fluid sufficient to provide about 100% neutral buoyancy of the system 100 when the volume of fluid within the cruise chamber 140 is summed with the volume of fluid disposed within the reserve chamber 120. Example volumes of fluid considered suitable include volumes of fluid that offset about 10% to 50% of the weight of the system. Further example volumes of fluid considered suitable include volumes of fluid that offset about 30% of the weight of the system 100. Even further example volumes of fluid considered suitable include volumes of fluid that offset about 1% to about 100% of the weight of the system 100.

The spill chamber 160 is movable between a deflated configuration and an inflated configuration. The spill chamber 160 comprises a wall 162, bi-directional valve 164, one-way valve 166, one or more apertures 168, and one or more plugs 170. The bi-directional valve 164 is disposed in the wall 162 of the spill chamber 160 and is adapted to introduce fluid into, hold fluid within, and remove fluid from the spill chamber 160. The one-way valve 166 is disposed in the wall 162 of the spill chamber 160 is adapted to release the fluid, or a portion thereof, contained within the cruise chamber 160 upon receipt of a signal, as described below. The wall 162 of the spill chamber 160 defines the one or more apertures 168 which extend through the wall 162 of the spill chamber 160 and allow fluid to pass through the wall 162 of the spill chamber 160. Alternative to including both the one-way valve 166 and the one or more apertures 168, the wall 162 of the spill chamber 160 can include either a one-way valve 166 or one or more apertures 168 and one or more plugs 170.

Each of the one or more plugs 170 comprises a length and diameter configured to engage with one of the one or more apertures. Each of the one or more plugs 170 is adapted to be received by the wall 162 of the spill chamber 160 and within an aperture 168 to provide a sealing engagement between the plug 170 and aperture 168 to prevent fluid from passing through the aperture 168. Optionally, each of the one or more plugs 170 can be attached to the wall 162 of the spill chamber 160 to prevent loss (e.g., through the use of a lanyard). Each of the one or more plugs 170 has a first configuration and a second configuration. In the first configuration, each of the one or more plugs 170 is disposed within an aperture 168, thereby preventing fluid from being released from the spill chamber 160. In the second configuration, one or more of the plugs 170 is free from the aperture 168, thereby allowing fluid to be released from the spill chamber 160. Each of the one or more plugs 170 is movable from the first configuration to the second configuration, and vice versa, by a user inserting a portion, or the entirety, of one of the one or more plugs 170 into one of the one or more apertures 168, or removing one of the one or more plugs 170 from one of the one or more apertures 168. The number of plugs 170 considered suitable to move from the first configuration to the second configuration can vary according to the planned ascent, cruising altitude, and/or descent of the system 100, as described in more detail below.

The spill chamber 160 is configured to receive and contain a volume of fluid sufficient to provide positive buoyancy to the system 100, and to allow for a timed ascent of the system 100 by releasing of a portion of the fluid contained within the spill chamber 160 throughout the ascent of the system 100 via one or more of the one or more apertures 168, the bi-directional valve 164, and/or the one-way valve 166. The gradual release of the fluid contained within the spill chamber 160 eventually brings the system 100 to a cruising altitude (e.g., when the spill chamber has released all of the fluid contained therein), wherein neutral buoyancy is achieved, or substantially achieved.

The spill chamber 160 can have multiple structural arrangements to accomplish planned drift and/or a cruising altitude. In one exemplary structural arrangement, the number and/or diameter of the one or more apertures 168 defined by the wall 162 of the spill chamber 160 can vary, and thus, various spill rates can be achieved by calculating the number and diameter of apertures 168 required for a particular ascent rate and desired altitude. For example, at least two of the one or more apertures 168 and at least two of the one or more plugs 170 can vary in diameter. Skilled artisans will be able to select an appropriate number of apertures 168, and diameters thereof, according to a particular embodiment based on various considerations, such as the desired ascent velocity of the system 100. Examples of suitable numbers of apertures 168 include one, two, three, four, five, six, seven and any other number considered suitable for a particular application. Alternative to providing one or more apertures 168, bi-directional valve 164 and/or the one-way valve 166 can be adapted to release a portion, or the entirety, of the volume of fluid contained within the spill chamber 160 during ascent, upon receipt of a signal, as described below.

The spill chamber 160 can be configured to contain a volume of fluid that offsets about 30% of the weight of the system 100, thereby providing a lift force to the system 100 when the volumes of fluid contained in the reserve chamber 120, cruise chamber 140, and spill chamber 160 are used in combination. Other example volumes of fluid considered suitable include volumes of fluid that offset about 1% to about 100% of the original weight of the system 100. Another example volume of fluid considered suitable includes a volume of fluid that offsets about 10% of the original weight of the system.

The configurations of each of the reserve chamber 120, cruise chamber 140, and spill chamber 160 can vary, and skilled artisans will be able to select an appropriate configuration based on various considerations (e.g., the desired drag of the system). For example, the reserve chamber 120 and the cruise chamber 140 can be disposed adjacent one another, and the spill chamber 160 can be disposed on an exterior portion of the wall 142 of the cruise chamber 140, as illustrated in FIGS. 1 and 2. It is considered advantageous to configure chambers 120, 140, and 160 aerodynamically, such as by adapting the outer wall of the one or more balloons in the inflated configuration to capture wind and the pull associated with low pressure to generate thrust and cause the system to travel in a planned direction. This advantageously reduces the need for the interaction of a propulsion system. For example, the system 100 can optionally include one or more straps (not illustrated) positioned along the cruise chamber 140 and/or spill chamber 160 adapted to configure the cruise chamber 140 and/or spill chamber 160 as a parachutes and/or a sail when in the deflated configuration to assist with the descent of the system 100.

The system 100 can optionally include a retrieval connector 108 formed of a rigid, or semi-rigid, material disposed on any portion of the wall 107 of the balloon 105. The retrieval connector 108 can be configured to receive a length of retrieval line (e.g., tether) in instances where the system is tethered to a ground retrieval device. Alternatively, the retrieval connector 108 can be formed in the wall 107 of the balloon 105. In a further alternative, a tether can be attached to any suitable portion of the instrument case 200, or other portions of the system 100.

Each of the bi-directional valves 124, 144, and 164 described above can comprise any suitable valve that is configured to have a first configuration where fluid can be introduced into the one or more chambers, a second configuration where the bi-directional valve holds fluid within the one or more chambers, and a third configuration where the bi-directional valve allows for fluid to be removed from the one or more chambers (e.g., 120, 140, 160). These configurations can be utilized separately, or in combination with one another, and can be selected and activated upon receipt of a signal from a user, ground control software, and/or on-board software, as described in more detail herein. Example valves considered suitable include French valves (e.g., Presta® valves), automotive-style air valves (e.g., Schrader® valves), and/or Dunlop valves (e.g., Woods valves). Alternatively, the bi-directional valves can comprise one-way valves that are configured to introduce fluid into one or more of the chambers, and retain the fluid within the one or more chambers.

Each of the one-way valves (e.g., 146, 166, optional one-way valve in wall 122 of reserve chamber 120) described above can comprise any suitable valve that is configured to have a first configuration where the one-way valve holds fluid within the respective chamber, and a second configuration where the one-way valve releases the entirety, or a portion, of the fluid contained within the respective chamber upon receipt of a signal from a user, ground control software, and/or on-board software, as described in more detail herein. For example, the one-way valves can comprise any valve that can be remotely actuated, including miniature electrically-controlled actuation mechanisms. In another example, the one-way valves comprise a spring-loaded lid and/or electrified magnetic rim, which, upon switched demagnetization, or battery depletion, or other signal, opens and releases the entirety, or a portion, of the fluid contained within the chamber. Alternative to including a one-way valve, the bi-directional valve described above (e.g., 124, 144, 164) can include a means of releasing the fluid contained within the chamber, such as those described above, or otherwise.

In embodiments that include one or more balloons forming the reserve chamber, cruise chamber, and/or spill chamber, each of the walls defining the reserve chamber, cruise chamber, and/or spill chamber can comprise one or more bi-directional valves, one-way valves, apertures, and/or plugs as described herein. Each of the bi-directional valves, one-way valves, apertures, and/or plugs provide a mechanism for introducing, retaining, and/or releasing fluid contained within the balloon and/or a mechanism to provide thrust to the system. For example, the bi-directional valves and/or one-way valves can be positioned along any portion of the one or more balloons and at any angle to allow for maneuverability, stabilization, ascent, and/or descent of the system.

Figure 3:
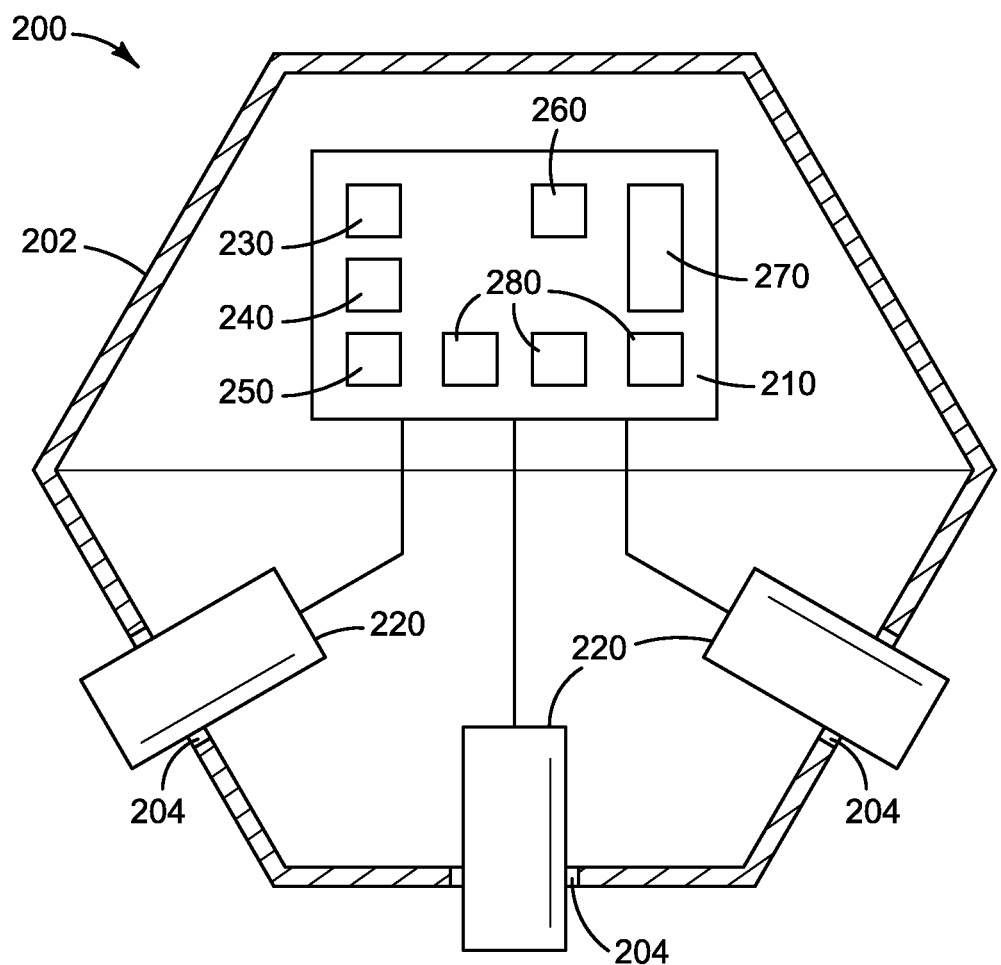
FIG. 3 is a sectional view of an exemplary instrument case.

FIG. 3 illustrates a sectional view of an exemplary instrument case 200 and a block diagram of the devices stored therein. The instrument case 200 comprises a housing 202 that houses a circuit board 210, one or more observation devices 220, one or more sensing devices 230, one or more location devices 240, one or more computational devices 250, one or more communication devices 260, one or more storage devices 270, and/or one or more energy storage devices 280. The instrument case 200 is attached to the balloon 105 by any suitable means of connection 201 (e.g., fishing line, steel wire, nylon rope). It is considered advantageous to attach the instrument case at, or near, the first end 103 of the balloon 105 to provide aerodynamic distribution of weight. Alternatively, the instrument case 200 can be attached directly to the balloon 105 to prevent oscillation of the devices contained within the instrument case 200 (e.g., observation devices 220) during flight.

The housing 202 comprises one or more downward facing windows 204 allowing for the one or more observation devices 220 and/or one or more sensing devices 230 to be directed towards a point of interest during flight. The housing 202 can be formed of any suitable material, and the housing 202 can comprise any suitable geometric shape for housing the devices stored therein. For example, the housing 202 can be formed of closed-cell extruded polystyrene foam (e.g., Styrofoam®) to protect the devices stored within the housing 202. It is considered advantageous to form the housing 202 of a floatable material to provide buoyancy to the system 100 (e.g., should the system land in water).

It is considered advantageous to form the instrument case 200 of a miniaturized housing 202 that houses one or more miniaturized devices (e.g., circuit board 210, observation devices 220, sensing devices 230, location devices 240, computational devices 250, communication devices 260, storage devices 270, energy storage devices 280) within the housing 202 to at least reduce the weight and size of the instrument case 200. By including miniaturized devices in the instrument case 200, the system 100 can advantageously be launched and/or landed in locations that do not require a launching and/or landing platform (e.g., airstrip, helipad).

In addition, it is considered advantageous to provide a housing 202 that allows for a user to access the devices housed therein for repair, or replacement. For example, the housing 202 can have one or more portions that are hingedly connected to one another (e.g., top and bottom portion), attached to one another using one or more threaded components (e.g., screws), and/or snap fit to one another (e.g., top and bottom portions).

The circuit board 210 comprises any suitable mechanism for mechanically and/or electronically connecting one or more of the one or more observation devices 220, sensing devices 230, location devices 240, computational devices 250, communication devices 260, storage devices 270, and/or energy storage devices 280 to one another to provide signal communication between the one or more devices connected the circuit board 210, a user, on-board software, and/or ground control software. For example, the one or more observation devices 220, sensing devices 230, location devices 240, computational devices 250, communication devices 260, storage devices 270, and/or energy storage devices 280 can reside on, or be connected to, a printed circuit assembly. In another example where the balloon 105 is tethered to a ground retrieval device, the system 100 can optionally include a wired connection between the one or more devices housed within the instrument case 200 (e.g., circuit board 210) and a computer comprising a ground control software program, as described below.

The one or more observation devices 220 comprise any device capable of capturing one or more images. Example devices considered suitable include, but are not limited to, one or more video cameras, sensors, optical lenses, ultra-violet lenses, infrared lenses, still photograph camera (e.g., digital, film), radar, and/or fixed angled lenses used to obtain aerial images of one or more points of interest (e.g. ground-based, air-based). The observation devices 220 can be configured at various angles and locations on the housing 202 of the instrument case 200 to obtain multiple angle aerial images of one or more points of interest. For example, the observation devices 220 can utilize, and/or extend through, or within a portion of, the downward facing windows 204 of the housing 202 to obtain one or more aerial images of one or more points of interest. The observation devices 220 can be configured to obtain real-time, low-resolution aerial images, and communicate the data associated with the images to the one or more on-board storage devices 270, a user, and/or ground control software using the one or more communication devices as described below. Alternatively, or in combination with obtaining real time, lower resolution aerial images, the one or more observation devices 220 can be configured to obtain high-resolution aerial images, and communicate the data associated with the images to the one or more on-board storage devices 270, a user, and/or ground control software using the one or more communication devices as described below. For example, observation devices 220 can comprise image sensors and/or processors (e.g., CMOS, CCD) attached to an array of fixed angled lenses that can obtain images through the downward facing windows 204 of the housing 202.

The one or more sensing devices 230 comprise any device capable of detecting information. Example devices considered suitable include, but are not limited to, devices that detect the altitude of the system 100, the wind speed within which the system 100 is operating, velocity/speed of the system 100 (e.g., accelerometer), slope of the system 100 (e.g., inclinometer), image data, radiation (e.g., Geiger counter), air quality, weather conditions, atmospheric pressure conditions, and/or any other information relating to the position, speed, location, directionality, altitude, and/or the directionality of the one or more observation devices and/or the system 100. Image data can include, but is not limited to, triaxial lens inclination (e.g., using triaxial angle sensors), declination, the time at which an image was obtained, the date on which an image was obtained, and/or angular measurements. This information can be communicated to the one or more on-board storage devices 270, a user, and/or ground control software.

The one or more location devices 240 comprise any suitable device capable of detecting information relating to the position of the system 100. The one or more location devices 240 communicate this information to on-board software, ground control software, one or more devices within housing 202 (e.g., on-board storage devices 270), and/or a user. Exemplary location devices 240 comprise one or more global positioning (GPS) modules, and/or altimeters (e.g., barometric altimeter) the one. The information obtained by the one or more location devices 240 can be obtained at one or more points in time, or continuous monitoring of the position of the system 100 can be accomplished.

Figure 7:
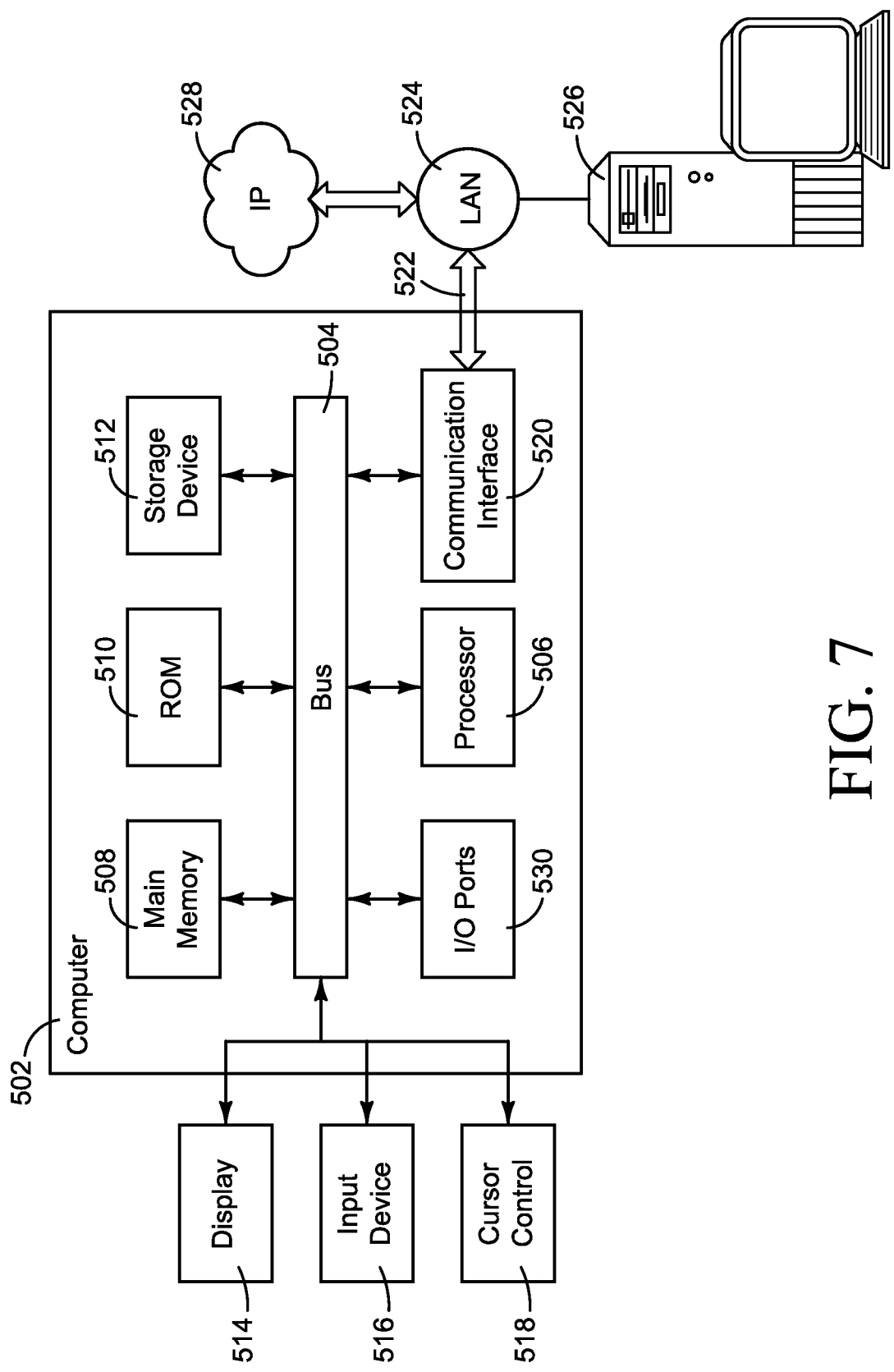
FIG. 7 is a block diagram of an exemplary computer system.

The one or more computation devices 250 comprise any device capable of executing a sequence of instructions contained in the one or more on-board storage devices 270 and/or communicated to the one or more computation devices 250 via a user, and/or ground control software. Exemplary computation devices comprise at least one processor configured to execute the sequence of instructions contained in the on-board storage devices 270 and/or communicated to the processor via a user, and/or ground control software. Another exemplary computation device includes any combination of the devices, components, and/or features described with respect to computer system 502 as illustrated in FIG. 7.

On-board control software, such as software similar to, identical to, or configured to be compatible with, the ground control software, can be utilized by one or more of the devices housed within the instrument case 200 to provide planned ascent, drift, descent, images, autonomous flight, and/or other data as described herein. For example, planned ascent, drift, descent, images, autonomous flight, and/or other data can be obtained, accomplished by, and/or forwarded to a user, on-board software, storage device 270, and/or ground control software by executing one or more sequences of instructions, as described herein, stored within one or more of the on-board storage devices 270, provided by a user, and/or ground control software.

The one or more communication devices 260 comprise any device capable of conveying information to and from the circuit board 210, one or more of the devices attached thereto, a user, ground control software, on-board software, and/or other lighter-than-air systems. The one or more communications devices 260 convey information to and from the circuit board 210, one or more of the devices attached thereto, devices housed within the instrument case 200, a user, ground control software, on-board software, and/or other lighter-than-air systems via wireless (e.g., remote signal, bluetooth), and/or wired link to a user, ground control software, a network (e.g., the Internet, cell phone network), on-board software, and/or other lighter-than-air systems. For example, the one or more communications devices 260 can be configured to utilize point-to-multipoint (PTMP) communication, wireless mesh network (WMN), a combination of the two, satellite networks, and/or cell phone networks. In another example, the one or more communication devices 260 can comprise one or more transmitters, receivers, transceivers, and/or one or more of the other communication devices described herein. In a further example, the one or more communication devices 260 can utilize any suitable push/pull methodology to push information to a server, which in turn will prepare and push the information (e.g., one or more images) to another device (e.g., ground control software, iPad®, cellular phone, iPhone®, notebook), and to pull commands from a queue of one or more commands for operations that need to be performed by one or more devices in the instruments case, or attached thereto (e.g., start collection of images, stop collection of images, send a high resolution image, send a low resolution image). Example information communicated to and from the one or more communications devices 260 include, but is not limited to, any information, signals, and/or data described herein, one or more images, data and/or time at which each of the one or more images was obtained, instructions to retrieve and/or send low-resolution and/or high-resolution images, instructions to open and/or close one or more one-way valves, instructions to open and/or close one or more bi-directional valves, instructions to activate a thrust component and/or associated servo, location data, and/or time data. It is considered advantageous to include a first communication device and a second communication device to provide a mechanism for communicating with the system should one of the communication devices become inoperable or fails to communicate with a user, ground control software, and/or on-board software for an interval of time. Optionally, one or more of the devices housed within instrument case 200, or attached thereto, can provide a wireless network and/or act as a wireless network relay to one or more receivers adapted to communicate with the system.

The one or more storage devices 270 comprise any device capable of storing one or more forms of data obtained by, and/or communicated to, the one or more devices housed within the instrument case 200. Exemplary storage devices 270 comprise any form of memory considered suitable for inclusion in the system 100, such as one or more of the computer readable medium and/or storage devices described herein. For example, random access memory (RAM) or other dynamic storage devices (e.g., dynamic RAM (DRAM), static RAM (SRAM), synchronous DRAM (SDRAM), flash RAM) for storing information and instructions. In addition, read only memory (ROM) or other static storage devices (e.g., programmable ROM (PROM), erasable PROM (EPROM), and electrically erasable PROM (EEPROM)) for storing information and instructions. Furthermore, storage devices (e.g., hard drive, floppy drive, magnetic disk, flash disk, optical disk) are also considered suitable.

The one or more energy storage devices 280 comprise any device capable of storing energy and providing energy to the one or more devices housed within the instrument case 200 and/or the devices attached thereto. An exemplary energy storage device 280 can comprise any suitable power source used individually or as an interconnected group (e.g., single use batteries, rechargeable batteries, batteries, ultracapacitors). One exemplary energy storage device is a pack of lightweight lithium batteries.

Communication between the one or more devices housed within the instrument case 200, and/or the devices attached thereto, can be accomplished using any suitable method including, but not limited to, one or more coaxial cables, copper wires, wires, conductors, fiber optics, bus configurations, acoustic waves, wirelessly, and/or light waves.

For example, the housing 202 can comprise a first main energy storage device and a second reserve energy storage device. The first main energy storage device is in communication with the one or more devices housed within the instrument case 200, or the devices attached thereto, and/or attached to a portion of the airship 102, such as the one-way valves (e.g., 146, 166, optional one-way valve in wall 162 of reserve chamber 160), and/or bi-directional valves (e.g., 124, 144, 164), disposed in the wall 122 of the reserve chamber 120, wall 142 of the cruise chamber 140, and/or wall 162 of the spill chamber 160. The second reserve energy storage device can be configured to be in communication with the one or more devices housed in the instrument case 200, the devices attached thereto, and/or attached to a portion the airship 102. In the event of a first main energy storage device failure, the one-way flow valve 146, and/or bi-directional valve 144, disposed in the cruise chamber 140 can then be optionally opened to descend the system 100. The second reserve energy storage device 280 then provides a mechanism for powering the one or more devices housed in the instrument case 200, the devices attached thereto, and/or attached to a portion of the airship 102, to provide additional maneuvering, if necessary, and/or operation of the system 100.

The airship 102 and/or instrument case 200 can optionally comprise one or more thrust components (not illustrated in FIGS. 1 and 2) attached to the wall 107 of the balloon 105 and/or the housing 202 of the instrument case 200. The one or more thrust components are in communication with one or more of the devices housed within the instrument case 200 (e.g., circuit board 210) and are configured to provide thrust capabilities upon receipt of a signal from a user, on-board software, and/or ground control software. The one or more thrust components can comprise any suitable mechanism for providing thrust to the system 100 and can be configured in any suitable manner (e.g., angle). Examples of suitable thrust component include, but are not limited to, compressed fluid cartridges (e.g., CO2 cartridges, pressurized cartridges), compressed fluid thrust valves, propellers, engines, motors, thruster 700, thruster 870, thruster 970, thruster 1200, thruster 1300, thruster 1500, thrust module 1800, or other forms of propulsion which are configured to provide thrust.

In addition, the airship 102 and/or instrument case 200 can optionally comprise one or more servomotors and/or movable cowls attached to the wall 107 of the balloon 105 and/or the housing 202 of the instrument case 200 that are configured to adjust the direction of the thrust provided by the one or more thrust components. Alternatively, the one or more thrust components can comprise the one or more one-way valves (e.g., 146, 166, optional one-way valve in wall 162 of reserve chamber 160) or one or more bi-directional valves (e.g., 124, 144, 164) disposed in the wall of the one or more chambers (e.g., 120, 140, 160), and/or the wall of any other device, component, and/or element described herein.

It should be noted that the arrangements of the circuit board 210, one or more observation devices 220, sensing devices 230, location devices 240, computational devices 250, communication devices 260, storage devices 270, and/or energy storage devices 280 are set forth for purposes of example only, and other arrangements and elements can be used as alternatives and some elements may be omitted. Furthermore, some of the elements described herein are functional components that may implemented as hardware, firmware, or software, and/or as discrete components used in conjunction with other components, or separately, in any suitable combination or arrangement.

Figure 4:
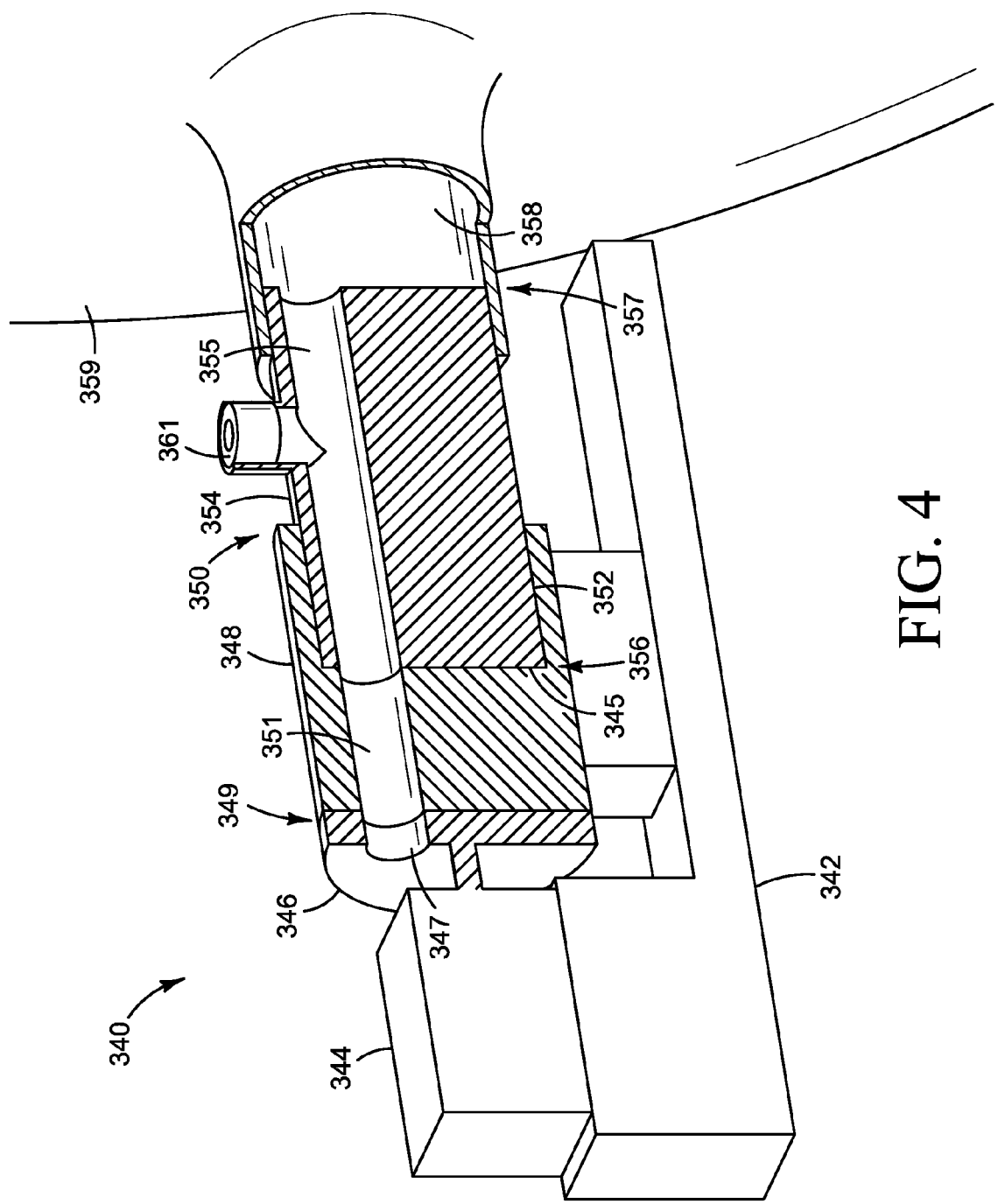
FIG. 4 is a perspective view of an exemplary valve.

For example, one or more of the bi-directional valves 124, 144, 164 and/or one-way valves (e.g., 146, 166, optional one-way valve in wall 162 of reserve chamber 160) can comprise a valve with a structural arrangement as illustrated in FIGS. 4 and/or 5. FIG. 4 illustrates a valve 340 attached to a balloon 359. The valve 340 comprises a base 342, servo 344, cap 346, first tubular member 348, and second tubular member 354. The servo 344 and first tubular member 348 are each attached to the base 342. The cap 346 is attached to a portion of the servo 344 such that with activation of the servo 344 the cap 346 can rotate. The cap 346 defines an aperture 347 that extends through a thickness of the cap 346. The first tubular member 348 comprises a first end 349 and a second end 350 and defines an aperture 351 and a recess 352 having a base 345. The aperture 351 extends between an opening on the first end 349 of the first tubular member 348 and an opening located on the base 345 of recess 352. The recess 352 extends into the first tubular member 348 from the second end 350 to base 345 located between the first end 349 and the second end 350. The aperture 351 and the recess 352 are in fluid communication with one another. The second tubular member 354 defines a passageway 355 and a valve 361. The passageway 355 extends between an opening at the first end 356 and an opening on the second end 357 of the second tubular member 354. The valve 361 is in communication with the passageway 355 and allows for the removal and/or insertion of a fluid into the passageway 355, and/or any other elements in communication therewith. The valve 361 can comprise a one-way valve or bi-directional valve, such as those described herein. The valve 361 can optionally be omitted.

The second end 357 of the second tubular member 354 is attached to an opening 358 defined by the wall of a balloon 359 (e.g., balloon defining reserve chamber, balloon defining cruise chamber, balloon defining spill chamber). The outside diameter of the second tubular member 354 is less than the inside diameter of the recess 352 of the first tubular member 348. The first end 356 of the second tubular member 354 is rotatably disposed, and/or attached, within the recess 352 of the first tubular member 348 such that in a first position the passageway 355 is in communication with the aperture 351 of the first tubular member 348 and in a second position the passageway 355 is not in communication with the aperture 351 of the first tubular member 348.

The cap 346 is disposed on a portion of the servo 344 such that it can be moved between a first position and a second position. In the first position, the aperture 347 of the cap 346 is in communication with the aperture 351 defined by the first tubular member 348. In the second position, the aperture 347 of the cap 346 is not in communication with the aperture 351 defined by the first tubular member 348. Thus, when the second tubular member 354 and the cap 346 are each in the first position, fluid can be passed through the aperture 347 of the cap 346, the aperture 351 of the first tubular member 348, and the passageway 355 of the second tubular member 354 into and/or out of the chamber 360 of the balloon 359. If either of the second tubular member 354 or the cap 346 is in the second position, fluid is retained within the chamber 360 of the balloon 359.

Figure 5:
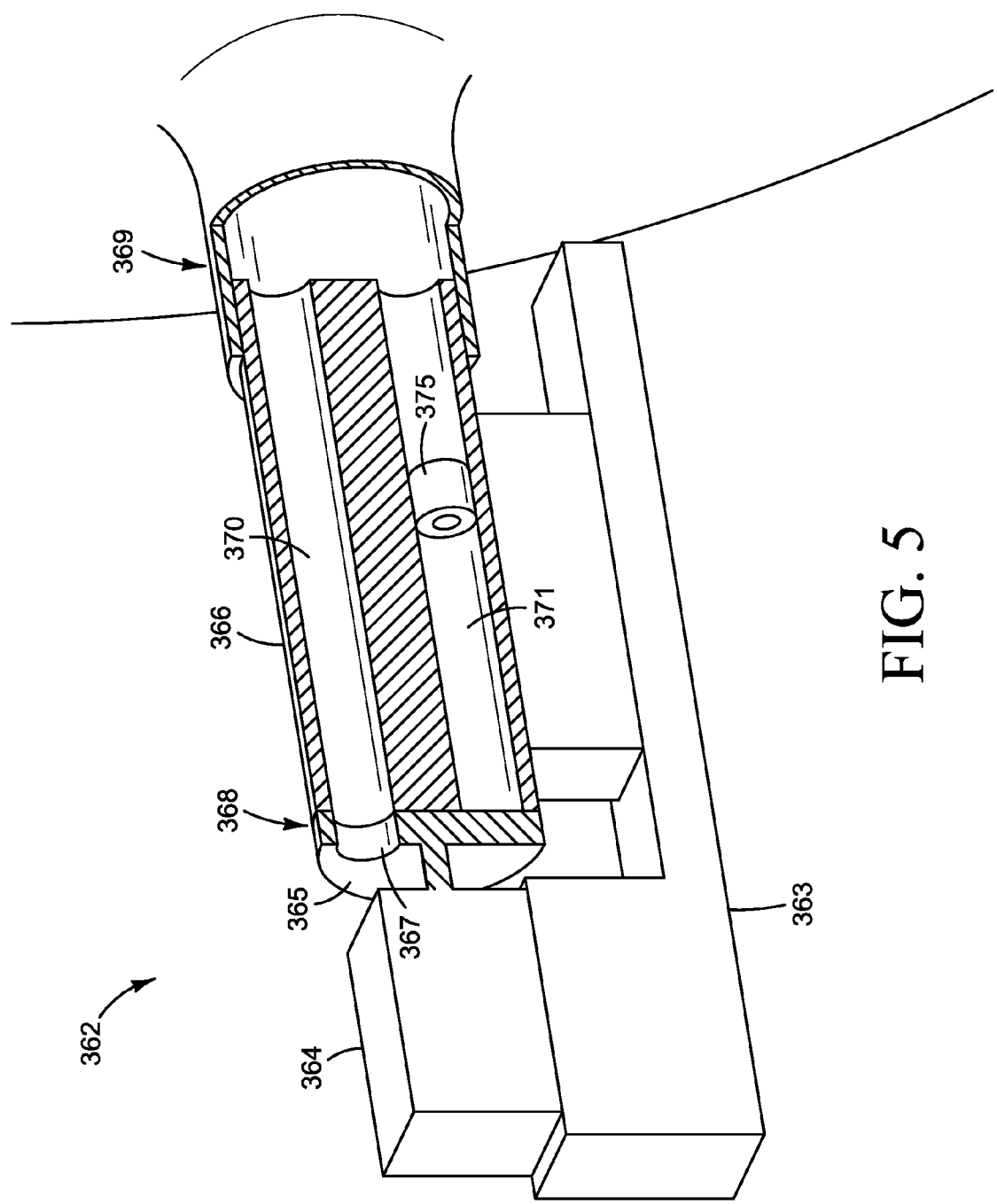
FIG. 5 is a perspective view of another exemplary valve.

Alternatively, as illustrated in FIG. 5, the second tubular member can be omitted, and an alternative valve 362 can comprise a base 363, servo 364, cap 365, and a first tubular member 366. The valve 362 is similar to valve 340, except as described herein. The cap 365 is attached to a portion of the servo 364 such that with activation of the servo 364 the cap 365 can rotate. The cap 365 defines an aperture 367 that extends through a thickness of the cap 365. The first tubular member 366 comprises a first end 368 and a second end 369 and defines a first passageway 370 and a second passageway 371. The first passageway 370 extends between an opening on the first end 368 and an opening the second end 369 of the first tubular member 366. The second passageway 371 extends between an opening on the first end 368 and an opening on the second end 369 of the first tubular member 366. The second end 369 is adapted to be attached to an opening defined by a wall of a balloon such that the first passageway 370 and the second passageway 371 are in communication with a chamber defined by the wall of the balloon. The second passageway 371 comprises a one-way valve 375 that allows fluid to be passed through the second passageway 371 and into the chamber defined by the balloon, but prevents fluid from flowing out of the chamber of the balloon through the second passageway 371.

The cap 365 is disposed on a portion of the servo 364 such that it can be moved between a first position, a second position, and a third position. In the first position, the aperture 367 of the cap 365 is in communication with the first passageway 370 defined by the first tubular member 366, allowing for fluid to be passed into and/or released from the chamber defined by the balloon. In the second position, the aperture 367 of the cap 365 is in communication with the second passageway 371 defined by the first tubular member 366, allowing for fluid to be introduced into the chamber defined by the balloon and preventing fluid from being released through the second passageway 371. In the third position, the aperture 367 defined by the cap 365 is not in communication with either of the first passageway 370 or the second passageway 371, preventing fluid from entering or escaping from the chamber of the balloon.

Each of the valves 340 and 362 described herein can comprise one or more gaskets to prevent fluid from leaking between the various elements described. For example, valve 340 can comprise one or more gaskets disposed between the cap 346 and the first tubular member 348, disposed between the first tubular member 348 and the second tubular member 354, and/or disposed between the second tubular member 354 and the balloon 359. In another example, the valve 362 can comprise one or more gaskets disposed between the cap 365 and the first tubular member 366, and/or disposed between the first tubular member 366 and an attached balloon.

In another example, each of the one or more balloons defining the one or more chambers can comprise a neck that provides access to the chamber of the balloon. A tubular member can be disposed and attached within the neck of the balloon and in communication with a servomechanism. For example, the servomechanism can comprise a servo arm having an aperture and a portion of the tubular member can extend through the aperture of the servo arm. The tubular member has a first configuration and a second configuration. In the first configuration, the tubular member allows for fluid within the chamber to be released from the chamber into the atmosphere. In the second configuration, the servomechanism rotates the servo arm to kink the tubular member preventing fluid from the chamber from flowing into the atmosphere.

Alternatively, the neck of the balloon defining an opening that provides access to the chamber defined by the wall of the balloon can be inserted through the aperture of the servo arm and have a first configuration and a second configuration. In the first configuration, the neck of the balloon allows for fluid within the chamber to be released from the chamber into the atmosphere. In the second configuration, the servomechanism rotates the servo arm to kink the neck of the balloon preventing fluid from the chamber from flowing into the atmosphere.

The bi-directional valves (e.g., 124, 144, 164) and/or one-way valves (e.g., 146, 166, optional one-way valve in wall 162 of reserve chamber 160) described herein can comprise any suitable valve for accomplishing the introduction, retention, and/or release of fluid contained within the one or more chambers. Examples of valves considered suitable include, but are not limited to, ball valves, butterfly valves, globe valves, gate valves, diaphragm valves, and/or other valves described herein. While particular valves have been describe, skilled artisans will be able to select an appropriate valve according to a particular embodiment based on various considerations, such as the weight of the valve, the weight of the system, and/or the volume of fluid to be retained within the one or more chambers.

Figure 6:
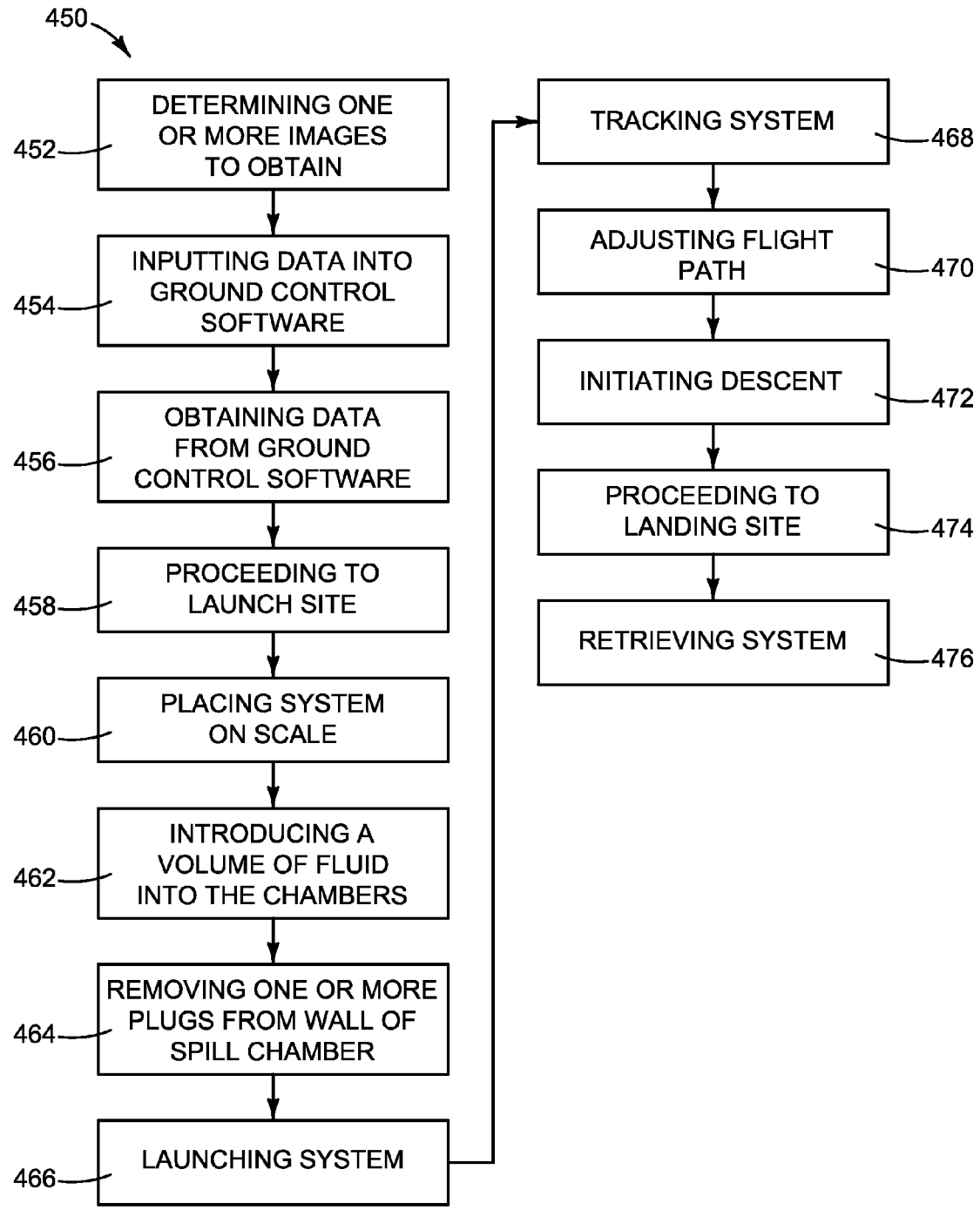
FIG. 6 is a flow chart representation of an exemplary method of obtaining one or more aerial images using a lighter-than-air system.

FIG. 6 is an exemplary method 450 of obtaining aerial images using a lighter-than-air system (e.g., system 100, system 800, system 900, system 1100, system 1400, system 2100, system 2200). An initial step 452 comprises determining one or more images to obtain. Another step 454 comprises inputting data into ground control software. Another step 456 comprises obtaining data from the ground control software. Another step 458 comprises proceeding to a launch site. Another step 460 comprises placing the system on a scale. Another step 462 comprises introducing a volume of fluid into one or more of the chambers. Another step 464 comprises removing one or more plugs from the wall of the spill chamber. Another step 466 comprises launching the system. Another step 468 comprises tracking the system. Another step 470 comprises adjusting the flight path of the system. Another step 472 comprises initiating the descent of the system. Another step 474 comprises proceeding to the landing site of the system. Another step 476 comprises retrieving the system.

The step 452 of determining one or more images to obtain can be accomplished by determining the location, and amount, of images to be acquired. For example, this can be accomplished by selecting a project area that contains one or more ground and/or aerial points of interest for which a user wishes to obtain images. Alternatively, or in combination with one or more points of interest, the selected locations can include regional coverage of an area.

The step 454 of inputting data into ground control software can be accomplished by providing a computer system, or other device, containing a software program (e.g., ground control software program) that is configured to calculate at least one or more of a planned ascent, cruising altitude, drift, and/or descent of the system. The data input into the ground control software program can include, but is not limited to, the weight of the system, the location of images to be obtained (e.g., preselected points of interest), the number of images to be obtained, the length of time for the flight, the desired launch site, the number of systems being launched, the desired landing site, the desired flight path, the desired planned drift, and/or other data as described herein. The data can be input into the ground control software program through a variety of input means (e.g., keyboard, voice command, keypad, text message, file upload).

When available, the ground control software program is configured to utilize any suitable data, such as internet data (e.g., whether launch site and/or landing site is on private property, height above sea level, whether a launch site and/or landing site is in a water mass), field data (e.g., topographical, geographical, land use, forces caused by buildings and/or mountains), meteorological data (e.g., wind speed, updrafts caused by heat, pressure changes caused by geographic conditions, pressure changes caused by sun positions, temperature, time of day, historic meteorological data, on shore and/or off sore sea side breezes), and mathematical methods to determine at least the planned ascent, drift, and descent of the system and output data associated with at least one or more of the volume of fluid required in each chamber (e.g., 120, 140, 160, 1144, 1154, 1164, 1444, 1454, 1566), the location of the launch site, the optimal launch time, the number of plugs to remove from the wall of the spill chamber, the timing of the release of fluid from the cruise chamber, and/or the location of the end of the landing site. Examples of mathematical methods considered suitable to determine the above factors include, but are not limited to: van der Hoven's spectrum (e.g., predicting the angle and force of geostrophic and local winds), Weibull's distribution (e.g., estimating probability of wind speed), and Prandtl's logarithmic law (e.g., estimating ground friction effects and wind sheer effects). These formulae and data can be utilized to generate a histogram for a particular project.

The ground control software program is configured to calculate one or more of planned ascent, drift, descent, and/or aerial points and/or paths to travel to allow the one or more devices housed within the instrument case to obtain images requested by the user using the above data, based on user input of a launch point, landing site, desired flight path, and/or cruising altitude. Alternatively, with respect to obtaining images relating to a particular location, the ground control software can output data relating to an optimal launch site or launch time, if the user indicates that one or the other is more important. For example, where obtaining images of a particular location is necessary as soon as possible (e.g., public safety or national security is at issue), a user can indicate to the ground control software that launch will be immediate, or at a designated time, such that the ground control software optimizes the launch site for prevailing conditions.

The ground control software is configured to store information relating to past and/or present flights to generate optimal planned ascents, drift, and descent. For example, the ground control software can store data relating to past and/or present flights to increase the predictability of future and/or current planned ascents, drifts, descents, and/or launches. This data can be plotted using any suitable technique. For example, the data can be plotted on any suitable existing map, geo-referenced map (e.g., geo-referenced electronic map), image set, and/or any other suitable form of reference. Example forms of data considered suitable to compile, store, and/or use to plot on an existing map, geo-referenced map (e.g., geo-referenced electronic map), and/or on an image set include, but are not limited to, data associated with wind speeds at one or more intervals of time (e.g., seconds, minutes, hours, days), temperatures, atmospheric pressures, data described herein, and any other data considered suitable for a particular application. In addition, the ground control software is configured to provide an optimal landing site of the system. For example, if it is determined that the expected landing site of the system is inconvenient (e.g., a roof top, within a lake), the ground control software can calculate an alternative landing site and output data relating to the volume of fluid required in the chambers, the launch site, among others, as described herein. Alternatively, if it is determined that the expected landing site of the system is inconvenient, the user can select a nearby site and the ground control software can calculate the necessary data to be used for launch, ascent, and descent of the system. The ground control software can provide one or more secondary landing sites in all directions around the coordinates of the primary landing site. Calculating secondary landing sites is considered advantageous to allow a user to select the secondary landing site should the system be forced off an originally planned drift path.

The ground control software can include password protection capabilities, for example, which require a user to provide a user ID and/or password to interact with the software. A user can input a starting point and/or ending point for a particular flight using geographical coordinates, and/or by clicking on a point on an electronic map. The ground control software is configured to accept the starting and ending coordinates of the flight, unless a restriction is associated with the starting and/or ending coordinates (e.g., no public access, undesirable location due to geographical conditions). If a restriction is associated with a coordinate, the ground control software can return a message to a user indicated such (e.g., "Trespassing" point is legally inaccessible, "No Pass"—point is physically undesirable because of geographical conditions: wet, dry, low, high). A user can override the rejection of a coordinate and require the ground control software to use the points initially entered rather than alternatively generated coordinates. Alternatively, the user can select alternative coordinates.

FIG. 7 illustrates an exemplary computer system 502 upon which exemplary ground control software, and/or on-board software, may be implemented.

As used herein, the term "computer system" (also referred to merely as a "computer") means one or more general-purpose and/or specific-purpose computers, one or more digital information processing machines (e.g., devices, software, hardware, or the combination thereof), or one or more digital clients. Thus, computer systems may include, but are not limited to, host computers, client computers, server computers, desktop computers, laptop computers, tablet computers, televisions, digital cameras, smart phones, cellular phones, hand-held devices, digital media devices, digital media players, peripherals, machines, telecommunications devices (e.g., modems and routers), composite systems composed from multiple other systems, embedded controller systems, microprocessor-based systems, digital signal processor-based systems, personal digital assistant (PDA) systems, Internet connected devices, digital hubs, gaming systems (e.g., Xbox 360®, Wii®), home theater components, wireless systems, wireless networking systems, and/or computer software/software subsystems running therein.

For example, a user may use a computer system 502, and associated ground control software and/or on-board software, to calculate at least a planned ascent, drift, and/or descent of a lighter-than-air system, as described herein, and/or other data as described herein. For example, on-board software can be configured to perform the same, or different, functions as the ground control software and can be contained within a computer system similar, or identical to, computer system 502 housed within an instrument case.

The computer system 502 may include a bus 504 or other communication mechanism for communicating information and a processor 506 coupled with bus 504 for processing the information. The computer system 502 may also include a main memory 508, such as a random access memory (RAM) or other dynamic storage device (e.g., dynamic RAM (DRAM), static RAM (SRAM), synchronous DRAM (SDRAM), flash RAM), coupled to bus 504 for storing information and instructions to be executed by processor 506. In addition, main memory 508 may be used for storing temporary variables or other intermediate information during execution of instructions to be executed by processor 506.

The computer system 502 may further include a read only memory (ROM) 510 or other static storage device (e.g., programmable ROM (PROM), erasable PROM (EPROM), and electrically erasable PROM (EEPROM)) coupled to bus 504 for storing static information and instructions for processor 506. A storage device 512 (e.g., hard drive, floppy drive, magnetic disk, flash disk, optical disk) may be provided and coupled to bus 504 for storing information and instructions.

The computer system 502 may also include input/output ports 530 to couple the computer system 502 to external devices. Such coupling may include direct electrical connections, wireless connections, networked connections, etc., for implementing automatic control functions, remote control functions, etc.

The computer system 502 may also include special purpose logic devices (e.g., application specific integrated circuits (ASICs)) or configurable logic devices (e.g., generic array of logic (GAL), re-programmable field programmable gate arrays (FPGAs)). Other removable media devices (e.g., compact disc (CD), magnetic tape, removable magneto-optical media) or fixed, high-density media drives, may be added to the computer system 502 using an appropriate device bus (e.g., small computer system interface (SCSI) bus, enhanced integrated device electronics (EIDE) bus, ultra-direct memory access (DMA) bus). The computer system 502 may additionally include a peripheral (e.g., compact disc reader, DVD reader, compact disc reader-writer unit, DVD burner, compact disc jukebox), which may be connected to the same device bus or another device bus.

The computer system 502 may be coupled via bus 504 to a display 514 (e.g., cathode ray tube (CRT), liquid crystal display (LCD), LED display, plasma display, voice synthesis hardware, voice synthesis software) for displaying and/or providing information and/or data to a user. The display 514 may be controlled by a display and/or graphics card. The display 514 may include one or more interface cards or components (e.g., audio card, video card).

The computer system 502 may include input devices 516 (e.g., keyboard), and/or a cursor control 518, for communicating information and command selections to processor 506. Such command selections can be implemented via voice recognition hardware and/or software functioning as the input devices 516. The cursor control 518, for example, is a mouse, a trackball, cursor direction keys, touch screen display, optical character recognition hardware and/or software, etc., for communicating direction information and command selections to processor 506 and for controlling cursor movement on the display 514. In addition, a printer may provide printed listings of the data structures, information, etc., or any other data stored and/or generated by the computer system 502.

The computer system 502 may perform at least a portion or all of the processing steps of an exemplary ground control software program, and/or on-board software program. For example, computer system 502 can used to calculate one of at least one or more of planned ascent, drift, and/or descent of a system, other data described herein, and/or for obtaining of one or more images of one or more points of interest in response to processor 506 executing one or more sequences of one or more instructions contained in a memory, such as the main memory 508. Such instructions may be read into the main memory 508 from another computer readable medium, such as storage device 512, or may be transmitted by a network connection. One or more processors in a multi-processing arrangement may also be employed to execute the sequences of instructions contained in main memory 508. Alternatively, hard-wired circuitry may be used in place of or in combination with software instructions. Specific combinations of hardware circuitry and software can vary depending on the hardware and software being utilized.

As stated above, the system 502 may include at least one computer readable medium (e.g., compact discs, hard disks, floppy disks, tape, magneto-optical disks, PROMs (EPROM, EEPROM, Flash EPROM), DRAM, SRAM, SDRAM) or memory programmed according to the teachings of an exemplary ground control software program, and/or on-board software program, for the control of system, and/or calculation of the data as described herein. Stored on any one or on a combination of computer readable media, an exemplary ground control software program, and/or on-board software program, may include software and/or hardware for controlling the computer system 502, for driving one or more devices for implementing an exemplary lighter-than-air system, and/or for enabling the computer system 502 to interact with a human user. Such software may include, but is not limited to, device drivers, operating systems, development tools, and applications software. Such computer readable media further includes the computer program of an exemplary ground control software program, and/or on-board software program, for the management of system for performing all or a portion (if processing is distributed) of the processes, calculations, and/or methods as described herein.

The computer code devices of an exemplary ground control software program, and/or on-board software program, may be any interpreted or executable code mechanism, including, but not limited to, scripts, interpreters, dynamic link libraries, Java classes, and complete executable programs. Moreover, parts of the processing of an exemplary ground control software program, and/or on-board software program, may be distributed for better performance, reliability, and/or cost.

The term "computer readable medium" as used herein refers to any medium that participates in providing instructions to processor 506 for execution. A computer readable medium may take many forms, including but not limited to, non-volatile media, volatile media, non-transitory media, and transmission media. Non-volatile media includes, for example, optical, magnetic disks, and magneto-optical disks, such as storage device 512. Volatile media includes dynamic memory, such as main memory 508. Transmission media includes coaxial cables, copper wire and fiber optics, including the wires that comprise bus 504. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM, DVD), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 506 for execution. For example, the ground control software program, and/or on-board software program, can be described in the general context of computer executable instructions, such as program modules, or program components, being executed by a computer. Program modules or components include routines, objects, data structures, tasks, etc. that can perform particular tasks or implement particular abstract data types. For example, the ground control software program, and/or on-board software program, may be practiced in a distributed computing environment, where the instructions or tasks may initially be carried on a magnetic disk of a remote computer. The remote computer can load the instructions for implementing all or a portion of an exemplary ground control software program, and/or on-board software program, remotely into a dynamic memory and send the instructions over a network connection using, for example, a modem, a network interface card or a wireless connection. In a distributed computing environment, program modules or components can be located in both local and remote computer storage media including memory storage devices.

The computer system 502 also includes a communication interface 520 coupled to bus 504. Communication interface 520 provides a two-way data communication coupling to a network link 522 that may be connected to, for example, a local network 524. For example, communication interface 520 may be a network interface card to attach to any packet switched local area network (LAN), Wireless Local Area Network (WLAN), Wide Area Network (WAN), Metropolitan Area Network (MAN), Small Area Network (SAN), Campus Area Network (CAN), or the like. The network can be in communication with one or more computer systems 502, lighter-than-air systems, and/or other devices (e.g., 526). As another example, communication interface 520 may be an asymmetrical digital subscriber line (ADSL) card, an integrated services digital network (ISDN) card or a modem to provide a data communication connection to a corresponding type of telephone line. Wireless links may also be implemented via the communication interface 520, for example, to utilize cell phone networks. In any such implementation, communication interface 520 sends and receives electrical, electromagnetic or optical signals that carry digital data streams representing various types of information.

Network link 522 typically provides data communication through one or more networks to other data devices. For example, network link 522 may provide a connection to a computer 526, and/or other systems 502, through local network 524 (e.g., a LAN) or through equipment operated by a service provider, which provides communication services through a communications network 528. Local network 524 and communications network 528 can use electrical, electromagnetic, or optical signals that carry digital data streams. The signals through the various networks and the signals on network link 522 and through communication interface 520, which carry the digital data to and from computer system 502, are exemplary forms of carrier waves transporting the information. The computer system 502 can transmit notifications and receive data, including program code, through the network(s), network link 522 and communication interface 520. Network interfaces include, but are not limited to, Ethernet interfaces, gigabit interfaces, cable interfaces, frame relay interfaces, and DSL interfaces.

The step 456 of obtaining data from the ground control software program can be accomplished by a user reviewing data displayed on a monitor (e.g., GUI) and/or on a printout. The data obtained from the ground control software program comprises data relating to the planned ascent, drift, and/or descent of the system, the volume of fluid required in each chamber (e.g., 120, 140, 160, 1144, 1154, 1164), the location of the launch site, the number of plugs to remove from the spill chamber, the timing of the launch, the timing of the release of fluid from the cruise chamber and/or spill chamber, the length of flight, and/or the location of the landing site of the system.

Once the launch site has been determined, the step 458 of proceeding to the launch site can be accomplished by relocating to the launch site provided by the ground control software program. It is to be noted, however, that the launch site can be calculated by the ground control software program, and/or on-board software program, or be designated by a user. In the example where the ground control software program determines the launch site, the user may have to relocate from a current location to an alternate located to launch the system according to the data computed by the ground control software program. In the example where the user inputs the desired launch site, the ground control software program can determine data relating to the planned ascent, drift, and descent of the system, the volume of fluid required in each chamber (e.g., 120, 140, 160, 1144, 1154, 1164), the number of plugs to remove from the spill chamber, the timing of the launch, the timing of the release of fluid from the cruise chamber and/or spill chamber, length of the flight, and/or the location of the landing site of the system based on the input of the launch site by the user. Optionally, if the user(s) is currently located at the launch site, the step 458 of proceeding to the launch site can be omitted from the methodology 450 and the user can maintain his/her current location.

It is considered advantageous to determine the volume of fluid required for the planned ascent, drift, and descent prior to traveling to the launch site to confirm that the proper volume of fluid is on hand for the flight. Alternatively, a stock of fluid can be stored and utilized at a launch site that has been designated by the user. For example, predetermined volumes of fluid can be provided in premeasured canisters, as described below.

The step 460 of placing the system on a scale can be accomplished by providing a scale and attaching the system to the scale. The scale is configured to measure the weight of the system prior to, during, and subsequent to a volume of fluid being introduced into one or more of the chambers (e.g., 120, 140, 160, 1144, 1154, 1164). The scale can comprise any form of measuring device, such as a digital scale, balance scale, lift-hook scale, tension meter, and/or spring scale. For example, when a balloon is attached to a device, such as a tension meter, via a tether, the tension on the tether can be used to determine the buoyancy of the balloon, and/or the amount of weight offset by the fluid within the chamber defined by the balloon.

Alternative to placing the system on a scale, or in combination with this step, an optional step comprises attaching the system, and/or each of the one or more chambers, to a gauge. This optional step can be accomplished by attaching a gauge to a bi-directional valve, one-way valve, a hose, tank, or at any position along a length of material used to introduce fluid into the one or more chambers.

The step 462 of introducing a measured volume of fluid into the chambers can be accomplished by attaching a first end of a hose to a container containing fluid (e.g., portable canister), and the second end to a valve disposed in the wall of one or more of the chambers. Each of the chambers can then be moved from the deflated configuration to the inflated configuration. By having the system attached to a scale, when the chambers are filled with fluid, the buoyancy of the system can be determined. For example, after placing the system on the scale and obtaining the data from the ground control software program relating to the volume of fluid to be introduced into each of the chambers, the chambers can be moved from their deflated configurations to their inflated configurations. The scale can be utilized to determine if the combined volume of fluid introduced into the reserve chamber (e.g., 120, 1154) and cruise chamber (e.g., 140, 1144) is sufficient to offset about 100% of the weight of the system to provide neutral buoyancy of the system. For example, the reserve chamber can be filled with a volume of fluid sufficient to offset about 50% to 80% of the weight of the system. The volume of fluid can be measured as it is introduced into the reserve chamber by a gauge and/or the total weight of the system can be examined on the scale. To determine if the volume of fluid has offset about 50% to 80% of the weight of the system, the user reviews the gauge and/or scale. It is considered advantageous to introduce the fluid into the one or more chambers in an enclosed area, or some other location outside of natural weather conditions (e.g., wind), to at least reduce the likelihood of the natural weather conditions manipulating the scale reading.

After filling the reserve chamber with a volume of fluid, the user can then introduce a volume of fluid into the cruise chamber. The volume of fluid can be measured as it is introduced into the cruise chamber by a gauge and/or the total weight of the system can be examined on the scale. To determine if the volume of fluid has offset the remainder of the weight of the system to provide about 100% neutral buoyancy, the user reviews the gauge and/or scale.

After filling the cruise chamber, the user can then introduce fluid into the spill chamber. When the spill chamber comprises one or more apertures and plugs, in a first configuration the plugs are all disposed within a corresponding aperture of wall of the spill chamber. This allows for the spill chamber to be moved from a deflated configuration to an inflated configuration by the introduction of fluid into the spill chamber. The volume of fluid can be measured as it is introduced into the spill chamber by a gauge and/or the total weight of the system can be examined on the scale. To determine if the volume of fluid introduced into the spill chamber is equal to the volume of fluid to provide planned ascent and/or drift of the system the user reviews the gauge and/or scale as the volume of fluid is introduced into the spill chamber.

While the chambers have been described as inflated in a particular order, the chambers can be filled in any order. For example, the chambers can be filled in combination with one another, or separately from one another. Furthermore, while particular volumes of fluid have been described with respect to each chamber, various other volumes of fluid are considered suitable, and skilled artisans will be able to select an appropriate volume of fluid based on various considerations, such as the desired cruising altitude of the system, among others.

Alternative to introducing a volume of fluid into the one or more chambers at the launch site using a scale and/or gauge, the volume of fluid to be introduced into each of the one or more balloons defining the one or more chambers can be predetermined and compressed into one or more canisters. The one or more canisters can be configured to releasably attach to an opening defined by the wall of the one or more balloons, one or more bi-directional valves, and/or one-way valves disposed within the wall of the one or more balloons, to introduce a volume of fluid into the one or more chambers.

For example, the weight of the overall system can be a known characteristic (e.g., 2.15 lbs.). Therefore, the volume of fluid required for each of the one or more balloons defining the one or more chambers can be determined for a particular flight, altitude, ascent, planned drift, and/or descent. For example, to provide neutral buoyancy to a system having an overall weight of about 2.15 lbs., 10 total balloons, each having a full pressure containing a volume of fluid (e.g., helium) of about 7,513 cubic inches, 6 balloons defining the reserve chamber, 2 balloons defining the cruise chamber, and 2 balloons defining the spill chamber can be used to accomplish one or more steps described herein. In this example, about 985 liters, or 60,012 cubic inches, of fluid (e.g., helium) is required to provide neutral buoyancy to the system, and each of the one or more balloons can contain about 123.1 liters of fluid (e.g., helium). Each of the one or more canisters can contain a predetermined measured volume (e.g., 123.1 liters) of fluid for each of the chambers and/or balloons and can be used to introduce the measured amount of fluid into the one or more balloons. Thus, a user is able to introduce a measured volume of fluid into each of the one or more balloons defining the one or more chambers at the launch site, without having to measure the fluid at the launch site. While a particular example has been provided, other weights, volumes, capacities, and/or fluids are considered suitable for providing neutral buoyancy to a lighter-than-air system, and skilled artisans will be able to select a particular weight, volume, capacity, and/or fluid based on various factors, such as the overall weight of the system. For example, if the overall weight of the system is known, the neutral buoyancy of the system can be determined, and the volume of fluid required in the cruise chamber and/or reserve chamber can be determined, and the cruising altitude can be determined by the volume of fluid contained within the spill chamber and the rate at which it is released during ascent.

An optional step comprises stretching each balloon prior to introducing a fluid (e.g., lighter-than-air fluid) into the chamber defined by the balloon. This can be accomplished by inflating each balloon to about 75% of its total capacity. Alternatively, each balloon can be inflated between about 25% and about 90% of its total capacity.

Another optional step comprises reviewing the outer surface of each balloon for defects that may cause the balloon to rupture and deflate during flight.

Another optional step comprises deflating each balloon.

The step 464 of removing one or more of the plugs from the wall of the spill chamber can be accomplished by removing the number of plugs designated by the ground control software program, and/or on-board software program. For example, the ground control software program will calculate, and provide to a user, the number and/or diameter of the one or more plug(s) to be removed from the wall of the spill chamber, based on factors including, but not limited to, the plug(s) diameter and rate at which the volume of fluid contained within the spill chamber will be spilled into the atmosphere. The ground control software program calculates the number of plugs to remove from the wall of the spill chamber based on factors including, but not limited to, the desired cruising altitude of the system as input by the user, or determined by the ground control software and/or on-board software, and the time of ascent. Optionally, this step can be omitted if the one or more apertures and one or more plugs are omitted from the wall of the spill chamber, and a one-way valve, two-way valve, and/or thruster can be used to release a volume of fluid from the spill chamber and/or cruise chamber, for example, by a remote signal, as described herein.

The step 466 of launching the system can be accomplished by removing the system from the scale and releasing the system at the time designated by the ground control software program, on-board software, and/or user. This step can be accomplished in combination with the step 464 of removing one or more of the plugs from the wall of the spill chamber. Alternatively, this step can be accomplished by removing the one or more canisters from the one or more balloons and releasing the system at the time designated by the ground control software, on-board software, and/or user.

The step 468 of tracking the system can be accomplished by viewing data supplied by the ground control software program, and/or on-board software, on a display (e.g., GUI), a GPS unit, and/or by direct visualization. When the system is tracked by the ground control software program, and/or on-board software, the planned drift of the system is confirmed and recalculated as necessary. For example, the system can be aerodynamically shaped to capture wind to generate thrust and cause the system to travel in a planned direction. Alternatively, when more than one lighter-than-air system has been launched, the step of tracking the system can comprise tracking the one or more systems, and can be accomplished as described above.

The step 470 of adjusting the flight path can be accomplished by the ground control software program, on-board software, and/or a user calculating alternative planned drifts based on variables that may be introduced during the flight of the system. For example, if unexpected winds, or other forces begin to interact with the system, the ground control software program, on-board software, and/or user will become aware of these variables via one or more devices housed within the instrument case 200 (e.g., communication devices 260, sensing devices 230) and an alternate landing site and/or flight path can be calculated, for example, by using the trajectory of the horizontal force and/or vertical force being applied to the system. After computing any necessary adjustments to continue to provide a planned-drift, the ground control software program, on-board software, and/or a user can communicate with the system to either release a portion of fluid contained within a chamber (e.g., spill chamber, cruise chamber, reserve chamber, first balloon chamber, second balloon chamber, container chamber) and/or initiate use of the one or more thrusters.

The step 472 of initiating the descent of the system is accomplished by the ground control software program, on-board software, and/or a user communicating a signal to the system to open one or more of the one-way valves, and/or bi-directional valves disposed in the wall of the cruise chamber and/or reserve chamber. The volume of fluid contained in the reserve chamber 120, which offsets about 50% to 90% of the weight of the system, allows for a reduced speed descent of the system, for example, when the volume of fluid contained within the cruise chamber has been released into the atmosphere. The ground control software program, on-board software, and/or user can then track the descent of the system by reviewing data communicated by one or more devices housed within the instrument case, and/or by direct visualization of the system.

It is considered advantageous to initiate descent when the projected landing site is within tolerable limits as determined by a user, ground control software, and/or on-board software. The projected landing site can be calculated using any suitable method and skilled artisans will be able to select a suitable method based on various considerations, such as the structural configuration of the system. For example, a projected landing site can be based on a parabolic trajectory using the systems current location, the vector of current external forces (e.g., calculated from history), and the descent rate (e.g., based on deflation volume and time).

Optionally, if the system (e.g., one or more of the devices housed within instrument case 200, on-board software) does not receive a signal from a user and/or ground control software for an interval of time, the system can be configured to initiate descent independent of receiving a signal from a user and/or ground control software. If descent is initiated independent of receiving a signal from a user and/or ground control software, the coordinates of the system at any point of time during the ascent, flight, and/or descent (e.g., beginning of descent, during descent, at landing point) can be transmitted to the user, ground control software, and/or on-board software. This is considered advantageous at least because it provides a mechanism for retrieving the system should a communications failure occur. The interval of time can be based on an input supplied by a user and/or be predefined by ground control software or on-board software. Any suitable interval of time is considered suitable and skilled artisans will be able to select a suitable interval of time according to a particular embodiment based on various considerations, including the desired flight time of the system. Example intervals of time considered suitable include, but are not limited to, one second, one minute, between about one minute and about one hour, one hour, more than one hour, and any other interval of time considered suitable for a particular application.

Optionally, if the projected landing site of the system is not within tolerable limits, then a user, ground control software, and/or on-board software can select an alternative landing site. A radius containing potential new landing sites can be determined based on the potential thrust available to the system (e.g., by releasing fluid through a thruster (e.g., by perforating a membrane)) and the vectors of external forces on the system. This information can be provided to a user, ground control software, and/or on-board software such that a new landing site can be selected (e.g., via graphic user interface). In addition to this information, a user, ground control software, and/or on-board software can utilize the one or more observation devices, information provided by the internet, or otherwise (e.g., maps, imagery), and/or land use records to determine a potential landing site.

Once a landing site has been determined, the trajectory of the system will be calculated with known thrust and/or vectors of external force values. This information is used by a user, ground control software, and/or on-board software to determine the order, and timing, in which to activate one or more valves and/or one or more membranes to land the system at a particular landing site.

Alternatively, when a thruster (e.g., 700, 870, 970, 1200, 1300) is being used, the step of initiating the descent of the system can be accomplished by the ground control software program, on-board software, and/or a user communicating a signal to the system to perforate one or more of the membranes disposed over an opening defined by a thruster.

The step 474 of proceeding to the landing site of the system can be accomplished by traveling to the landing site provided by the ground control software program, on-board software, and/or user. For example, the ground control software program can provide data to a user relating to the expected landing site of the system, which can be plotted on existing electronic maps and/or land images. Alternatively, if the user is already located at the landing site, this step can be omitted.

The step 478 of retrieving the system can be accomplished by locating the system and gaining possession of the system.

The data obtained prior to, during, and/or subsequent to the flight of the system can be compiled to create a data store of information that can be utilized by various industries (e.g., wind turbine industry), and/or for future flights of one or more systems. The compiled data can be provided via any suitable medium (e.g., Internet web site, magazine, book, server) to anyone seeking the information.

An optional step comprises activating sleep mode which can be accomplished by a user and/or ground control software sending a signal, which can be user activated, a timed event, surveillance match (e.g., digital, analog) to a point of interest, and/or other event, to one or more of the devices within the instrument case to either lower power consumption, or turn off one or more of the devices entirely. A further optional step comprises activating hover mode which can be accomplished by a user and/or ground control software sending a signal, which can be user activated, a timed event, surveillance match (e.g., digital, analog) to a point of interest, and/or other event, to one or more of the devices within the instrument case to close all valves currently opened and terminate all signals to any thrust devices that are providing thrust to the system, thereby allowing the system to drift. It is considered advantageous to allow for sleep mode and/or hover mode to allow for the system to cover broad areas for long periods of time.

While various steps, alternative steps, and optional steps have been described above with respect to obtaining aerial images, these steps, alternative steps, and optional steps can be included in, accomplished concurrently with, and/or accomplished in the alternative to, the methodologies, steps, alternative steps, and/or optional steps described above, and/or below with respect to method 600 and/or method 2300.

Figure 8:
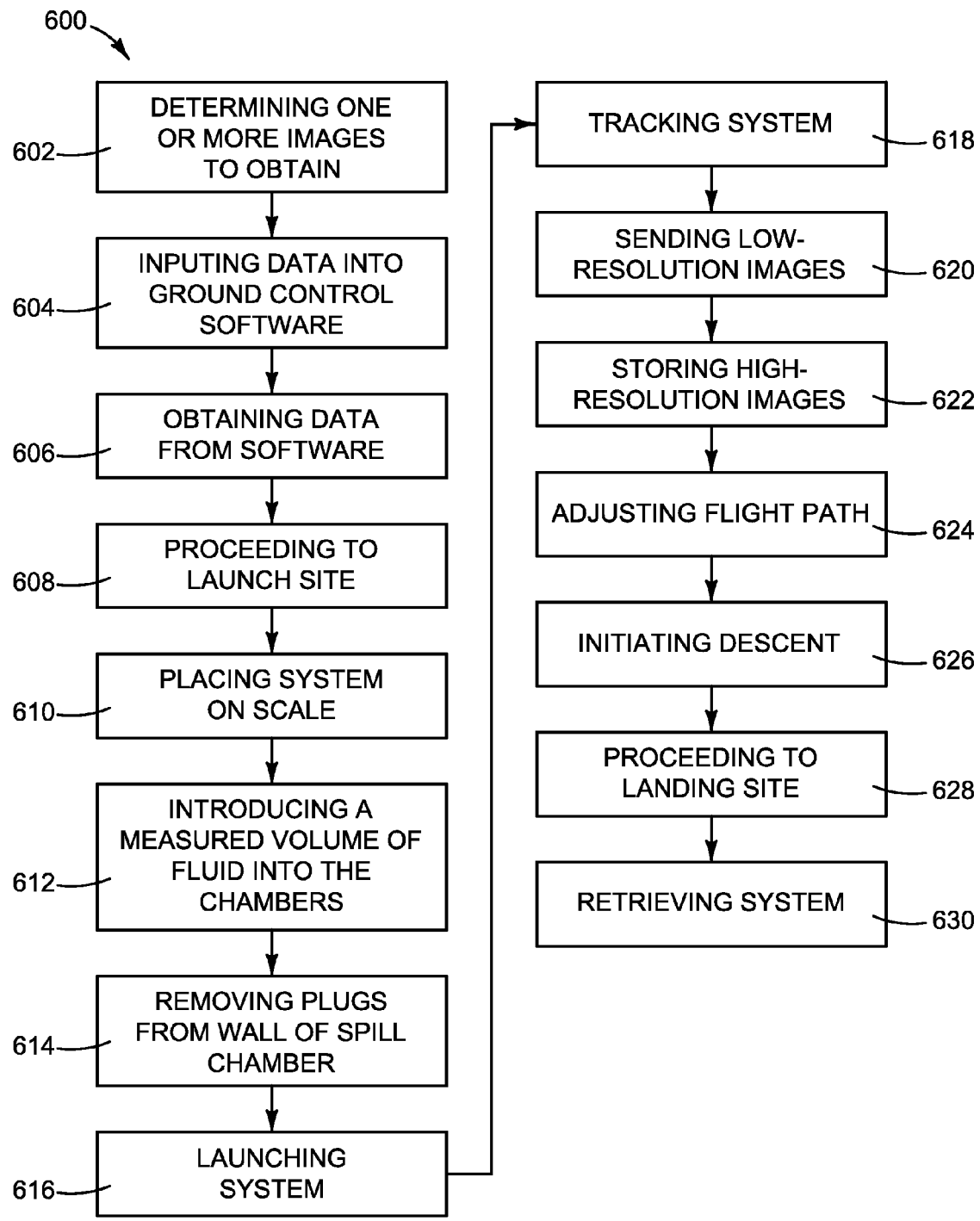
FIG. 8 is a flow chart representation of another exemplary method of obtaining one or more aerial images using a lighter-than-air system.

FIG. 8 is a second exemplary method 600 of obtaining aerial images using a lighter-than-air system (e.g., system 100, system 800, system 900, system 1100, system 1400, system 2100, system 2200). The method 600 is similar to that described above with respect to method 450, except as described below. An initial step 602 comprises determining one or more images to obtain. Another step 604 comprises inputting data into ground control software program. Another step 606 comprises obtaining data from the ground control software program. Another step 608 comprises proceeding to a launch site. Another step 610 comprises placing the system on a scale. Another step 612 comprises introducing a measured volume of fluid into the chambers. Another step 614 comprises removing one or more plugs from the wall of the spill chamber. Another step 616 comprises launching the system. Another step 618 comprises tracking the system. Another step 620 comprises sending low-resolution images. Another step 622 comprises storing high-resolution images. Another step 624 comprises adjusting the flight path. Another step 626 comprises initiating the descent of the system. Another step 628 comprises proceeding to the landing site of the system. Another step 630 comprises retrieving the system.

The step 620 of sending low-resolution images is accomplished by the one or more observation devices 220 obtaining low-resolution images of one or more points of interest and communicating those one or more images to the ground control software, a user, and/or one or more storage devices 270. It is considered advantageous to provide real-time low-resolution images to the ground control software and/or a user to reduce the energy and/or time required to communicate these images.

In addition, because the cruising altitude of the system can be adjusted by the ground control software program, on-board software, and/or a user, low altitude and low revealing angles of georeferenced oblique images can be obtained which provide greater detail of the points of interest being imaged. By providing closer proximity to points of interest, the georeferencing of images and other data are less prone to geometric errors.

The step 622 of storing high-resolution images is accomplished by the one or more observation devices 220 obtaining high-resolution images of one or more points of interest and communicating those one or more images to the one or more storage devices 270. It is considered advantageous to store high-resolution images to the one or more storage devices 270 to reduce the energy required to communicate these images to the ground control software program, and/or a user.

Alternatively, a user can manipulate which images (e.g., low-resolution, high-resolution) are stored in the one or more storage devices 270 and/or communicated to the user and/or ground control software. For example, the ground control software program can be configured to allow a user to select which images to view, high-resolution images or low-resolution images. Optionally, one or more images can be viewed in real time. The type of image not being viewed can be stored in the storage devices 270. Alternatively, both types of images can be stored in the storage device 270, and/or communicated to the ground control software program, storage contained within computer having ground control software thereon, and/or user, regardless of whether or not the images are being viewed in real-time.

An optional step comprises obtaining one or more images once a user, ground control software, and/or on-board software determines that a point of interest has been reached, or the system is near a point of interest. For example, once the system approaches, or arrives, within a range of a defined x, y, and/or z coordinate of a desired point of interest, the system can initiate obtaining one or more images.

An optional step comprises launching one or more systems in combination with an initially launched system, or launching one or more systems separately and subsequent to an initially launched system, to gather aerial images at multiple locations, or of the same location. This optional step can be included not only in methodology 600, but also in methodology 450 and/or methodology 2300, and any other variation of these methodologies. For example, the ground control software program, on-board software, and/or user can determine a number of systems to launch to obtain the desired images of one or more points of interest. The ground control software program, and/or on-board software, can be configured to network the information between the one or more systems prior to, during, or subsequent to launch, ascent, drift, descent, and/or landing.

For example, the ground control software program can be configured to provide data relating to strategic sequencing of launches for more than one system to accomplish coverage over one or more particular locations and/or points of interest. A first "scout" system at an upwind perimeter of the coverage area can be launched and communicate data, as described herein (e.g., low-resolution images, location data), which can be used by the ground control software program, on-board software, and/or a user to determine the traveled course of the system and its speed over the ground. This data can then be used to determine the launch location of one or more subsequent systems, which in turn provide data for further subsequently launched systems. All data points can be combined to provide optimal launch sites and planned ascent, drift, and/or descent for one or more additional systems (e.g., fleet of systems). Each of the systems can be delivered to its launch site by all terrain ground vehicles, or other vehicles, equipped with GPS, so that the time between the ground vehicle is dispatched and the system is launched is minimized.

The systems and methods described herein advantageously provide for obtaining aerial images at lower altitudes with greater detail and viewing angles. The data obtained during the flight of the system by the one or more devices housed within the instrument case can provide coordinates for points within an image, which can be corrected by software, if necessary, that compares the location of the system when the image was obtained and dimension data associated with the image of a known monument placed at the known launch site, or otherwise, to the actual location and dimensional data. For example, image data (e.g., triaxial lens inclination, declination, angular measurements) can be readjusted in postproduction according to images obtained of a monument of known dimension placed at the launch site, or other location. This information can be used with other data provided by the devices within the instrument case (e.g., sensing devices 230) to calculate look angles and focal axes of the lenses when the images were obtained. The system can provide an initial image of a monument at the launch site, or other location, to the ground control software program, on-board software, and/or a user that can used to recalibrate georeferencing algorithms. Depending on the accuracy requirements required for a project, the image data can be combined with other data from preexisting coordinate monuments on the ground. This results in obtaining data for positional calculations currently in use to deduce the geo-reference or ground coordinates of image portions or pixels.

For example, the set angle and focal length of the lenses is combined with the inclinometric readings derived from triaxial angle sensors within the instrument case and are transmitted to the ground control software program, on-board software, and/or a user. This information can then be utilized to quilt pixels into georeferenced image arrays, which can be supplied to users via the Internet or otherwise.

An optional step comprises transmitting the information (e.g., data, images) obtained by the system (e.g., one or more devices housed within instrument case) to the Internet or other device. For example, a server, client, and/or web site can be configured to receive data from a user, ground control software, on-board software, and/or one or more communication devices, relating to past, present, and future system flights and publish this data on a web page. In addition, the server, client, and/or website can be configured to receive and publish a real-time stream to allow Internet users to view the information (e.g., images, data) being captured during flight by receiving data received by a user, ground control software, on-board software, and/or one or more communication devices.

While various steps, alternative steps, and optional steps have been described above with respect to obtaining aerial images, these steps, alternative steps, and optional steps can be included in, accomplished concurrently with, and/or accomplished in the alternative to, the methodologies, steps, alternative steps, and/or optional steps described above with respect to method 450 and/or below with respect to method 2300.

Optionally, any of the systems (e.g., system 100, system 800, system 900, system 1100, system 1400, system 2100, system 2200) described herein can comprise one or more thrusters (e.g., $CO_2$ cartridges, pressurized cartridges). The one or more thrusters can be attached to any portion of the systems described herein to provide maneuverability and/or stabilization of the system. For example, with respect to the system 100, one or more thrusters can be attached to the balloon 105, instrument case 200, and/or any portion of the system 100. In another example, with respect to system 800, system 900, and/or system 1100, one or more thrusters can be disposed on any portion of the system (e.g., first balloon, second balloon, third balloon, thruster, instrument case). The thrusters can be adapted to provide thrust in a single direction and/or in multiple directions.

Figure 9:
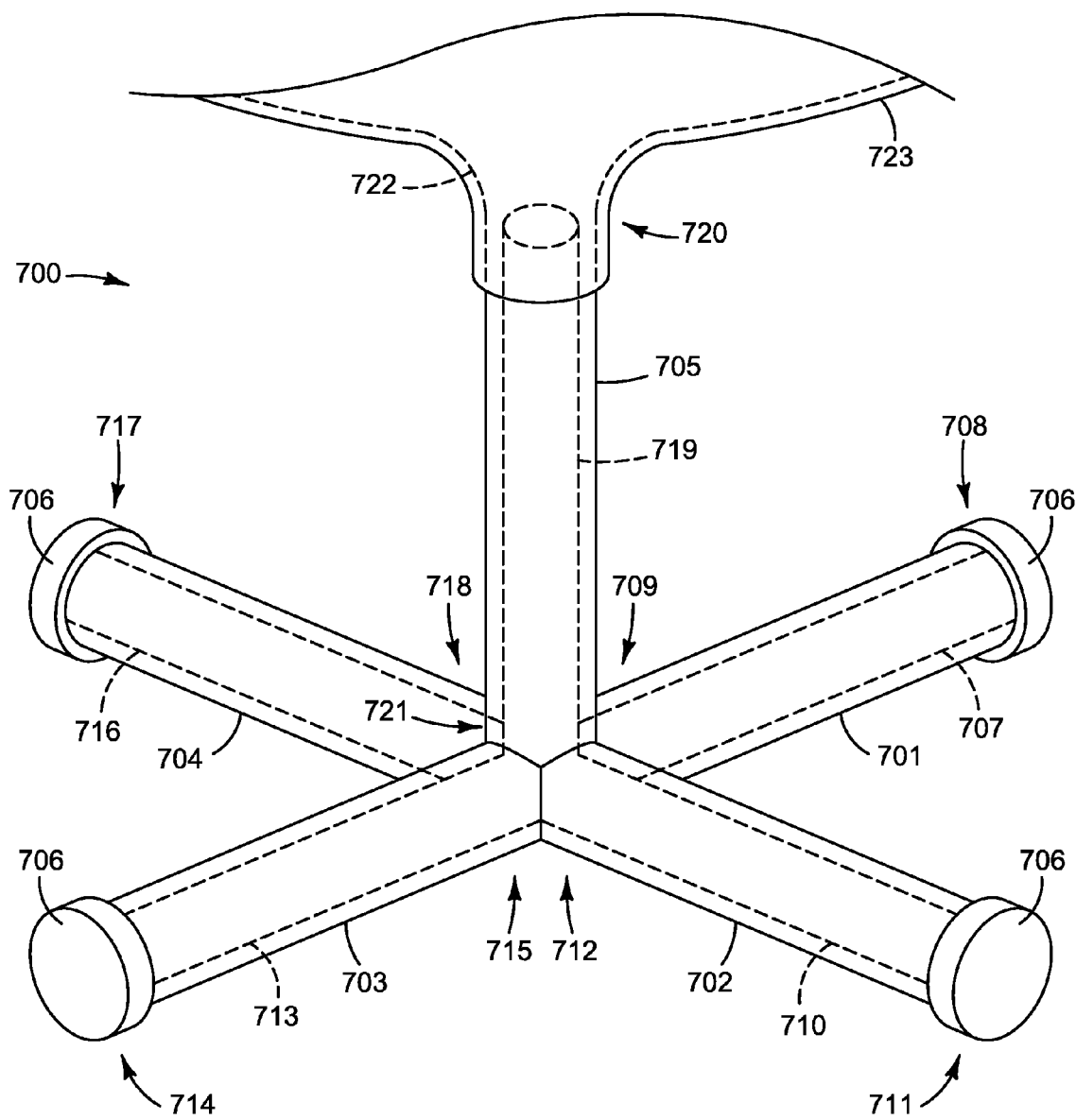
FIG. 9 is a perspective view of an exemplary thruster.

FIG. 9 illustrates a structural arrangement of an exemplary thruster 700 that can be utilized by any of the systems described herein to provide thrust. The thruster 700 comprises a first tubular member 701, a second tubular member 702, a third tubular member 703, a fourth tubular member 704, a fifth tubular member 705, and membranes 706. The first tubular member 701 defines a passageway 707 that extends between the first end 708 and the second end 709 of the first tubular member 701. The second tubular member 702 defines a passageway 710 that extends between the first end 711 and the second end 712 of the second tubular member 702. The third tubular member 703 defines a passageway 713 that extends between the first end 714 and the second end 715 of the third tubular member 703. The fourth tubular member 704 defines a passageway 716 that extends between the first end 717 and the second end 718 of the fourth tubular member 704. The fifth tubular member 705 defines a passageway 719 that extends between the first end 720 and the second end 721 of the fifth tubular member 705. Alternatively, the first tubular member 701 and the third tubular member 703 and/or the second tubular member 702 and fourth tubular member 704 can be formed as a single tubular member, or an integrated unit. In a further alternative, each of the tubular members can be formed as an integrated unit.

The first end 720 of the fifth tubular member 705 is adapted to be attached to within an opening 722 defined by a wall of a balloon 723 such that passageway 719 is in fluid communication with the chamber of the balloon 723. It is considered advantageous to configure the first tubular member 701 at a right angle to the second tubular member 702 and the fourth tubular member 704 in a first plane, the second tubular member 702 at a right angle to the third tubular member 703 in the first plane, and the fourth tubular member 704 at a right angle to the third tubular member 703 and the first tubular member 701 in the first plane. In addition, it is considered advantageous to configure the fifth tubular member 705 at an angle substantially perpendicular, or perpendicular, to the first plane containing the first tubular member 701, second tubular member 702, third tubular member 703, and the fourth tubular member 704.

Each of the second ends 709, 712, 715, 718, and 721 are attached to one another to allow for each of the passageways 707, 710, 713, 716, and 719 to be in fluid communication with one another. Each of the first tubular member 701, second tubular member 702, third tubular member 703, and fourth tubular member 704 comprise a membrane 706 disposed on each first end 708, 711, 714, 717. A membrane 706 can be stretched around the outer perimeter of the tubular member and attached to each first end 708, 711, 714, 717 using an adhesive, O-ring, weld, or a threaded cap that mates with a threaded first end. The membrane 706 can be formed of any suitable material (e.g., polyester films (e.g., biaxially-oriented polyethylene terephthalate (Mylar®), latex) that allows for sealing the tubular member and which can be perforated to release fluid under pressure. A perforator housed within one or more of the first tubular member 701, second tubular member 702, third tubular member 703, fourth tubular member 704, and/or fifth tubular member 705, or on the exterior of the thruster 700, and in communication with one or more devices within the instrument case, provides a means for perforating membrane 706 and releasing pressurized fluid. The perforator can comprise any suitable means of performing perforation of the membrane, such as a mechanical device (e.g., a servo having a needle, and/or hot wire, disposed on a portion thereof), a thermal device (e.g., heated coil, heated conductor), an optical device (e.g., laser), and/or a shape memory actuator (e.g., muscle wire) which moves from a first curved configuration to a second straight configuration upon receipt of a signal to cause penetration of the membrane. Thus, upon receipt of a signal from one or more devices within the instrument case, a user, on-board software, and/or ground control software, the perforator can be activated to perforate one or more of the membranes 706 disposed on the first end of each of the first tubular member 701, second tubular member 702, third tubular member 703, and/or fourth tubular member 704 to provide thrust and/or descent.

The tubular members can comprise any suitable length, diameter, and cross-section. Cross-sections considered suitable include, but are not limited to, triangular, square, hexagonal, and any other suitable geometric shape. Examples of suitable diameters and/or lengths for the tubular members include, but are not limited to, a fifth tubular member having a 2" outer diameter and each of the first tubular member, second tubular member, third tubular member, and fourth tubular member having a 1.0-inch (2.54 cm) outer diameter and a length of 1.0-inch (2.54 cm) from the first end to the second end. While a particular structural arrangement for a tubular member has been described, other structural arrangements (e.g., length, diameters) are considered suitable, and skilled artisans will be able to select a particular structural arrangement based on various considerations, such as the desired thrust of the system. For example, a first tubular member and a third tubular member can be stacked on a second tubular member and a fourth tubular member and lay in a plane parallel to a plane containing the second tubular member and fourth tubular member.

In use, when the balloon 723 is under pressure, descent of the system and/or thrust can be achieved in a variety of ways using thruster 700, depending on the number of membranes 706 that are opened. For example, each membrane 706 attached to the first tubular member 701, second tubular member 702, third tubular member 703, and fourth tubular member 704 can be opened independent of one another to provide thrust in a single direction. Alternatively, multiple membranes 706 can be opened simultaneously to provide thrust in a variety of different directions. For example, the membrane 706 disposed on the first end 708 of the first tubular member 701 can be opened simultaneously with the membrane 706 disposed on the first end 711 of the second tubular member 702, the membrane 706 disposed on the first end 708 of the first tubular member 701 can be opened simultaneously with the membrane 706 disposed on the first end 717 of the fourth tubular member 704, the membrane 706 disposed on the first end 714 of the third tubular member 703 can be opened simultaneously with the membrane 706 disposed on the first end 711 of the second tubular member 702, and/or the membrane 706 disposed on the first end 714 of the third tubular member 703 can be opened simultaneously with the membrane 706 disposed on the first end 717 of the fourth tubular member 704. While various examples of opening the membranes 706 have been described, other variations are considered suitable, and skilled artisans will be able to select a particular variation based on various considerations, such as the desired directionality of the system. Alternatively, the first end 720 of the fifth tubular member 705 can be attached to a pressurized container (e.g., $CO_2$ cartridge) to provide thrust.

Alternative to providing membranes 706, any suitable valve described herein that can be activated by a signal from one or more devices within the instrument case, a user, on-board software, and/or ground control software, to allow for fluid to pass through the valve can be disposed on a tubular member.

It is considered advantageous to include an internal measurement unit (IMU) in the instrument case, and in communication with one or more of the devices housed within the instrument case, when one or more thrusters (e.g., thruster 700) are being utilized. The IMU can comprise any suitable device configured to provide one or more data points (e.g., orientation of system, orientation of tubular members of thruster, orientation of thruster) to a user, ground control software, on-board software, and/or one or more lighter-than-air units. The information provided by the IMU can be utilized by a user, ground control software, and/or on-board software to determine the lighter-than-air systems current orientation and use this information to determine what number of thrusters are required to be opened, and/or what order to open the thruster valves, to provide a planned descent.

Examples of suitable IMUs include, but are not limited to, IMUs that comprise a triple-axis accelerometer, triple-axis gyroscope, and/or a triple-axis magnetometer. While a particular IMU has been described, other IMUs are considered suitable, and skilled artisans will be able to select a suitable IMU for a particular embodiment based on various considerations, such as the type of thruster being utilized.

Optionally, a spring-loaded lid can be disposed within passageway 719, which has a first closed configuration and a second open configuration. The lid can be adapted to move from the first configuration to the second configuration when at least one membrane 706 is perforated. In addition, the lid can be adapted to move from the second configuration to the first configuration when a desired amount of fluid (e.g., 25%) remains in the chamber of balloon 723.

Figure 10:
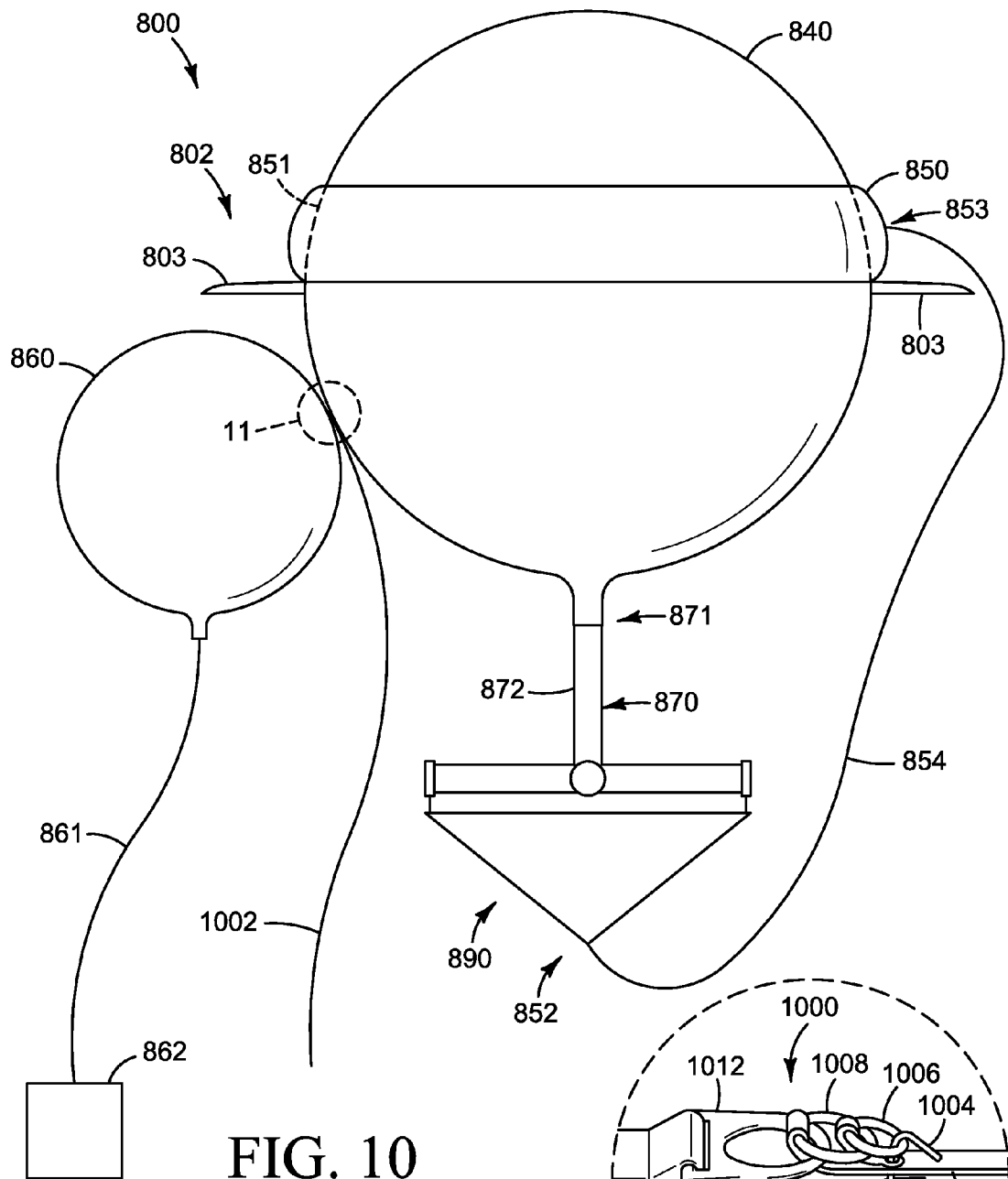
FIG. 10 is a side view of another exemplary lighter-than-air system.

FIG. 10 illustrates another lighter-than-air system 800 that is similar to lighter-than-air system 100, except as described herein. Therefore, all of the various elements, components, devices, structural arrangements, and/or configurations described above with respect to the system 100 are applicable to system 800, unless the context indicates otherwise. The system 800 comprises an airship 802, thruster 870 (e.g., thruster 700), and an instrument case 890. The airship 802 comprises one or more fins 803, a first balloon 840, a second balloon 850, and a third balloon 860.

The first balloon 840 has a wall that defines a cruise chamber, as described herein. The second balloon 850 has a wall that defines a reserve chamber, as described herein. The third balloon 860 has a wall that defines a spill chamber, as described herein. The second end 871 of the fifth tubular member 872 of the thruster 870 is attached within an opening defined by the first balloon 840. The instrument case 890 is attached to a portion of the exterior surface of the thruster 870, such that it is disposed below the thruster 870.

The second balloon 850 comprises a structural arrangement (e.g., circular) that defines an opening 851 through which the first balloon 840 is disposed. A friction fit between the first balloon 840 and the second balloon 850 can be accomplished by inserting the first balloon 840 into the opening 851 of the second balloon and inflating the first balloon 840 and the second balloon 850. During ascent, drift, and/or descent, as the fluid within the first balloon 840 is expelled through thruster 870, or otherwise, the overall size of the first balloon 840 will decrease, thereby decreasing the friction fit between the first balloon 840 and the second balloon 850 and eventually releasing the second balloon 850 from the first balloon 840. This advantageously softens the landing of the system 800 by allowing the first balloon 840 to provide the landing platform. In addition, this creates a larger target in the event that the third balloon 860 needs to be utilized to capture and/or retrieve the system 800. For example, when the first balloon 840 moves to a deflated, or substantially deflated, configuration, the second balloon 850 having the first end 852 of tether 854 attached to the base of the instrument case 890 and the second end 853 of tether 854 attached to the second balloon 850, provides lift to the first balloon 840, thruster 870, and instrument case 890. When deflation of the first balloon 840 occurs, the first balloon 840 becomes detached from the second balloon 850 and the first balloon 840, thruster 870, and instrument case 890 invert and allow the first balloon 840 to act as a landing platform.

Figure 11:
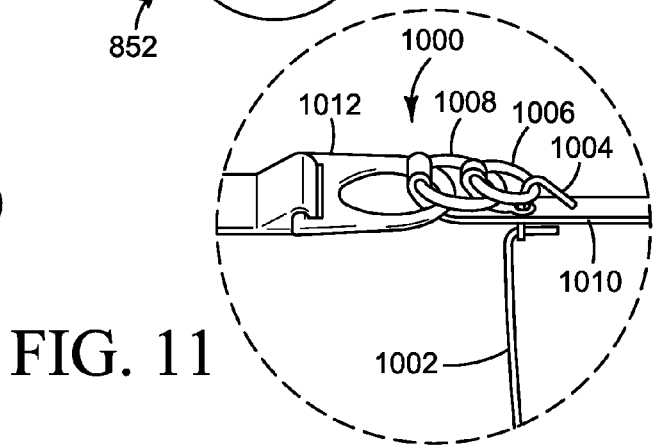
FIG. 11 is a magnified view of area 11 indicated in FIG. 10.

The third balloon 860 is attached to the first balloon 840 using a release system 1000, as illustrated in FIG. 11. Any suitable release system can be utilized to releasably attach the third balloon 860 to the first balloon 840 and/or second balloon 850 and needs only to provide a mechanism to allow for ascent of the system and for providing releasable attachment between the third balloon 860 and the remainder of the system 800 during flight. An example system considered suitable includes, but is not limited to, using a release system similar, or identical to, those used on parachutes for deployment. It is considered advantageous to include a third balloon 860 that can be releasably attached to the airship 802 to optionally eliminate the need for including one or more one-way and/or bi-directional valves disposed within the wall of the third balloon 860.

The thruster 870 is similar to that described above with respect to FIG. 9, except as described below. The second end 871 of the fifth tubular member 872 is attached to the first balloon 840 such that fluid contained within the chamber of the first balloon 840 is in fluid communication with the passageways defined by the first tubular member, second tubular member, third tubular member, fourth tubular member, and fifth tubular member of the thruster 870. Attachment of the second end 871 of the fifth tubular member 872 to the first balloon 840 can be accomplished in a variety of manners. Examples of methods of attaching a tubular member to a balloon include, but are not limited to, using an adhesive, a threaded component, mechanical fasteners, an O-ring, and/or welding.

The instrument case 890 is attached to the thruster 870. Examples of methods of attaching the instrument case 890 to the thruster 870 include, but are not limited to, using an adhesive, a threaded component, mechanical fasteners, welding, and/or molding the components as an integral unit.

Any of the balloons cruise balloon, reserve balloon, spill balloon) can optionally include one or more color-coded sections (e.g., quadrants). The material forming the balloon can comprise a specified color or a color may be added to each section using any suitable method (e.g., painting). Each section can comprise a different color (e.g., quadrant), or two colors can be provided in adjacent sections. Each section (e.g., quadrant) can be aligned with the directionality of an opening of a thruster (e.g., thruster 700, thruster 870, thruster 970, thruster 1200, thruster 1300, thruster 1500, thruster module 1800) to provide a user with the ability to discern the orientation of each thruster opening. This is considered advantageous at least because it allows a user to determine which opening needs to be activated (e.g., by perforating a membrane) to provide desired directionality thrust to a system.

Alternative, or in addition, to including color-coded sections quadrants), any of the balloons (e.g., cruise balloon, reserve balloon, spill balloon) can include one or more airfoils positioned along one or more sections of the balloon. Each of the airfoils can be color-coded and be positioned on a balloon in a section that is aligned with an opening of a thruster. For example, an airfoil can be positioned on each quadrant of a balloon such that it is aligned with the directionality of an opening of a thruster (e.g., thruster 700, thruster 870, thruster 970, thruster 1200, thruster 1300, thruster 1500, thruster module 1800). The airfoil can have any suitable color coding and structural configuration. For example, each airfoil can comprise a different color (e.g., quadrant), or two colors can be used for adjacent airfoils (e.g., quadrants). For example, an airfoil can have a first end attached to the top of the balloon, or a portion near the top of the balloon, and a second end attached to the bottom of the balloon, or a portion near the bottom of the balloon. Other example structural configurations for an airfoil considered suitable include, but are not limited to, airfoils that are flat, or become flat upon the deflation of a balloon, airfoils that billow, or billow upon the deflation of a balloon, or airfoils disposed at the top, middle, or bottom of a balloon.

FIG. 11 illustrates an exemplary release system 1000 that comprises a release line 1002, release pin 1004, a first hoop 1006, a second hoop 1008, a shaft 1010, and a third hoop 1012. The release line 1002 has an end attached to the release pin 1004. The first hoop 1006 and the second hoop 1008 are attached to the first balloon 840 by shaft 1010. The shaft 1010 defines an aperture that extends through the thickness of the shaft 1010 that is adapted to receive a length of release pin 1004. The third hoop 1012 is attached to the third balloon 860 and is adapted to receive the second hoop 1008. In use, the second hoop 1008 is passed through the third hoop 1012 and the first hoop 1006 is passed through the second hoop 1008. The release pin 1004 is inserted through the aperture of the shaft 1010 and over or around a portion, or the entirety, of the first hoop 1006. Thus, a first configuration is described and illustrated in which the first balloon 840 is releasably attached to the third balloon 860. In a second configuration, the release pin 1004 is pulled out of the aperture defined by the shaft 1010 by release line 1002 and the third balloon 860 becomes free of the first balloon 840.

In the illustrated embodiment, the first end of a tether 861 is attached to the third balloon 860 and the second end of the tether is attached to a retrieval device 862 (e.g., wench, user, fishing pole). The tether 861 is used to guide the system 800 during ascent, or alternatively, the tether 861 is used to guide the system 800 during flight. When a desired altitude is reached, release system 1000 can be activated to release the third balloon 860 from the system 800, this can be accomplished by pulling release line 1002 and removing pin 1004 from the aperture in shaft 1010. The third balloon 860 can then be guided to the ground using the tether 861 and the retrieval device 862.

Alternative to using release system 1000, the third balloon 860 can be attached to a portion of the first balloon 840 using one or more hook-and-loop fasteners (e.g., Velcro®), mechanical fasteners, straps, wire, string, adhesive, sonic welds, or any other suitable form of attachment which can be disengaged upon the application of pressure (e.g., by yanking on the tether 861 connected to the third balloon 860, activating the ground retrieval device 862).

Optionally the system 800 can be retrieved using various methods. For example, the third balloon 860 can ascend and be positioned through the opening 851 defined by the second balloon 850, and the system 800 subsequently retrieved. In another example, the third balloon 860 attached to tether 861 and retrieval device 862, can ascend to cross tether 861 and tether 854 attached at one end to the second balloon 850 and at another end to a portion the instrument case 890, and/or any other component of the system 800 (e.g., thruster 870). To accomplish retrieving the system 800 the third balloon 860 can be launched upwind so that, for example, tether 861 and tether 854 can cross. Subsequently, retrieval device 862 can be activated to tow in the system 800. A further option includes adding one or more hooks, mesh material, or other devices, to tether 861 and/or the third balloon 860 to gather and/or attach tether 861 to tether 854, the third balloon 860 and the second balloon 850, and/or any other portion of the system 800 to tether 861 and/or the third balloon 860.

Examples of suitable volumes, sizes and shapes for each of the first balloon 840, second balloon 850, and third balloon 860 include, but are not limited to, a first balloon 840 having a volume of about 707,700.0 cubic centimeters, a diameter of about 110.6 cm, and a spherical shape; a second balloon 850 having a volume of about 303,300 cubic centimeters, a diameter of about 347.45×33.34 cm, and a cylindrical (e.g., donut) shape; and a third balloon 860 having a volume of about 303,300 cubic centimeters, a diameter of about 347.45×33.34 cm, and a cylindrical (e.g., hook) shape. While particular volumes, sizes, and shapes have been described, other volumes, sizes, and shapes are considered suitable, and skilled artisans will be able to select a suitable volume, size, and shape based on various considerations, such as the total weight of the system. For example, the size of each balloon will be determined by the amount of fluid introduced into the chamber of the balloon, which is determined based on the total weight of the system.

Optionally, the airship 802 can comprise the third balloon 860 and a single other balloon which is configured to contain 100% of the neutral buoyancy of the system.

The tethers described herein (e.g., 841, 861, 2106) can comprise any material that is suitable for purposes set forth herein. Examples of suitable materials include, but are not limited to, nylon, polyvinyl chloride (PVC), rope, urethane, polyethylene (e.g., Spectra® fiber), and aircraft cable. The length of the tether can vary. Examples of suitable lengths for tethers include, but are not limited to, lengths from about 5.0 feet (1.524 meters) to about 200.0 feet (60.96 meters). Additional examples of suitable lengths for tethers include, but are not limited to, lengths from about 9.0 feet (2.743 meters) to about 15.0 feet (4.572 meters), and lengths from about 50.0 feet (15.24 meters) to about 150 feet (45.72 meters). Another example of a suitable length for a tether includes, but is not limited to, a tether with a length of about 750 feet (228.60 meters). While particular materials and lengths have been described, any suitable material and/or length can be utilized, and skilled artisans will be able to select a suitable material and length for a tether based on various considerations, such as the desired launching site of a system.

Figure 12:
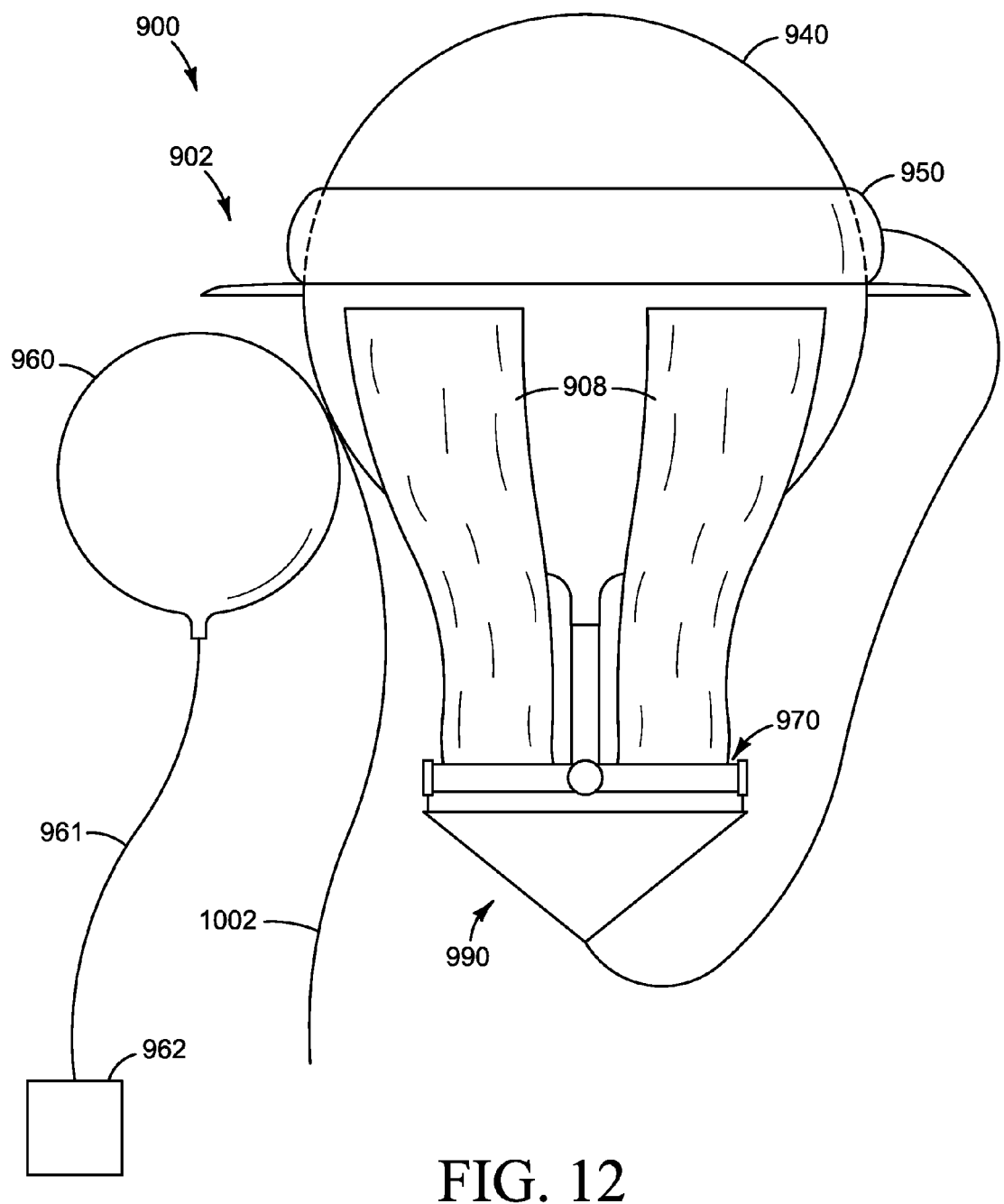
FIG. 12 is a side view of another exemplary lighter-than-air system.

FIG. 12 illustrates another exemplary lighter-than-air system 900, which is similar to lighter-than-air system 800, except as described. Reference numbers in FIG. 12 refer to the same structural element or feature referenced by the same number in FIG. 11, offset by 100. Thus, the system 900 comprises an airship 902, a thruster 970, and an instrument case 990. The airship 902 comprises a first balloon 940, a second balloon 950, and a third balloon 960.

In the illustrated embodiment, the system 900 includes one or more sheets 908 that are attached to the first balloon 940 and thruster 970. Sheets 908 can be attached to the first balloon 940 and thruster 970 using any suitable method of attachment, such as those described herein (e.g., hook and look fasteners, adhesive). Sheets 908 can comprise any suitable dimensions and be formed of any suitable material, and skilled artisans will be able to select a suitable set of dimensions and material for a sheet based on various considerations, such as the desired flight path of the system.

Upon the third balloon 960 being removed from the system 900 (e.g., by pulling on tether 961, activating release system 1000), sheets 908 acts as a sail for system 900 by catching wind and providing thrust to the system 900. Sheets 908 can be attached at any suitable location to achieve thrust capabilities. It is considered advantageous to attach the sheet 908 at one or more of its corners to the first balloon 940 and thruster 970. While sheets 908 have been described as attached to the first balloon 940 and thruster 970, any suitable number of sheets can be attached to any suitable portion of a lighter-than-air system, and skilled artisans will be able to select suitable configuration for a sheet based on various considerations, such as the desired amount of wind to be captured.

Figure 13:
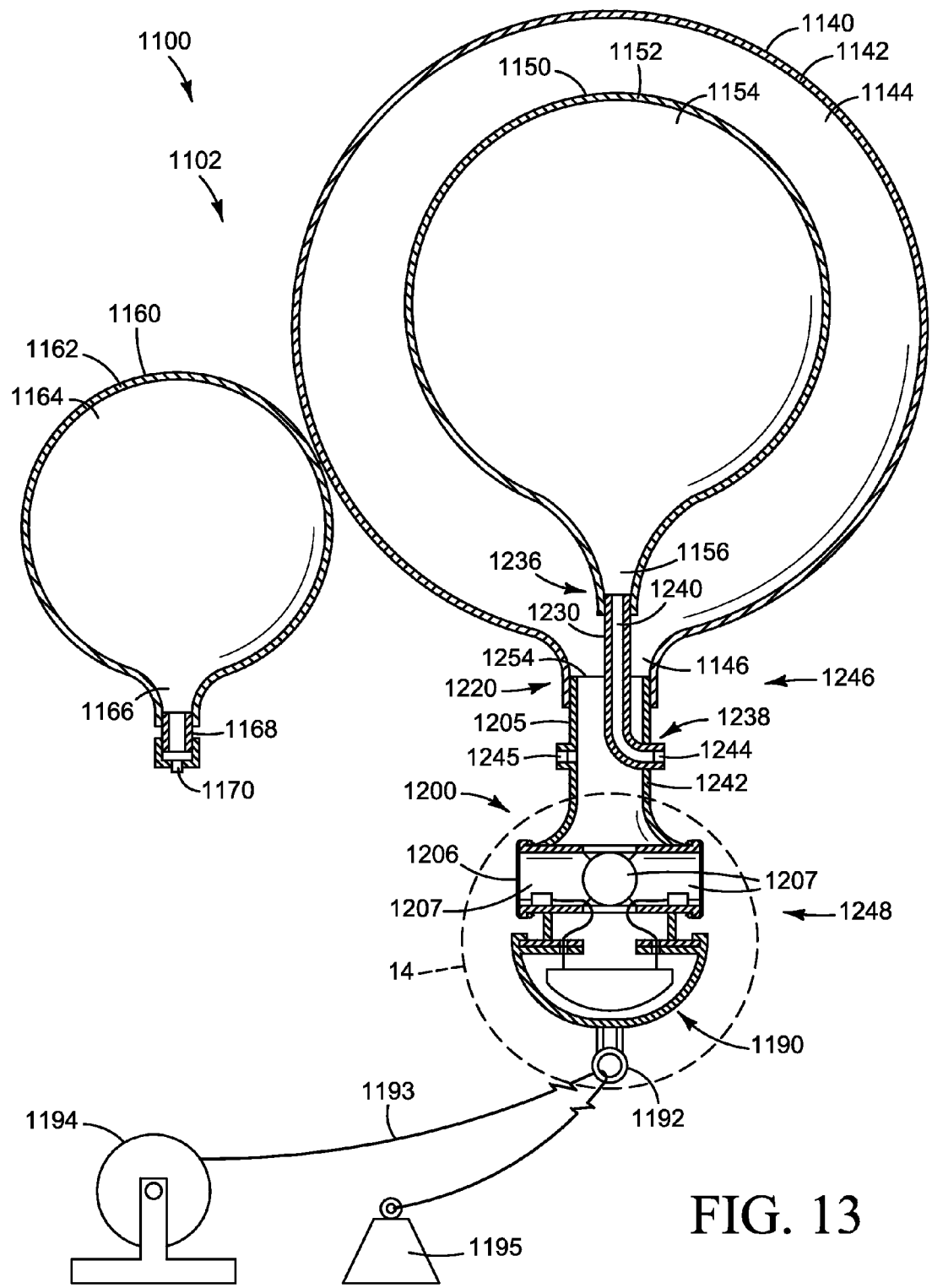
FIG. 13 is a cross sectional view of another exemplary lighter-than-air system.

FIG. 13 illustrates another exemplary lighter-than-air system 1100, which is similar to lighter-than-air system 800, except as described. Reference numbers in FIG. 13 refer to the same structural element or feature referenced by the same number in FIG. 11, offset by 300. Thus, the system 1100 comprises an airship 1102, an instrument case 1190, and a thruster 1200. The airship 1102 comprises a first balloon 1140, a second balloon 1150, and a third balloon 1160. Thruster 1200 is similar to thruster 700, except as described. Reference numbers in FIG. 13 refer to the same structural element or feature referenced by the same number in FIG. 7, offset by 500.

Each of the first balloon 1140, second balloon 1150, and third balloon 1160 has an inflated configuration and a deflated configuration. FIG. 13 illustrates each of the first balloon 1140, second balloon 1150, and third balloon 1160 in the inflated configuration. The first balloon 1140 has a wall 1142 that defines a cruise chamber 1144 and an opening 1146 that extends through the wall 1142 of the first balloon 1140 to provide access to cruise chamber 1144. The second balloon 1150 has a wall 1152 that defines a reserve chamber 1154 and an opening 1156 that extends through the wall 1152 of the second balloon 1150 to provide access to reserve chamber 1154. The third balloon 1160 has a wall 1162 that defines a spill chamber 1164 and an opening 1166 that extends through the wall 1162 of the third balloon 1160 to provide access to spill chamber 1164.

Figure 14:
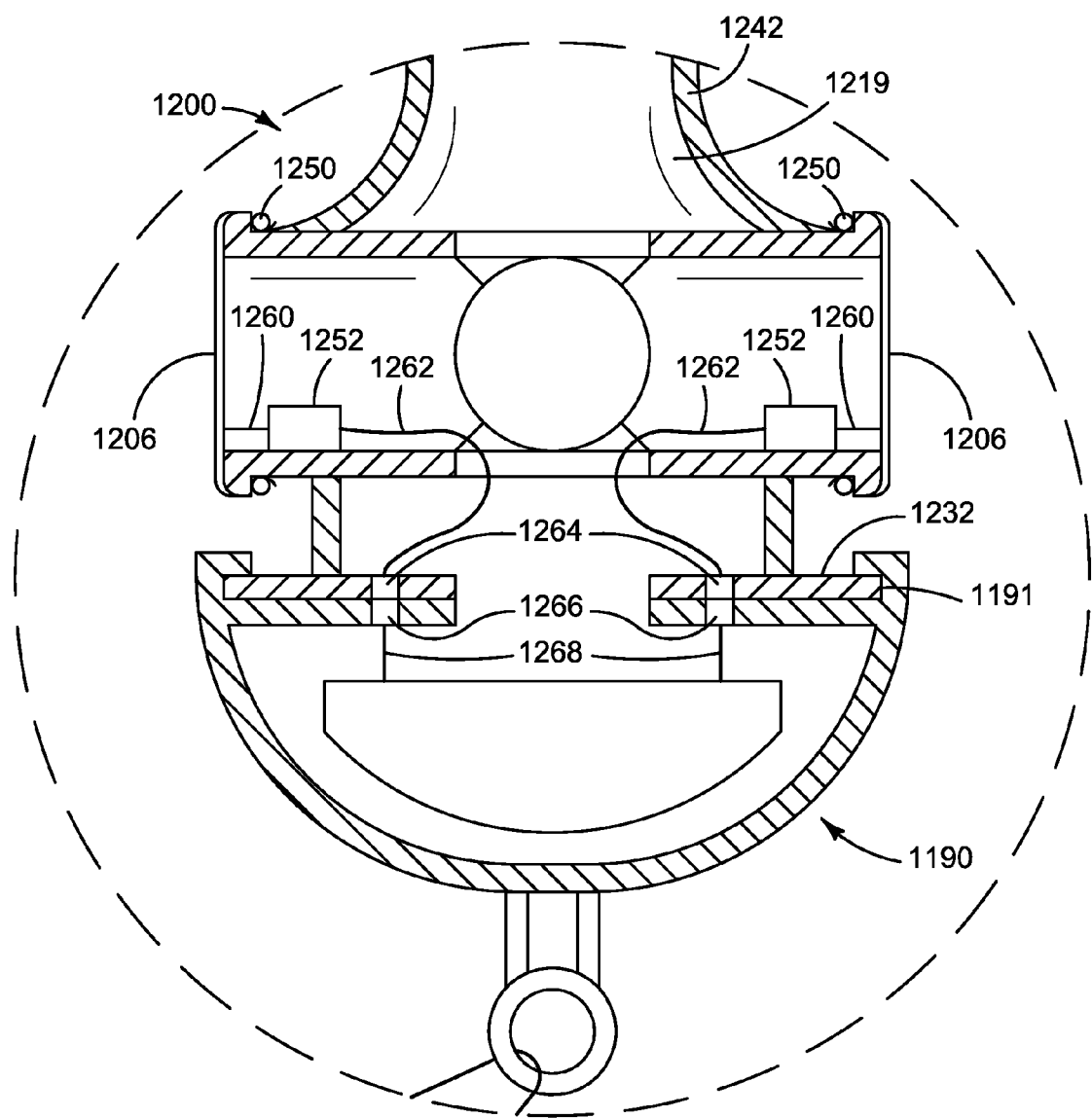
FIG. 14 is a magnified view of area 14 indicated in FIG. 13.

In the illustrated embodiment, the second balloon 1150 is disposed within the chamber 1144 of the first balloon 1140 and the third balloon 1160 is releasably attached to the first balloon 1140. Thruster 1200, also illustrated in FIG. 14, is similar to thruster 700, except that includes an additional tubular member 1230 disposed within tubular member 1205, brackets 1232 that extend from the base of thruster 1200, a plurality of membranes 1206, a plurality of O-rings 1250, and a plurality of perforators 1252. In addition, instrument case 1190 defines tracks 1191 on the upper surface 1192 of the instrument case 1190 that are complementary to brackets 1232. Brackets 1232 provide a mechanism for removably attaching thruster 1200 to instrument case 1190 by sliding the brackets 1232 within tracks 1191.

The first end 1220 of tubular member 1205 is attached within the opening 1146 defined by the first balloon 1140 such that chamber 1144 and passageway 1219 are in fluid communication. Tubular member 1230 has a first end 1236, a second end 1238, and defines a passageway 1240 that extends between an opening on the first end 1236 and an opening on the second end 1238. The first end 1236 of tubular member 1230 is attached within the opening 1156 defined by the second balloon 1150 such that chamber 1154 and passageway 1240 are in fluid communication. The second end 1238 is disposed through the wall 1242 of tubular member 1205 and has a valve 1244 disposed thereon. Thruster 1200 also includes valve 1245 that extends through the wall 1242 of tubular member 1205 and is in fluid communication with chamber 1144. Valves 1244 and 1245 can comprise any valve described herein and can be positioned at any suitable location on thruster 1200. Skilled artisans will be able to select a suitable location to position one or more valves on a thruster according to a particular embodiment based on various considerations, such as the structural arrangement of the thruster.

Thus, thruster 1200 comprises a tubular member having a first portion 1246 and a second portion 1248. The first portion 1202 defines an opening 1254 in a first plane that is in communication with the chamber 1144 of the first balloon 1140. The second portion 1248 defines a plurality of openings 1207, where at least one of the plurality of openings 1207 is defined in a second plane different from the first plane. Optionally, each of the plurality of openings 1207 can be defined in a separate plane that is different from first plane 1255 (e.g., as shown in FIG. 9).

At least one of the plurality of membranes 1206 is disposed over each of the plurality of openings 1207 defined on the second portion 1248 of the thruster 1200 using an O-ring 1250. Each of the plurality of membranes 1206 is adapted to move from a first configuration in which the membrane seals the opening defined on the second portion 1248 of the thruster 1200 to a second configuration in which the membrane allows for fluid to pass through the opening defined on the second portion 1248 of the thruster 1200, and/or through the membrane. The term "seals" refers to the ability of an element to seal, or substantially seal, another element, component, and/or feature.

Each of the plurality of perforators 1252 is in communication with one membrane of the plurality of membranes 1206. Each of the plurality of perforators 1252 comprises a mechanism for receiving a signal and providing current to a length of a conductive material 1260 (e.g., a conductive wire) that is adapted to receive a current and move from a first configuration in which the length of conductive material is at a first temperature and a second configuration in which the length of conductive material is at a second temperature. The second temperature being greater than the first temperature. Thus, a mechanism for perforating each of the plurality of membranes 1206 is described. Alternative to utilizing a length of conductive material, a perforator can comprise a servo and a puncturing structure (e.g., pin).

Each of the plurality of perforators 1252 is in communication with one or more of the devices housed within instrument case 1190 via a first signal carrier 1262, a first contact 1264, a second contact 1266, and a second signal carrier 1268. The first signal carrier 1262 has a first end in communication with the perforator 1252 and a second end in communication with the first contact 1264. The first contact 1264 is located on, and extends through, a portion of bracket 1232. The second contact 1266 is located on, and extends through, the roof of instrument case 1190. The second signal carrier 1268 has a first end in communication with the second contact 1266 and a second end in communication with one or more of the devices housed within instrument case 1190 (e.g., circuit board 210, energy storage devices 280).

While a first signal carrier 1262, a first contact 1264, a second contact 1266, and a second signal carrier 1268 have been described and illustrated, any suitable number of signal carriers and contacts and any suitable method of sending a signal to a perforator and activating a perforator are considered suitable, and skilled artisans will be able to select a suitable number of signal carriers and contacts to include in a lighter-than-air system based on various considerations, such as the number of membranes included in a thruster. Example number of signal carriers and contacts considered suitable include but are not limited to one, two, three, four, five, six, and any other suitable number. An example alternative method considered suitable to send a signal to a perforator and activating a perforator includes, but is not limited to, omitting the inclusion of a first and second contact and including a single signal carrier that provides a signal from one or more device housed within an instrument case to a perforator. Another example method considered suitable comprises wirelessly sending a signal to a perforator and activating the perforator.

Each of the plurality of perforators 1252 is in communication with one or more devices within instrument case 1190 such that activation of each of the perforators can be accomplished by one or more of the devices housed within instrument case 1190 receiving a signal from a user, ground control software, onboard software, or otherwise (e.g., telephonically, through wireless device (e.g., iPad®, iPhone®), network, remotely activated switch). For example, a remotely activated switch harness can be provided which creates circuits to each of the perforators causing each perforator to send a current through a length of conductive material upon receipt of a signal. This structural arrangement advantageously provides a mechanism for providing releasable attachment between the thruster 1200 and instrument case 1190 such that the first contact 1264 and the second contact 1266 provide communication between the plurality of perforators 1252 and one or more of the devices housed within the instrument case 1190.

Each of the first signal carrier 1262, first contact 1264, second contact 1266, and second signal carrier 1268 can be any suitable device and/or material that is adapted to carry a signal to and/or from each of the plurality of perforators 1252, and skilled artisans will be able to select a suitable signal carrier based on various considerations, such as the type of signal to be carried. Example signal carriers considered suitable include, but are not limited to, conductive material, conductive wire, coax cable, and the like.

Thruster 1200 can be formed using any suitable method and can define one or more tubular members with any suitable length, and skilled artisans will be able to select a suitable method to form thruster and suitable lengths for one or more tubular members according to a particular embodiment based on various considerations, such as the structural arrangement of an airship. Example methods considered suitable to form a thruster include, but are not limited to, forming a thruster out of a singular piece of material using any suitable production method (e.g., injection molding, rapid molding) and forming a thruster out of multiple pieces of material. Example lengths considered suitable for one or more tubular members includes, but is not limited to, a tubular member (e.g., 1230) that has a first end (e.g., 1236) that extends beyond the first end (e.g., 1220) of another tubular member (e.g., 1205). Alternatively, each of the tubular members can be formed out of one or more tubular member segments attached to one another and in fluid communication.

In the illustrated embodiment, third balloon 1160 has a tubular member 1168 with a first end disposed within opening 1166 and a second end that has an attached valve 1170. Valve 1170 has a first configuration in which the valve 1170 is closed and prevents, or substantially prevents, fluid flow through the valve and a second configuration in which the valve 1170 is open and allows fluid to flow through the valve 1170.

Attachment of the tubular members within the openings defined by each of the first balloon 1140, second balloon 1150, and third balloon 1160 can be accomplished using any suitable method of attachment, and skilled artisans will be able to select a suitable method of attachment based on various considerations, including the type of material that forms each of the balloons. Example methods of attachment that are considered suitable to attached a tubular member to a balloon include, but are not limited to, using an adhesive, and welding.

While the balloons have been illustrated and described as being attached to a tubular member, each of the balloons can be attached to any suitable device, component, and/or feature using any suitable method of attachment (e.g., releasable, fixed, permanent) such that fluid communication between a balloon (e.g., chamber defined by the wall of a balloon), tubular member, and/or a valve is accomplished. Skilled artisans will be able to select a suitable device, component, and/or feature and a suitable method of attachment according to a particular embodiment based on various considerations, such as the structural arrangement of the airship and/or thruster. For example, alternative to attaching the tubular members within an opening defined by the wall of a balloon, one or more of the balloons can have a threaded tubular member disposed in an opening defined by the wall of the balloon which provides a mechanism for attaching a balloon to a tubular member, such as those described herein, having a complimentary threaded tubular member adapted to receive, or connect to, the threaded tubular member disposed in the opening defined by the balloon. Example methods of attachment considered suitable between a balloon and a tubular member, device, component, and/or feature includes, but is not limited to, any of those described herein, adhesive, a threaded component, mechanical fasteners, an O-ring, welding, and/or a friction fit. For example, a tubular member can define one or more ridges, tapered ridges, and/or protuberances that are adapted to attached a balloon to the tubular member by sliding the portion of the balloon defining the opening over the one or more ridges, tapered ridges, and/or protuberances.

While brackets 1232 and tracks 1191 have been described as providing releasable attachment between the thruster 1200 and instrument case 1190, any suitable method of attachment between a thruster and an instrument case is considered suitable. Skilled artisans will be able to select a suitable method of attachment between a thruster and an instrument case based on various considerations, such as the structural arrangement of the airship. An example method of attachment includes, but is not limited to, threaded components (e.g., screws formed of any suitable material (e.g., plastic, metal)).

In the illustrated embodiment, the lower surface of the instrument case 1190 defines a ring 1192 that advantageously provides a mechanism for attaching system 1100 to a ground retrieval device 1194 and anchor 1195 in instances were a tethered flight is desired. A length of tether 1193 is passed through ring 1192 and a first end of tether 1193 is attached to ground retrieval device 1194 and a second end of tether 1193 is attached to anchor 1195. Ground retrieval device 1194 can be any suitable device capable of dispensing and retrieving tether 1193. Example ground retrieval devices considered suitable include, but are not limited to, those that are adapted to measure the amount of tether paid out to airship 1102 and the angle at which the tether 1193 is disposed to determine the altitude of airship 1102. When a length of tether 1193 is dispensed by ground retrieval device 1194 the system 1100 will ascend, if the system 1100 has positive buoyancy, at an angle from anchor 1195. When a length of tether 1193 is retrieved by ground retrieval device 1194 the system 1100 will descend at an angle from the anchor 1195. The altitude of the system 1000 can be altered based on the distance between the ground retrieval device 1194 and anchor 1195. For example, if a first distance is defined between the ground retrieval device 1194 and the anchor 1195, the system 1100 will have a first altitude. If a second distance, which is less than the first distance, is defined between the ground retrieval device 1194 and the anchor 1195, the system 1100 will have a second altitude, which is greater than the first altitude, and vice versa. It is considered advantageous to utilize a ground retrieval device 1194 and anchor 1195 to allow the system 1100 to ascend and avoid low lying objects and to provide a beginning ground truth (e.g., initial altitude). Optionally, one or more ground retrieval devices that are in communication with a user, ground control software, and/or on-board software can be attached to a lighter-than-air system and utilized to position a lighter-than-air system over a point of interest such that one or more images can be obtained. Such positioning can be predetermined based upon the desired image intended to be obtained. The placement of each of the ground retrieval devices (e.g., on four rooftops) provides a mechanism for the lighter-than-air system to be limited to a particular area, or zone, and the air current and weather conditions provide a mechanism for providing different points of view during flight.

Optionally, ground retrieval device 1194 can include a tension meter to calculate the buoyancy and/or forces being placed on the system. Optionally, system 1100 can include a skeg attached to the base of instrument case 1190 or airship 1102 to provide a mechanism for improving directional stability of system 1000 during flight, and to absorb and/or deflect landing forces.

Figure 15:
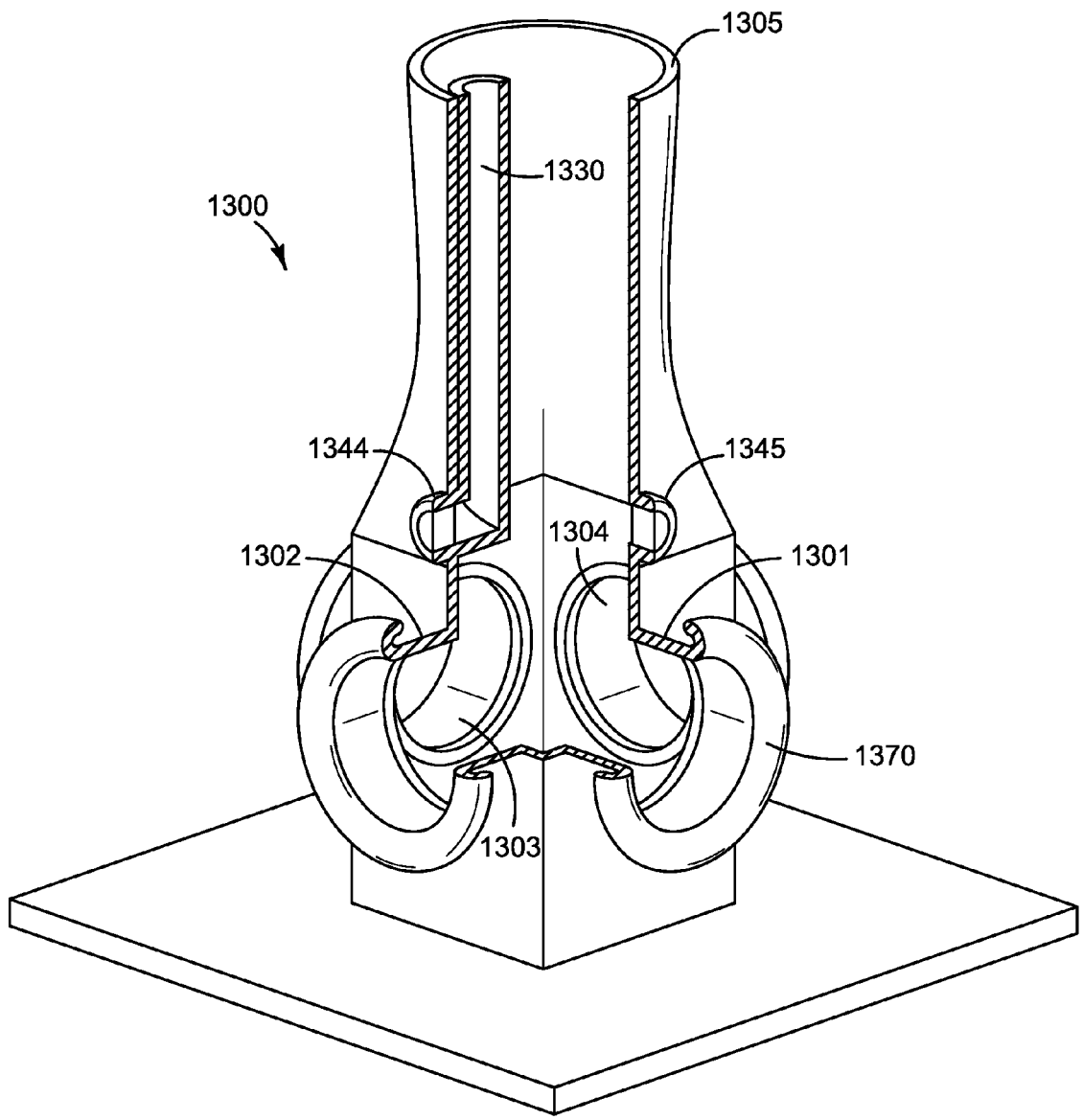
FIG. 15 is a partial cross sectional view of another exemplary thruster.

FIG. 15 illustrates an exemplary thruster 1300, which is similar to thruster 1200, except as described. Reference numbers in FIG. 15 refer to the same structural element or feature referenced by the same number in FIG. 13, offset by 100. Thus, thruster 1300 comprises a first tubular member 1301, second tubular member 1302, third tubular member 1303, fourth tubular member 1304, fifth tubular member 1305, and sixth tubular member 1330.

In the illustrated embodiment, the first end of each of the first tubular member 1301, second tubular member 1302, third tubular member 1303, and fourth tubular member 1304 define a curved surface 1370 which advantageously provides a mechanism for wrapping a membrane (not shown) over each opening of the first tubular member 1301, second tubular member 1302, third tubular member 1303, and fourth tubular member 1304. In addition, the curved surface 1370 is considered advantageous at least because it provides a mechanism for attaching a membrane to the thruster 1300 via an O-ring.

In addition, in the illustrated embodiment, valve 1344 and valve 1345 are disposed at a 90 degree, or substantially 90 degree, angle to one another, as compared to valve 1244 and valve 1245 shown in FIG. 13 which are opposed to one another and are disposed at a 180 degree, or substantially 180 degree, angle to one another.

FIGS. 16, 17, 18, 19, 20, 21, 22, 23, 24, and 25 illustrate another exemplary lighter-than-air system 1400, which is similar to lighter-than-air system 1100, except as described. The system 1400 comprises an airship 1402, thruster 1500, airfoil module 1700, thrust module 1800, and an instrument case 1900. Lighter-than-air system 1400 is considered advantageous because it provides a mechanism for incorporating one or more modules, each having its own function, into a lighter-than-air system, as described in more detail herein.

While particular modules, each having particular features, structural arrangements, and/or functions, have been illustrated and described, a lighter-than-air system can include any suitable number of modules, having any suitable feature, structural arrangement, and/or function. Skilled artisans will be able to select a suitable number of modules, and suitable features, structural arrangements, and/or functions for a module according to a particular embodiment based on various considerations, including the desired function of a lighter-than-air system. Example number of modules to include in a lighter-than-air system include, but are not limited to, one, at least one, two, a plurality, three, four, five, six, and any other number considered suitable for a particular application. Example functions considered suitable for a module to accomplish include, but are not limited to, meteorological modules that include one or more meteorological sensors, such as those described herein, altitude control modules that include one or more sensing devices, such as those described herein, airfoil modules that include one or more airfoils, such as those described herein, thrust modules that include one or more thrusters, such as those described herein, and any other function considered suitable for a particular application.

In the illustrated embodiment, airship 1402 is attached to thruster 1500, airfoil module 1700 is attached to thruster 1500, thrust module 1800 is attached to airfoil module 1700, and instrument case 1900 is attached to thrust module 1800.

While a particular configuration of the lighter-than-air system has been illustrated and described, a lighter-than-air system can be arranged in any suitable configuration, and skilled artisans will be able to select a suitable configuration for a lighter-than-air system according to a particular embodiment based on various considerations, including the desired flight path of the lighter-than-air system. Example configurations considered suitable for a lighter-than-air system include, but are not limited to, omitting the thrust module, omitting the airfoil module, attaching a the thrust module to the thruster, attaching the airfoil module to the thrust module, attaching the instrument case to the airfoil module, and any other configuration considered suitable for a particular application.

Any suitable method of attachment can be used between an airship 1402, thruster 1500, airfoil module 1700, thrust module 1800, and/or instrument case 1900, and skilled artisans will be able to select a suitable method of attachment according to a particular embodiment based on various considerations, including the material forming an airship, thruster, and/or module. Example methods of attachment considered suitable between an airship, thruster, airfoil module, thrust module, and/or instrument case include, but are not limited to, releasable attachments, threaded components, mechanical fasteners, friction fit, snap fit, fixed attachments, welding, using an adhesive, forming one or more components as an integral unit, and any other method of attachment considered suitable for a particular application.

Figure 16:
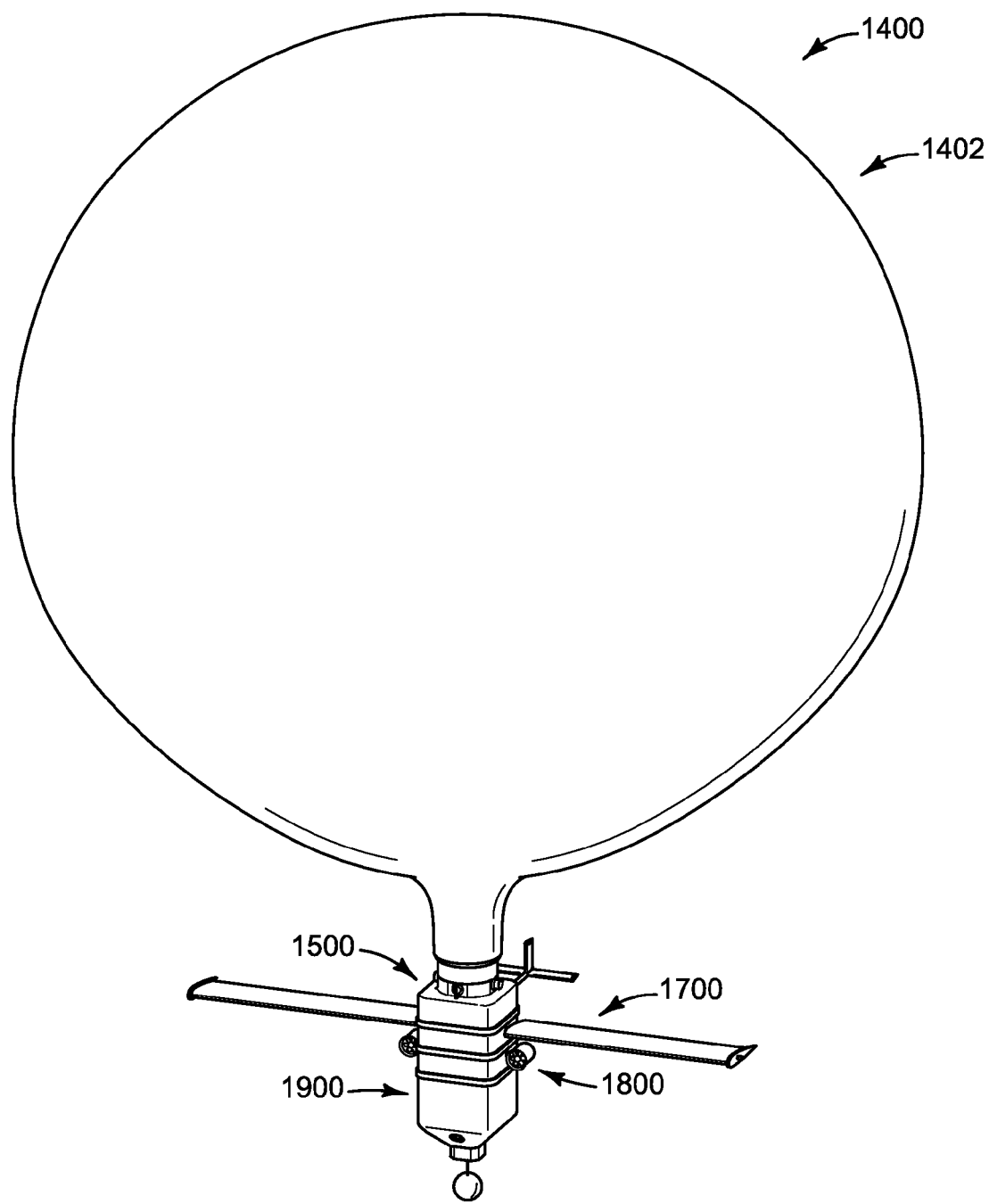
FIG. 16 is a perspective view of another exemplary lighter-than-air system.
Figure 17:
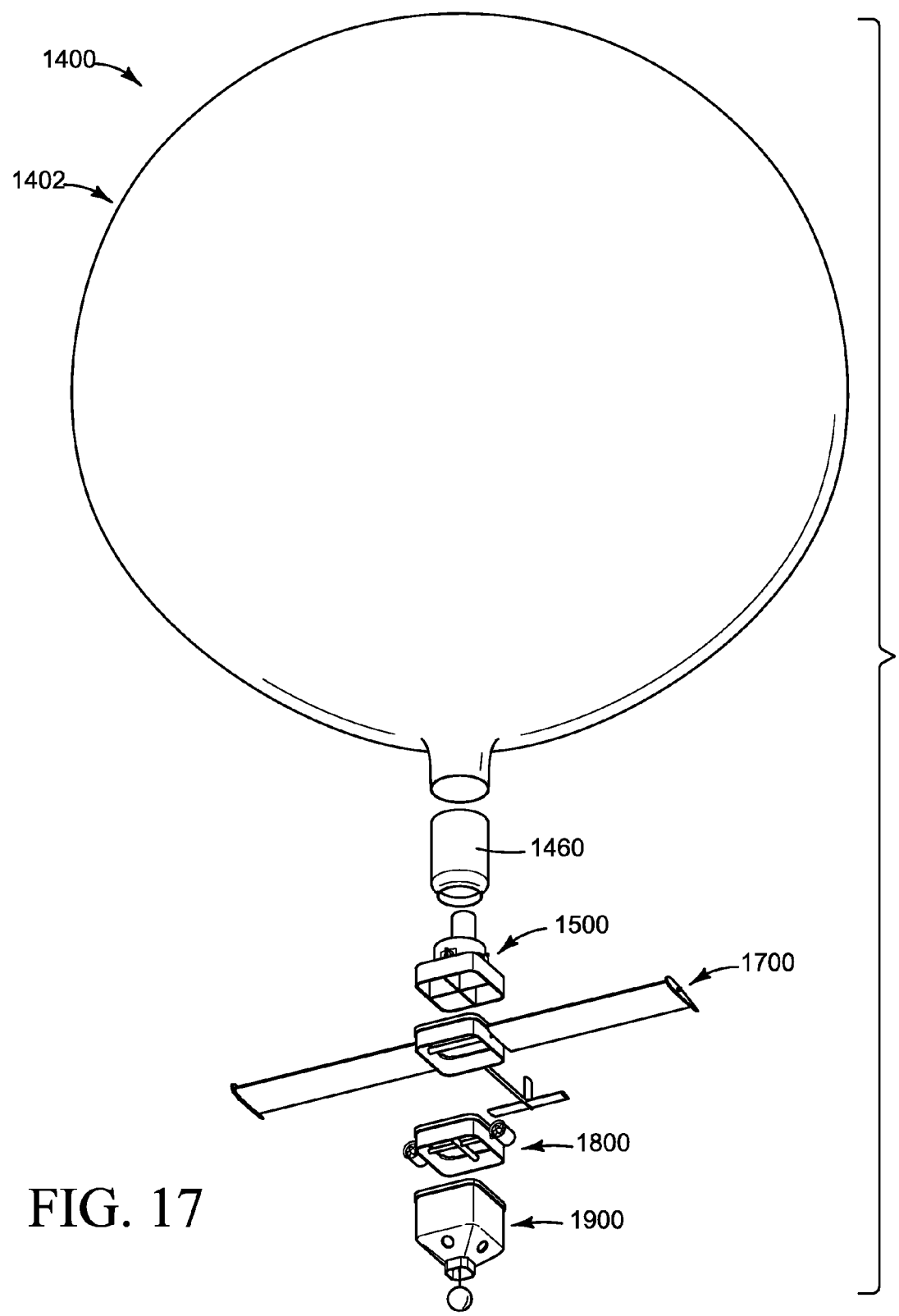
FIG. 17 is an exploded view of the exemplary lighter-than-air system illustrated in FIG. 16.
Figure 18:
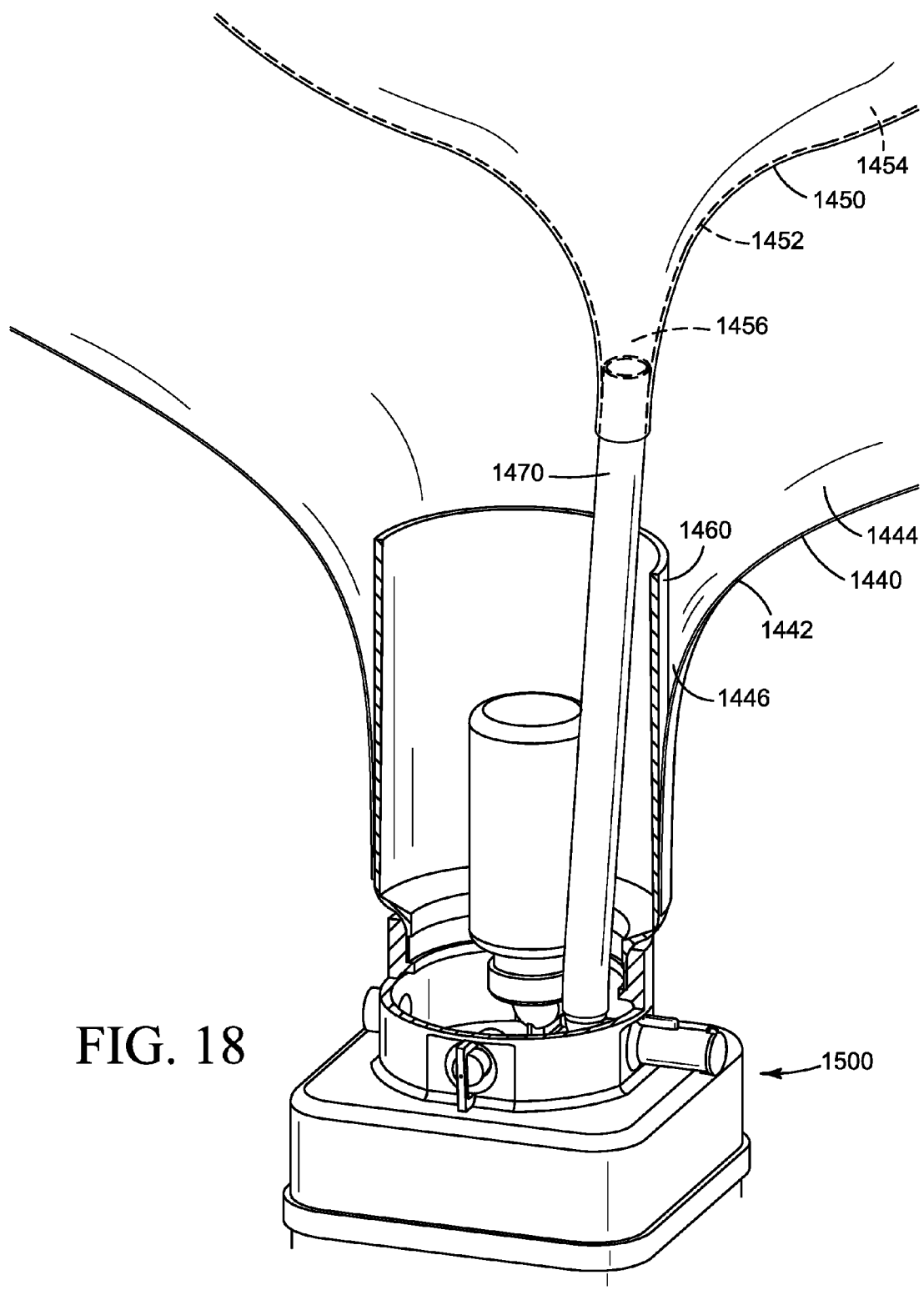
FIG. 18 is a magnified partial cross sectional view of the lighter-than-air system illustrated in FIG. 16.
Figure 19:
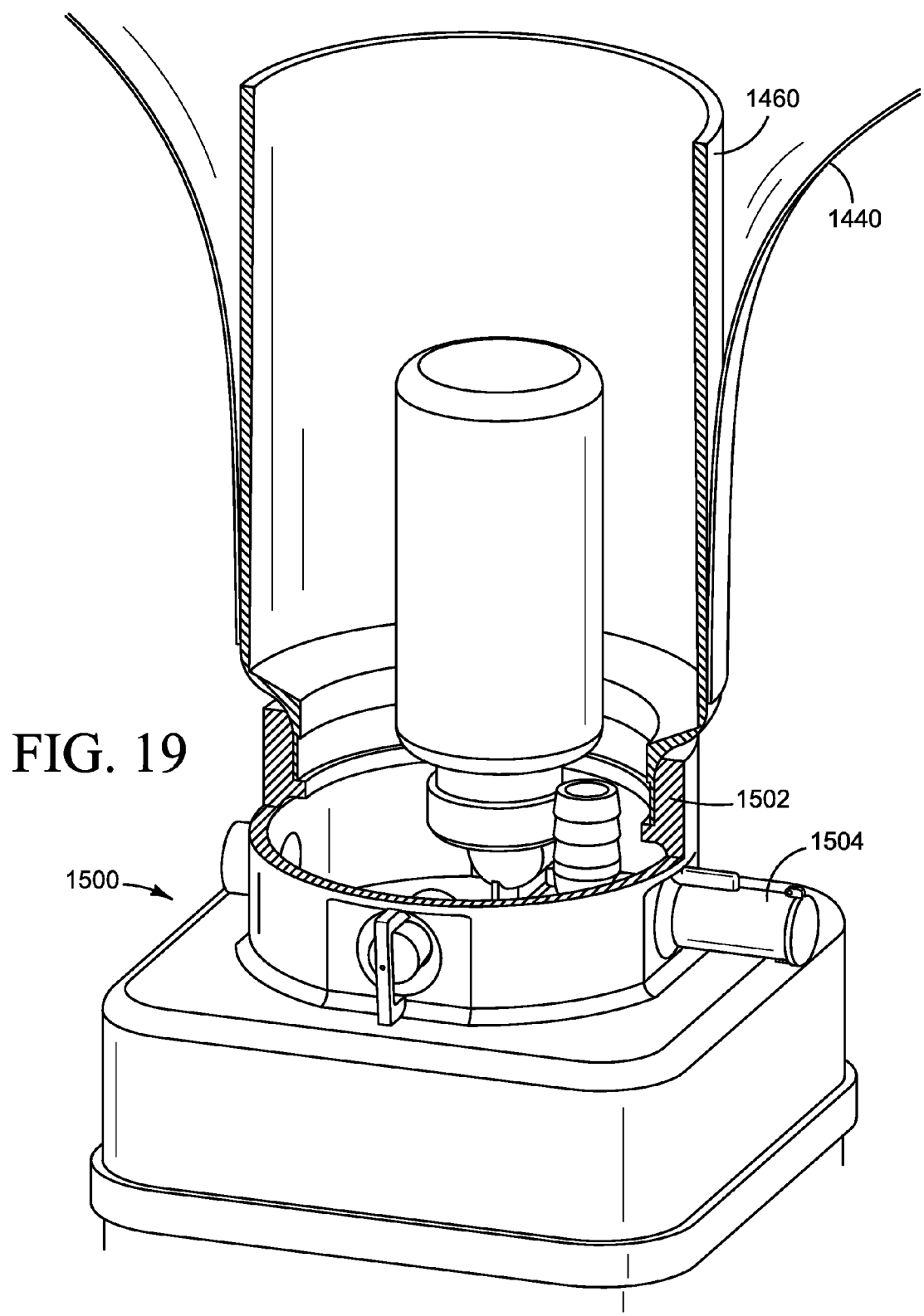
FIG. 19 is a magnified partial cross sectional view of the lighter-than-air system illustrated in FIG. 16, omitting the inclusion of a second balloon.
Figure 20:
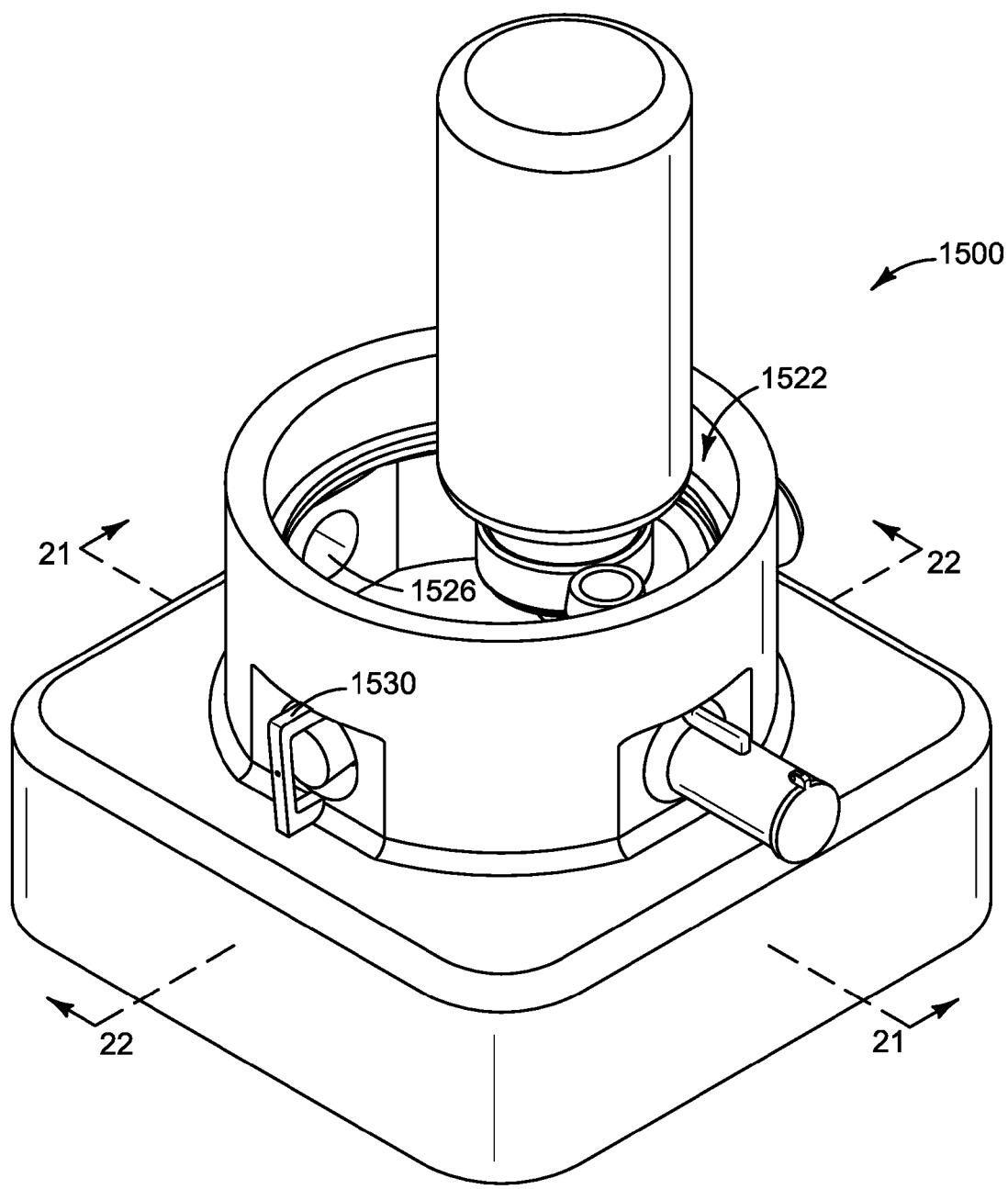
FIG. 20 is a perspective view of the thruster illustrated in FIG. 16, free of the lighter-than-air system.
Figure 21:
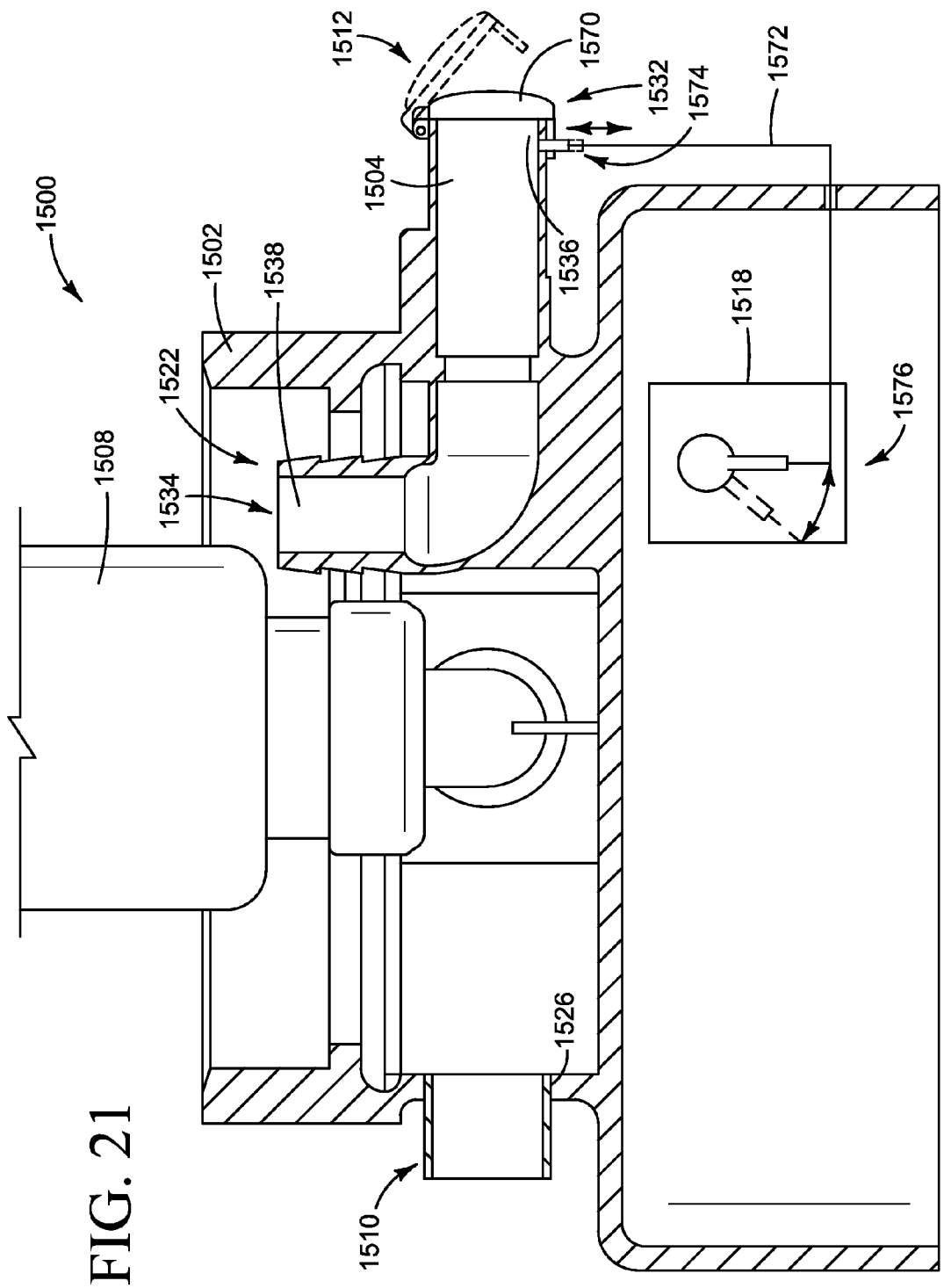
FIG. 21 is a sectional view of the thruster illustrated in FIG. 20, taken along line 21-21.
Figure 22:
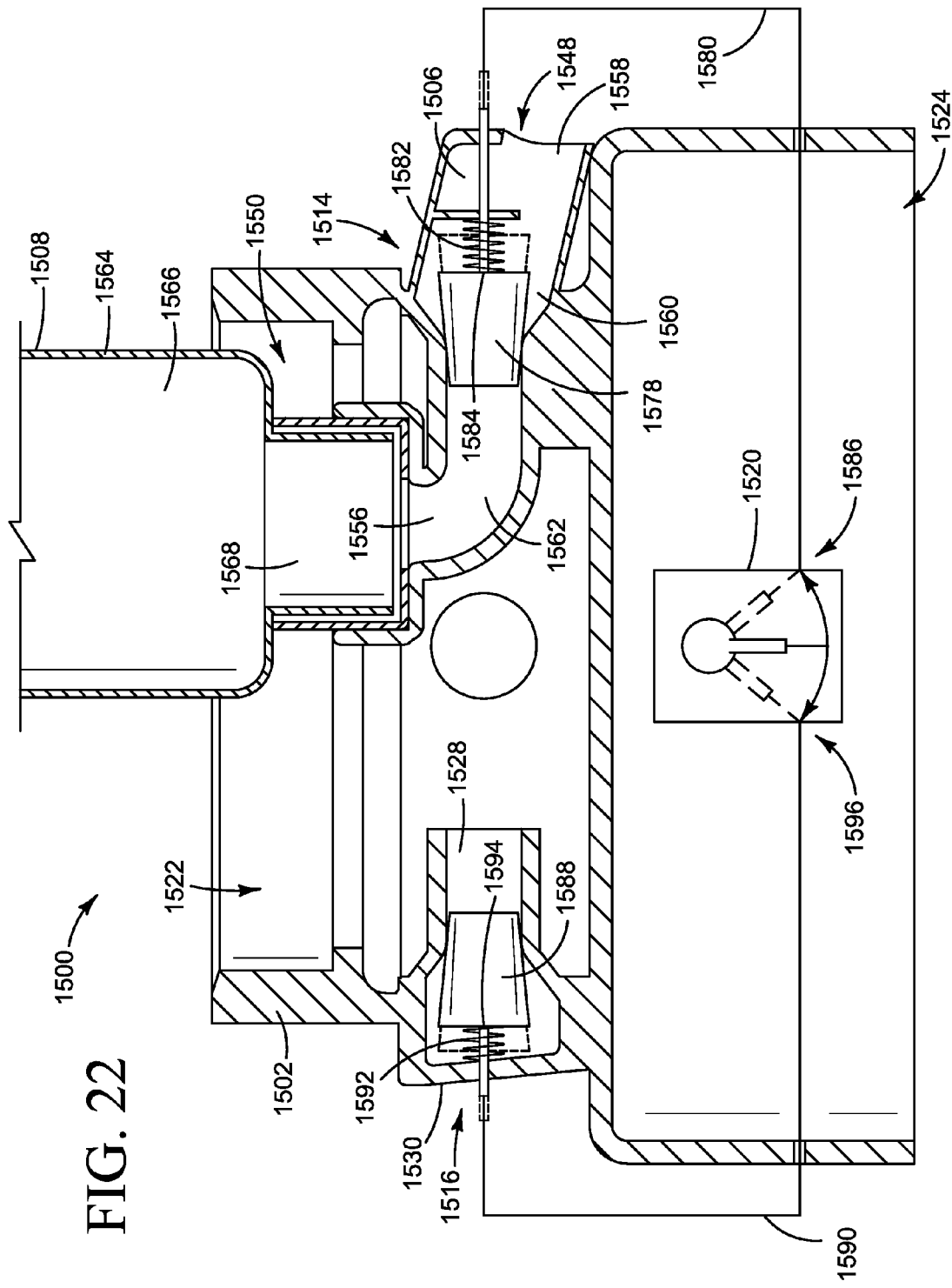
FIG. 22 is a sectional view of the thruster illustrated in FIG. 20, taken along line 22-22.

The airship 1402 comprises a first balloon 1440 and a second balloon 1450 disposed within the first balloon 1440. Each of the first balloon 1440 and second balloon 1450 has an inflated configuration and a deflated configuration. FIGS. 16, 17, and 18 illustrate the first balloon 1440 in the inflated configuration and FIG. 18 illustrates the second balloon 1450 in the inflated configuration. The first balloon 1440 has a first balloon wall 1442 that defines a first balloon chamber 1444 and a first balloon opening 1446 that extends through first balloon wall 1442 and provides access to first balloon chamber 1444. The second balloon 1450 has a second balloon wall 1452 that defines a second balloon chamber 1454 and a second balloon opening 1456 that extends through second balloon wall 1452 and provides access to second balloon chamber 1454. Each of the first balloon 1440 and second balloon 1450 is in communication with thruster 1500, as described in more detail below.

In the illustrated embodiment of FIGS. 16 through 25, first balloon 1440 is attached to thruster 1500 by tubular member 1460, and second balloon 1450 is attached to thruster 1500 by tubular member 1470. First balloon 1440 is attached to tubular member 1460 using any suitable method of attachment (e.g., adhesive), and second balloon 1450 is attached to tubular member 1470 using any suitable method of attachment (e.g., adhesive).

First balloon chamber 1444 is configured to receive and contain a volume of fluid sufficient to offset any suitable portion, or the entirety, of the weight of lighter-than-air system 1400. Example volumes of fluid considered suitable to include in a first balloon chamber 1444 include, but are not limited to, volumes of fluid sufficient to offset between about 1% to about 100% of the weight of lighter-than-air system 1400, 10% to about 50% of the weight of lighter-than-air system 1400, and any other volume of fluid considered suitable for a particular application. Second balloon chamber 1454 is configured to receive and contain a volume of fluid sufficient to offset any suitable portion, or the entirety, of the weight of lighter-than-air system 1400. Example volumes of fluid considered suitable to include in a second balloon chamber 1454 include, but are not limited to, volumes of fluid sufficient to offset between about 1% to about 100% of the weight of lighter-than-air system 1400, 50% to about 90% of the weight of lighter-than-air system 1400, and any other volume of fluid considered suitable for a particular application.

First balloon 1440 and second balloon 1450 can be formed of any suitable material and have any suitable structural configuration, and skilled artisans will be able to select a suitable material and/or structural arrangement for a balloon according to a particular embodiment based on various considerations, including the structural configuration of a thruster. For example, first balloon 1440 can be formed of a material that is solid, or substantially solid, and second balloon 1450 can be formed of a flexible, or substantially flexible material (e.g., biaxially-oriented polyethylene terephthalate (Mylar®), latex) relative to the first balloon 1440. This configuration is considered advantageous at least because it provides a mechanism for structurally arranging first balloon 1440 such that it can act as a sail and provides a mechanism that provides for more predictable compression and lift force of fluid within the first balloon 1440 and second balloon 1450 as compared to a lighter-than-air system that does not include a first balloon formed of a solid, or substantially solid material. It is considered advantageous for first balloon 1440 to be adapted to have an inflated outside diameter of about 7 feet (2.1336 meters) and for second balloon 1450 to be adapted to have an inflated outside diameter between about 2 feet (0.6096 meters) and about 3 feet (0.9144 meters).

The illustrated thruster 1500 comprises a thruster body 1502 that defines a first passageway 1504, second passageway 1506 and has a container 1508, first valve 1510, second valve 1512, third valve 1514, fourth valve 1516, first servo 1518, and second servo 1520.

The illustrated thruster body 1502 defines a first cavity 1522, second cavity 1524, first opening 1526, second opening 1528, and a crossbar 1530 that extends across second opening 1528. Each of the first cavity 1522 and second cavity 1524 extends into thruster body 1502. First cavity 1522 extends into thruster body 1502 on a side opposably facing, or substantially opposably facing, second cavity 1524. First opening 1526 extends through thruster body 1502 and provides access to first cavity 1522. First balloon 1440 is attached to thruster body 1502 by tubular member 1460 such that first balloon chamber 1444 is in communication with first cavity 1522. Second balloon 1450 is attached to thruster body 1502 by tubular member 1470 such that second balloon chamber 1450 is in communication with first passageway 1521. Any suitable method of attachment is considered suitable between tubular member 1460 and thruster 1500 and tubular member 1470 and thruster 1500, and skilled artisans will be able to select a suitable method of attachment based on various considerations, including the material forming a tubular member and/or thruster. Example methods of attachment considered suitable between a tubular member and an thruster include, but are not limited to, releasable attachments, threaded components, mechanical fasteners, friction fit, snap fit, defining a barbed end (e.g., illustrated in FIG. 21), fixed attachments, welding, using an adhesive, forming one or more components as an integral unit, and any other method of attachment considered suitable for a particular application.

First passageway 1504 extends through thruster body 1502 such that thruster body 1502 defines a first passageway first end 1532, barbed first passageway second end 1534, first passageway first opening 1536, and a first passageway second opening 1538. First passageway first opening 1536 is in communication with the environment exterior to the first cavity 1522 and a first passageway second opening 1538 in communication with second balloon chamber 1454. Thus, second balloon 1450 is attached to thruster 1500 such that second balloon chamber 1454 is in communication with first passageway 1504.

Second passageway 1506 extends through thruster body 1502 such that thruster body 1502 defines a second passageway first end 1548, second passageway second end 1550, second passageway first opening 1554, and a second passageway second opening 1556. Second passageway 1506 passageway has a first portion 1558, second portion 1560, and a third portion 1562. The second portion 1560 is disposed between the first portion 1558 and the third portion 1562. The first portion 1558 has a first diameter, the second portion 1560 has a second diameter, and the third portion 1562 has a third diameter. The second diameter is greater than the first diameter and the third diameter. Second tubular member first opening 1554 is in communication with the environment exterior to the first cavity 1522 and a second tubular member second opening 1556 in communication with the container chamber

1566, as described in more detail herein. Thus, container 1508 is attached to thruster 1500 such that container chamber 1566 is in communication with second passageway 1506.

Container 1508 is attached to second passageway second end 1550 and has a container wall 1564 that defines a container chamber 1566 and a container opening 1568 that provides access to container chamber 1566. Container 1508 can comprise any suitable structure capable of storing material and/or fluid, can have any suitable structural arrangement, and be formed of any suitable material. Skilled artisans will be able to select a suitable structure, structural arrangement, and material for a container according to a particular embodiment based on various considerations, including the materials forming a thruster body. It is considered advantageous for container 1508 to be attached to thruster 1500 using mating threaded connections and an O-ring, or other suitable sealing member, to decrease the likelihood of fluid contained within the container chamber 1566 from escaping. It considered suitable for container 1508 to be disposed within first cavity 1522 at least because this configuration positions the weight of the container 1508 and the weight of the material within container chamber 1566 near, or close to, the center of gravity of lighter-than-air system 1400.

Any suitable material can be stored and/or introduced into container chamber 1566, and skilled artisans will be able to select a suitable material to store and/or introduce into a container chamber according to a particular embodiment based on various considerations, including the lift desired to be achieved when the material is released from the container chamber. Example materials considered suitable to store and/or introduce into a container chamber include, but are not limited to, liquid materials, water, solid materials, beads, lead pellets, and any other material considered suitable for a particular application.

Each of the thruster body 1502 and/or container 1508 can be separate components attached to one another using any suitable method or attachment, or can be an integral unit. Each of the thruster body 1502 and/or container 1508 can be formed using any suitable method of manufacture and using any suitable material. Skilled artisans will be able to select a suitable method of manufacture and material to form a thruster body and/or container according to a particular embodiment based on various considerations, including the material(s) forming other components of a lighter-than-air system. Example materials considered suitable include, metals, polymers, and any other material considered suitable for a particular application. Example techniques considered suitable to form a thruster and/or container include, but are not limited to, extrusion processes, molding processes, and any other technique considered suitable for a particular application. Alternative to thruster body 1502 defining first passageway 1504 and second passageway 1506, a thruster can include a first tubular member and second tubular member attach to a thruster wall, each defining a passageway.

While each of the thruster body 1502, and container 1508 have been illustrated and described as having particular structural arrangements, a thruster body and container can have any suitable structural arrangement. Skilled artisans will be able to select a suitable structural arrangement for a thruster body and/or container according to a particular embodiment based on various considerations, including the material(s) forming each component.

Various exemplary valves are illustrated and described herein with respect to first valve 1510, second valve 1512, third valve 1514, and fourth valve 1516, however, these exemplary valve embodiments are merely examples of suitable valves. Each of the first valve 1510, second valve 1512, third valve 1514, and fourth valve 1516 can comprise any suitable structure capable of passing a fluid in a first direction through the valve, passing a fluid in a second direction, opposite that of the first direction, through the valve, and/or preventing fluid from being passed through the valve. Skilled artisans will be able to select a suitable valve to include with a lighter-than-air system, according to a particular embodiment based on various considerations, including the material forming the lighter-than-air system.

In the illustrated embodiment, first valve 1510 is disposed in first opening 1526 such that first valve 1510 is in communication with first cavity 1522. It is considered advantageous for first valve 1510 to be adapted to introduce fluid through first valve 1510 and into first balloon chamber 1444, hold fluid within first balloon chamber 1444, and remove fluid within first balloon chamber 1444. First valve 1510 can comprise any suitable valve, such as those described herein.

In the illustrated embodiment, second valve 1512 comprises a cap 1570 hingedly attached to first passageway first end 1532. Cap 1570 is adapted to move between a first configuration and a second configuration, as shown in hidden lines. In the first configuration, cap 1570 is disposed over first passageway first opening 1536 and holds fluid contained within second balloon chamber 1454. In the second configuration, cap 1570 is disposed at an angle to first passageway first opening 1536 such that fluid contained within second balloon chamber 1454 can pass through first passageway 1504 and into the environment exterior to first passageway 1504.

Movement of cap 1570 between the first configuration and second configuration can be accomplished using any suitable method or structural arrangement. In the illustrated embodiment, movement of cap 1570 between the first configuration and the second configuration is accomplished using a wire member 1572 having a wire member first end 1574 attached to a portion of cap 1570 and a wire member second end 1576 attached to first servo 1518 disposed within second cavity 1524. First servo 1518 is in communication with one or more devices housed within instrument case 1900 (e.g., using a signal carrier, wirelessly) and is adapted to move between a first configuration and a second configuration upon the receipt of a signal from the one or more devices housed within instrument case 1900, or one or more devices in communication with one or more devices housed within instrument case 1900. When first servo 1518 is in the first configuration, cap 1570 is in the first configuration. When first servo 1518 is in the second configuration, wire member 1572 is pulled taught and cap 1570 is moved to its second configuration. Alternatively, movement of cap 1570 between the first configuration and second configuration can be accomplished using the momentum of anchor 2018 being released from lighter-than-air system 1400, as described in more detail herein. For example, a wire member (e.g., wire member 2016) can be attached to a cap (e.g., 1570) such that upon the release of an anchor attached to the wire member (e.g., anchor 2018), cap 1570 moves from its first configuration to its second configuration.

In the illustrated embodiment of FIGS. 16 through 25, third valve 1514 comprises a plug 1578, wire member 1580, and spring 1582. Plug 1578 has a tapered configuration and is disposed within second portion 1560 of second passageway 1506. Wire member 1580 has a wire member first end 1584 attached to plug 1578 and a wire member second end 1586 attached to second servo 1520 disposed within second cavity 1524. Spring 1582 is disposed between plug 1578 and third portion 1562 of second passageway 1506.

Plug 1578 is adapted to move between a first configuration and a second configuration. In the first configuration, plug 1578 seals, or substantially seals, second passageway 1506. In the second configuration, plug 1578 allows fluid to pass through second passageway 1506. Second servo 1520 is in communication with one or more devices housed within instrument case 1900 (e.g., using a signal carrier, wirelessly) and is adapted to move between a first configuration, second configuration, and a third configuration upon the receipt of a signal from the one or more devices housed within instrument case 1900, or one or more devices in communication with one or more devices housed within instrument case 1900. When second servo 1520 is in the first configuration or second configuration, plug 1578 is in the first configuration. When second servo 1520 is in the third configuration, wire member 1580 is pulled taught and plug 1578 is moved to its second configuration. Spring 1582 is biased such that when second servo 1520 is in the first configuration or second configuration, plug 1578 returns to its first configuration.

In the illustrated embodiment of FIGS. 16 through 25, fourth valve 1516 comprises a plug 1588, wire member 1590, and spring 1592. Plug 1588 has a tapered configuration and is disposed within second opening 1528 such that the large end of plug 1588 is disposed between thruster body 1502 and crossbar 1530. Wire member 1590 has a wire member first end 1594 attached to plug 1588 and a wire member second end 1596 attached to second servo 1520. Spring 1592 is disposed between plug 1588 and crossbar 1530.

Plug 1588 is adapted to move between a first configuration and a second configuration. In the first configuration, plug 1588 seals, or substantially seals, second opening 1528. In the second configuration, plug 1588 allows fluid to pass through second opening 1528. When second servo 1520 is in the second configuration, wire member 1590 is pulled taught and plug 1588 is moved to its second configuration. When second servo 1520 is in the first configuration and/or third configuration, plug is in the first configuration. Spring 1592 is biased such that when second servo is in the first configuration or third configuration, plug 1588 is in its first configuration.

While second valve 1512, third valve 1514, and fourth valve 1516 have been illustrated and described as being actuated by a first servo 1518 and/or second servo 1520, any suitable structure and/or mechanism capable of actuating a valve is considered suitable, and skilled artisans will be able to select a suitable structure and/or mechanism to actuate a valve according to a particular embodiment based on various considerations, including the type of valve being actuated. Example structures and/or mechanisms considered suitable include, but are not limited to, those described herein, electronic switches, mechanical switches, linear actuators, and any other structure and/or mechanism considered suitable for a particular application.

Alternative to including a first valve 1510, second valve 1512, third valve 1514, and fourth valve 1516 as illustrated and described, a valve can comprise a bi-directional valve in communication with one or more devices housed within an instrument case. The bi-directional valve can be adapted to introduce fluid into, hold fluid within, and remove fluid from a chamber or other space upon the receipt of a signal from a user, ground control software, and/or on-board software. This is considered advantageous at least because it provides a mechanism for introducing a fluid into a chamber subsequent to the chamber being emptied of a fluid such that the newly reintroduced fluid can be used for thrust purposes. Alternatively, a pump can be incorporated into any portion of a lighter-than-air system, separate from, or in combination with, a valve, such that a fluid can be introduced into a chamber before, during, or subsequent to flight.

Optionally, each of the first valve 1510, second valve 1512, third valve 1514, and fourth valve 1516 can be activated by a user, ground control software, onboard-software at any suitable time during flight. For example, a user can activate the first valve 1510, second valve 1512, third valve 1514, and/or fourth valve 1516 upon directly visualizing lighter-than-air system 1400 and determining that adjustments to altitude, buoyancy, and/or directionality are necessary (e.g., to maintain a flight path). Alternatively, ground control software and/or on-board software can activate the first valve 1510, second valve 1512, third valve 1514, and/or fourth valve 1516 when adjustments to altitude, buoyancy, and/or directionality are necessary to maintain a flight path. For example, if during flight one or more devices housed within instrument case 1900 (e.g., barometric altimeter, GPS, IMU), or one or more devices in communication with the one or more devices housed within the instrument case 1900, provide data to a user, ground control software, and/or on-board software that indicates that an altitude, buoyancy, and/or directionality adjustment is necessary to maintain a flight path, a user, ground control software, and/or on-board software can activate the first valve 1510, second valve 1512, third valve 1514, and/or fourth valve 1516 to adjust the flight path.

In use, when lighter-than-air system 1400 is in flight and first balloon chamber 1444 and second balloon chamber 1454 each contain a fluid and container chamber 1566 contains a material, each of the first servo 1518 and second servo 1520 can be activated by a user, ground control software, and/or on-board software, as described in more detail herein, for maintaining and/or adjusting the altitude of lighter-than-air system 1400. For example, when descent of the lighter-than-air system 1400 is desired, first servo 1518 can be activated such that fluid is released from second balloon chamber 1454. Alternatively, when descent of lighter-than-air system 1400 is desired, second servo 1520 can be activated such that fluid is released from first balloon chamber 1444. When ascent of lighter-than-air system 1400 is desired, second servo 1520 can be activated such that the material stored within container chamber 1566 is released and the total weight of lighter-than-air system 1400 is reduced resulting in lift of the lighter-than-air system 1400. The extent of ascent and/or descent can be controlled based on the diameter of each passageway define by the tubular members and/or by the length of time a valve is disposed in the open configuration, which can be preset by a user, ground control software, and/or on-board software. In embodiments that utilize pellets contained within container chamber 1566, fourth valve 1516 can be configured such that when it is moved to the open configuration, a single pellet is removed from container chamber 1566 at a time, resulting in a controlled ascent.

Figure 23:
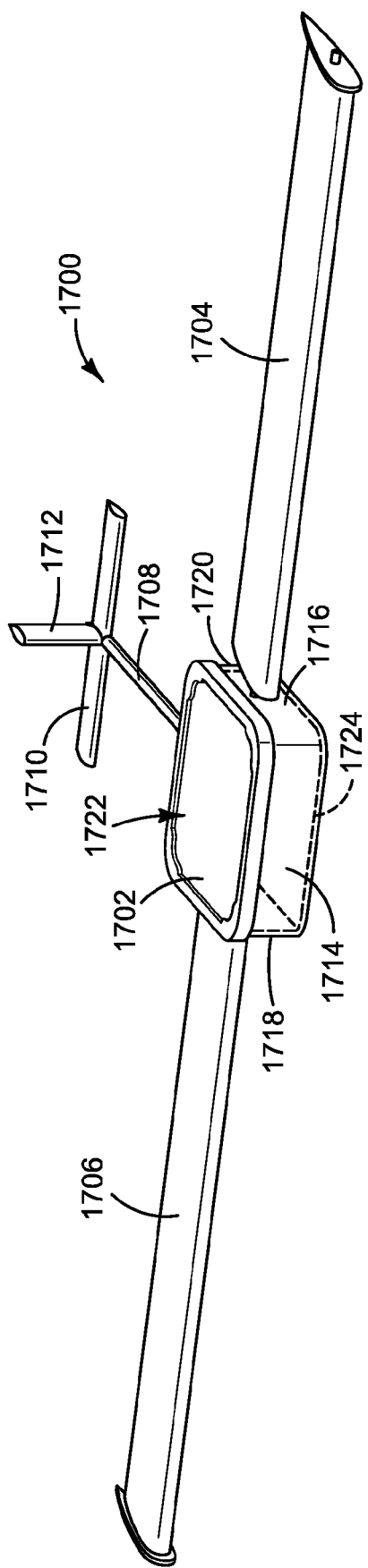
FIG. 23 is a perspective view of the airfoil module illustrated in FIG. 16 free of the lighter-than-air system.

FIG. 23 illustrates the airfoil module 1700 free of the lighter-than-air system 1400. Airfoil module 1700 comprises a base 1702, first airfoil 1704, second airfoil 1706, elongate member 1708, third airfoil 1710, and fourth airfoil 1712.

In the illustrated embodiment of FIGS. 16 through 25, base 1702 comprises a base body 1714, first side 1716, second side 1718, third side 1720, and defines a first cavity 1722 and a second cavity 1724. First side 1716 is opposably facing, or substantially opposable facing, second side 1718. Third side 1720 is orthogonal, or substantially orthogonal, to first side 1716. First cavity 1722 extends into base body 1714 on a side opposably facing, or substantially opposably facing, second cavity 1724.

First airfoil 1704 extends outward and away from base body 1714 from first side 1716. Second airfoil 1706 extends outward and away from base body 1714 from second side 1718. Elongate member 1708 extends outward and away from base body 1714 from third side 1720. Each of the third airfoil 1710 and fourth airfoil 1712 extends outward and away from elongate member 1708. Fourth airfoil 1712 is disposed orthogonal, or substantially orthogonal, to third airfoil 1710. Optionally, elongate member 1708, third airfoil 1710, and fourth airfoil 1712 can be omitted.

Each of the first airfoil 1704, second airfoil 1706, third airfoil 1710, and fourth airfoil 1712 can comprise any suitable structural arrangement, and skilled artisans will be able to select a suitable structural arrangement for an airfoil according to a particular embodiment based on various considerations, including the material forming a thruster. Example structural configurations considered suitable for an airfoil include, but are not limited to, structures capable of providing lift as the airfoil travels through a fluid (e.g., air), structures capable of maintaining course while traveling through a fluid (e.g., air), structures with a shape and/or orientation that control stability, direction, thrust, lift, and/or propulsion, and any other structure considered suitable for a particular application.

Base 1702, first airfoil 1704, second airfoil 1706, elongate member 1708, third airfoil 1710, and fourth airfoil 1712 can be manufactured using any suitable technique and can be formed of any suitable material. Skilled artisans will be able to select a suitable technique to form a base, airfoil, and/or elongate member and a suitable material to form a base, airfoil, and/or elongate member according to a particular embodiment based on various considerations, including the desired structural configuration of an airfoil module. Example materials considered suitable include, metals, polymers, and any other material considered suitable for a particular application. Example techniques considered suitable to form a base, airfoil, and/or elongate member include, but are not limited to, extrusion processes, molding processes, and any other technique considered suitable for a particular application.

It is considered advantageous for first airfoil 1704 and/or second airfoil 1706 to be rotatably attached to base 1702 such that adjustments of flight path of the lighter-than-air system 1400 can be made during flight. It is considered advantageous for third airfoil 1710 and/or fourth airfoil 1712 to be rotatably attached to elongate member 1708 such that adjustments of flight path of the lighter-than-air system 1400 can be made during flight. Adjustments to the position of an airfoil can be accomplished by attaching the airfoil to a servo disposed within second cavity 1724 that is in communication with one or more devices housed within instrument case 1900 (e.g., using a signal carrier, wirelessly).

Figure 24:
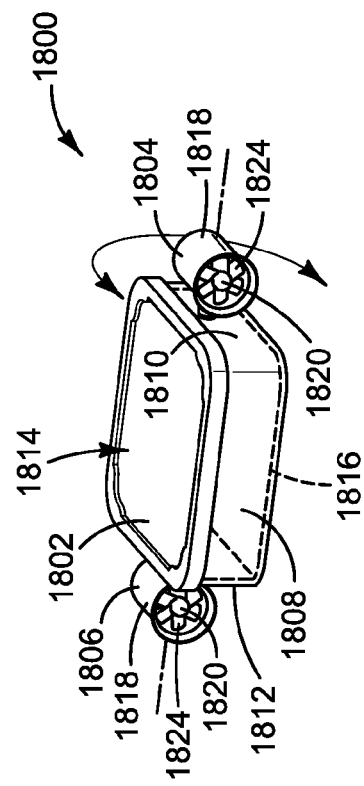
FIG. 24 is a perspective view of the thrust module illustrated in FIG. 16 free of the lighter-than-air system.

FIG. 24 illustrates the thrust module 1800 free of the lighter-than-air system 1400. The illustrated thrust module 1800 comprises a base 1802, first thrust component 1804, and a second thrust component 1806.

In the illustrated embodiment of FIGS. 16 through 25, base 1802 comprises a base body 1808, first side 1810, second side 1812, and defines a cavity 1814 and a second cavity 1816. First side 1810 is opposably facing, or substantially opposable facing, second side 1812. First cavity 1814 extends into base body 1808 on a side opposably facing, or substantially opposably facing, second cavity 1816.

Each of the first thrust component 1804 and second thrust component 1806 can comprise any suitable structure capable of providing thrust to a lighter-than-air system, and skilled artisans will be able to select a suitable structure for a thrust component according to a particular embodiment based on various considerations, including the material forming a lighter-than-air system. Example structures considered suitable include, but are not limited to, structures capable of providing thrust, fans, ducted fans, compressed fluid cartridges (e.g., $CO_2$ cartridges, pressurized cartridges), compressed fluid thrust valves, propellers, engines, motors, and any other structure considered suitable for a particular application.

In the illustrated embodiment of FIGS. 16 through 25, each of the first thrust component 1804 and second thrust component 1806 comprises a duct 1818, fan 1820, and a motor (not shown). The duct 1818 defines a passageway 1824 in which each of the fan 1820 and motor is disposed. First thrust component 1804 is rotatably attached to first side 1810 and a second thrust component 1806 is rotatably attached to second side 1812. It is considered advantageous for first thrust component 1806 and second thrust component 1810 to be rotatably attached to base 1802 such that adjustments of the flight path of the lighter-than-air system 1400 can be made during flight. Each of the first thrust component 1804 and second thrust component 1806 is operatively attached to one or more servos disposed within second cavity 1816 such that the directionality of each of the first thrust component 1804 and second thrust component 1806 can be adjusted before, during, or after flight. Each of the one or more servos disposed within second cavity 1816 is in communication to one or more devices housed within instrument case 1900 (e.g., using a signal carrier, wirelessly).

Base 1802, first thrust component 1804, and second thrust component 1806 can be manufactured using any suitable technique and can be formed of any suitable material. Skilled artisans will be able to select a suitable technique to form a base and/or thrust component and a suitable material to form a base and/or thrust component according to a particular embodiment based on various considerations, including the desired structural configuration of a thrust module. Example materials considered suitable include, metals, polymers, and any other material considered suitable for a particular application.

While thrust module 1800 has been illustrated and described as including a first thrust component 1804 and a second thrust component 1804, any suitable number of thrust components having any suitable structural configuration can be included in a lighter-than-air system, and skilled artisans will be able to select a suitable number of thrust components and a suitable structural configuration for a thrust component according to a particular embodiment based on various considerations, including the desired thrust and/or movement desired to be achieved. Example number of thrust components considered suitable to include in a lighter-than-air system include, but are not limited to, one, at least one, two, a plurality, three, four, five, and any other number considered suitable for a particular application. For example, a thrust module can include four fans fixed to the base of a thrust module. The first fan disposed such that the thrust formed by the first fan is disposed in a first direction. The second fan disposed such that the thrust formed by the second fan is disposed in a second direction opposite, or substantially opposite, the directionality of the thrust formed by first fan. Each of the first direction and second direction is contained on a first plane. The third fan disposed such that the thrust formed by the third fan is disposed in a third direction that is orthogonal, or substantially orthogonal, to the second direction and is contained on a second plane disposed orthogonal, or substantially orthogonal, to the first plane. The fourth fan disposed such that the thrust formed by the fourth fan is disposed in a fourth direction that is contained on the second plane and disposed opposite, or substantially opposite, the third direction.

Figure 25:
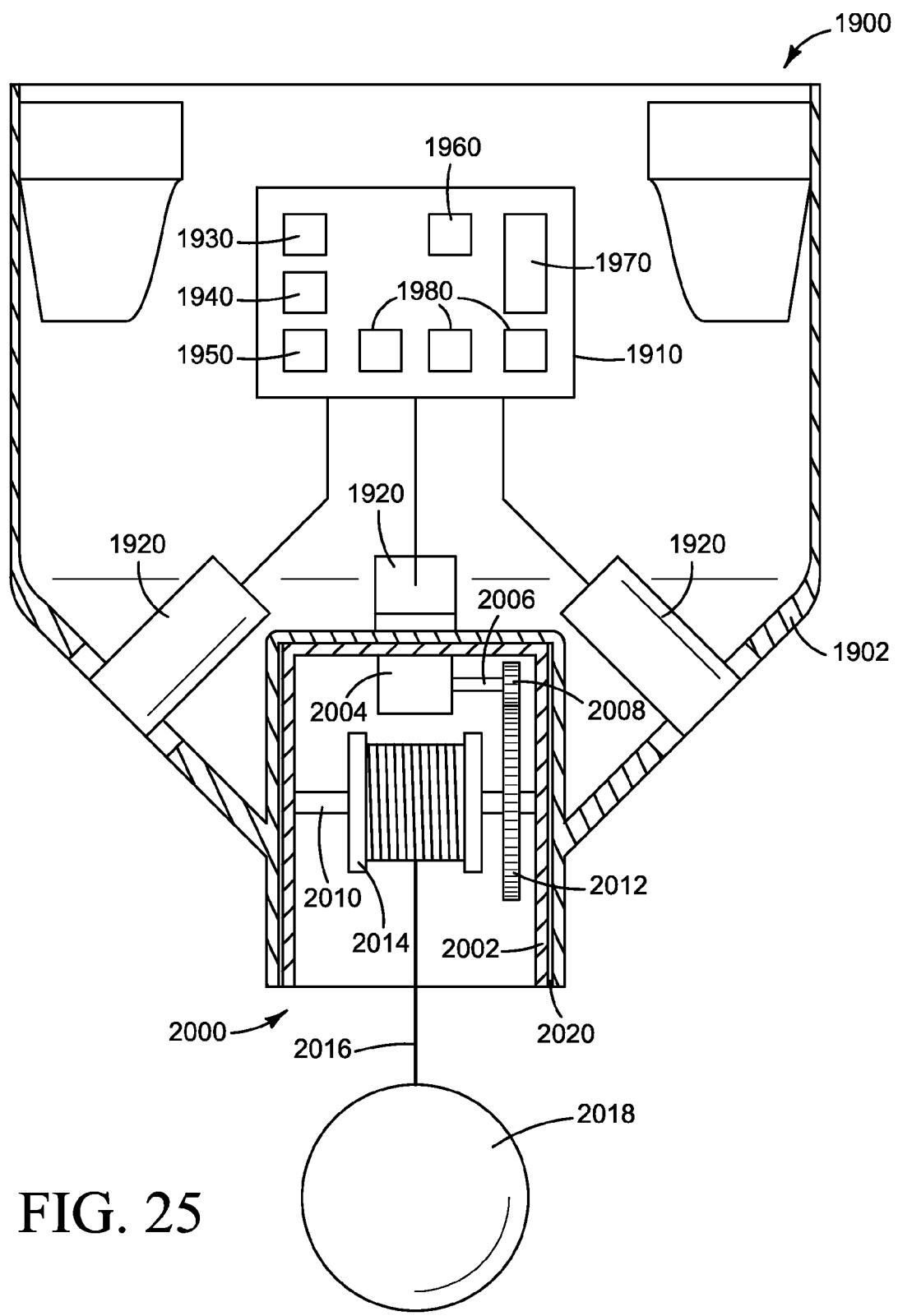
FIG. 25 is a cross sectional view of the instrument case illustrated in FIG. 16 free of the lighter-than-air system.

FIG. 25 illustrates the instrument case 1900 free of the lighter-than-air system 1400. Instrument case 1900 is similar to instrument case 200 illustrated and described with respect to FIG. 3, except as described below. Reference numbers in FIG. 20 refer to the same structural element or feature referenced by the same number in FIG. 3, offset by 1700. Thus, instrument case 1900 comprises a housing 1902 that houses a circuit board 1910, one or more observation devices 1920, one or more sensing devices 1930, one or more location devices 1940, one or more computational devices 1950, one or more communication devices 1960, one or more storage devices 1970, and/or one or more energy storage devices 1980.

In the illustrated embodiment of FIGS. 16 through 25, instrument case 1900 includes an anchor module 2000 that is attached to housing 1902. Anchor module 2000 comprises a housing 2002, servo 2004, elongate member 2006, first gear 2008, second elongate member 2010, second gear 2012, spool 2014, wire member 2016, and anchor 2018. Alternatively, when anchor module 2000 is not included, instrument case 1900 can include a cap that is attached to the opening of cavity defined by housing 1902.

Housing 2002 defines a cavity 2020 and is adapted to be attached to housing 1902. Any suitable method of attachment between a housing and anchor module is considered suitable, and skilled artisans will be able to select a suitable method of attachment according to a particular embodiment based on various considerations, including the materials forming an instrument case housing and an anchor module housing. Example methods of attachment considered suitable include, but are not limited to, releasable attachments (e.g., friction fit, snap fit), fixed attachments (e.g., adhesive), and any other method of attachment considered suitable for a particular application. Alternatively, the features and components described as disposed and/or including in an anchor module can be included within and/or disposed within an instrument case housing or an anchor module can be an integrated component of an instrument case.

Servo 2004 is in communication with one or more devices housed within instrument case 1900 (e.g., using a signal carrier, wirelessly). Elongate member 2006 and first gear 2008 are each operatively connected to servo 2004 such that upon activation of servo 2004 elongate member 2006 rotates about its lengthwise axis, which results in rotation of first gear 2008 about the lengthwise axis of elongate member 2006. Servo 2004 is adapted to move between a static configuration and either a first dynamic configuration in which servo 2004 rotates elongate member 2006 about its lengthwise axis in a first direction or a second dynamic configuration in which servo 2004 rotates elongate member 2006 about its lengthwise axis in a second direction opposite the first direction.

Second elongate member 2010 is rotatably attached to housing 2002. Second gear 2012 and spool 2014 are each attached to second elongate member 2010. Wire member 2016 has a first end attached to spool 2014 and a second end attached to anchor 2018. Second gear 2012 is adapted to have a structural configuration that compliments the structural configuration of first gear 2008 and is adapted to interact with first gear 2008 such that movement of servo 2004 between the first configuration, second configuration, and third configuration, results in movement of the second elongate member 2010, second gear 2012, spool 2014, wire member 2016, and anchor 2018. Thus, a mechanism for retrieving and releasing anchor 2018 is described.

While a particular structural arrangement has been illustrated and described as providing a mechanism for retrieving and releasing an anchor, any suitable structural arrangement is considered suitable. Skilled artisans will be able to select a suitable structural arrangement to retrieve and release an anchor according to a particular embodiment based on various considerations, including the structural arrangement of an instrument case.

Wire member 2016 can have any suitable length and be formed of any suitable material, and skilled artisans will be able to select a suitable length and material to form a wire member according to a particular embodiment based on various considerations, including the desired hovering height of a lighter-than-air system when a portion of the lighter-than-air system is in contact with a surface. Example lengths for a wire member considered suitable include, but are not limited to, lengths greater than 50 feet (15.24 meters), lengths less than 50 feet (15.24 meters), lengths between about 1 foot (0.3048) to about 50 feet (15.24 meters), lengths between about 10 feet (3.048 meters) and about 20 feet (6.096 meters), and any other length considered suitable for a particular application. Example materials considered suitable to form a wire member include, but are not limited to, metals, polymers, nylon, polyvinyl chloride (PVC), rope, urethane, polyethylene (e.g., Spectra® fiber), aircraft cable, and any other material considered suitable for a particular application.

Anchor 2018 can have any suitable weight and structural configuration, and skilled artisans will be able to select a suitable weight and structural configuration for an anchor according to a particular embodiment based on various considerations, including the desired flight path and/or time. Example structural configurations considered suitable include, but are not limited to, geometric structural configurations, spherical structural configurations (e.g., tennis ball), rectangular structural configurations, fluke structural configurations, and any other structural configuration considered suitable for a particular application. Example weights considered suitable for an anchor include, but are not limited to, about 1 gram to about 100 grams, about 25 grams to about 80 grams, about 50 grams to about 60 grams, and any other weight considered suitable for a particular application. It is considered advantageous for anchor 2018 to be buoyant, or formed of a buoyant material.

It is considered advantageous for the weight of wire member 2016 and/or anchor 2018 to offset, or substantially offset, the amount lift force provided by the fluid disposed within second balloon chamber 1454. Thus, when the lighter-than-air system 1400 has a total weight and is neutrally buoyant and first servo 1518 is activated and opens cap 1570, fluid stored within second balloon chamber 1454 is released and lighter-than-air system 1400 descends. In addition, servo 2004 can be activated to release wire member 2016 such that anchor 2018 descends from instrument case 1900. The downward force in this example is equal to, or substantially equal to, the weight of wire member 2016 and/or anchor 2018 less the drag of the lighter-than-air system 1400. Once anchor 2018 contacts a landing surface, its weight is subtracted from the total weight of lighter-than-air system 1400 such that neutral buoyancy of lighter-than-air system 1400 is achieved (e.g., lighter-than-air system 1400 hovers over landing surface). This is considered advantageous at least because it prevents, or substantially prevents, lighter-than-air system 1400 from contacting the landing surface and becoming damaged.

Optionally, anchor 2018 can be released from lighter-than-air system 1400 upon first valve 1510 being moved to its open configuration. This is considered advantageous at least because it provides a mechanism for preventing, or substantially preventing, damage to lighter-than-air system 1400 upon descent. Optionally, if descent of lighter-than-air system 1400 is activated due to the lighter-than-air system 1400 not receiving a signal from a user and/or ground control software, as described herein, first servo 1518 and servo 2004 can be activated separately, or together, such that first valve 1510 is moved to its open configuration and/or anchor 2018 descends from instrument case 1900.

As described herein, any of the servos and/or valves can be activated by a user, ground control software, and/or on-board software.

Figure 26:
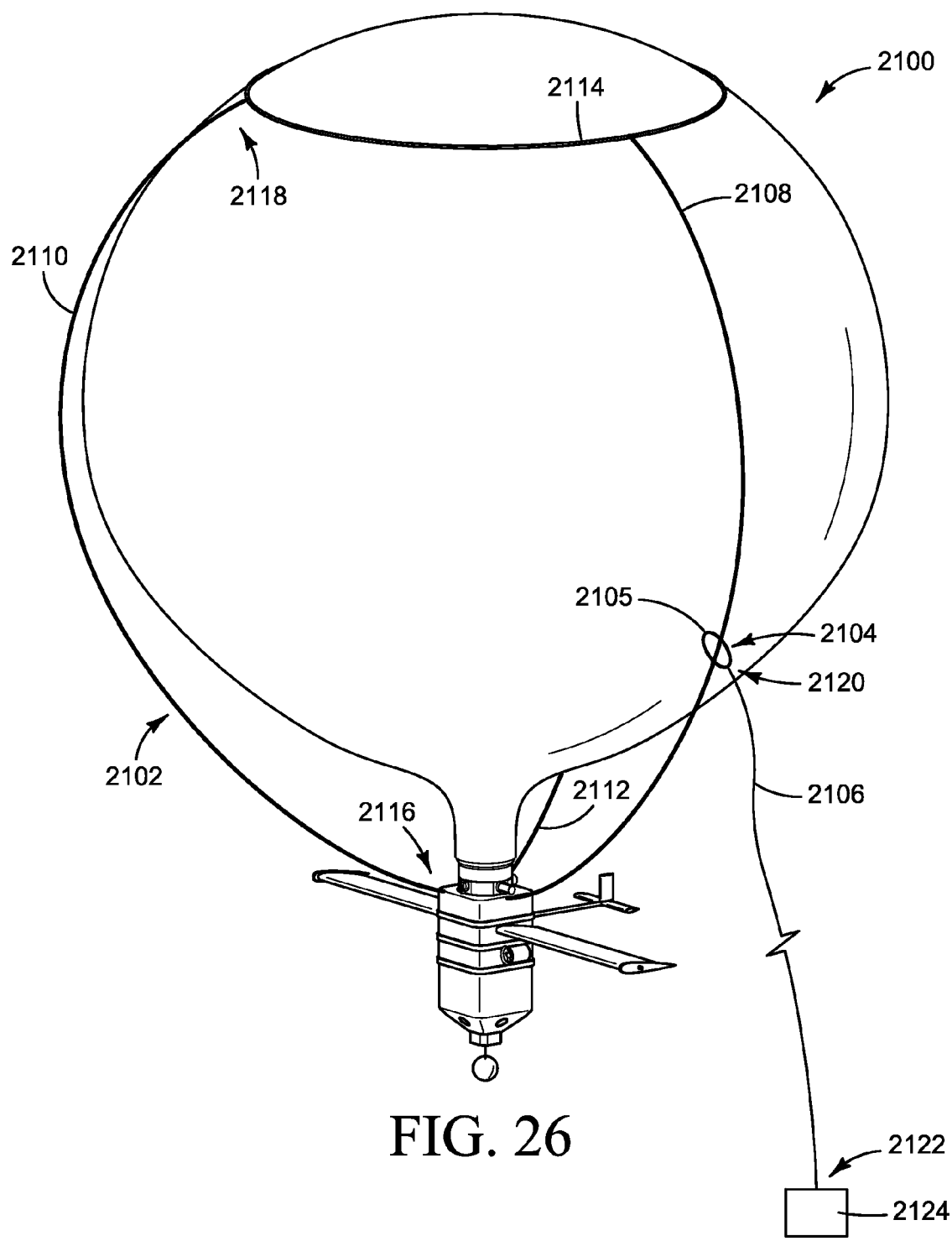
FIG. 26 is a perspective view of another exemplary lighter-than-air system.

FIG. 26 illustrates another exemplary lighter-than-air system 2100, which is similar to lighter-than-air system 1400, except as described. In the illustrated embodiment, lighter-than-air system 2100 includes a frame 2102, connecting member 2104, and a tether 2106.

Frame 2102 comprises a first support member 2108, second support member 2110, third support member 2112, and a ring member 2114. Each of the first support member 2108, second support member 2110, and third support member 2112 has a first end 2116 attached to thruster 1500 and a second end 2118 attached to ring member 2114. Ring member 2114 defines an outer diameter that is less than the inflated diameter of first balloon 1440. Each support member 2108, 2110, 2112 defines a curve along its length between its first end 2116 and second end 2118 such that frame 2102 is configured to contain airship 1402 when it is in the inflated configuration.

While the first end 2116 of each support member 2108, 2110, and 2112 has been illustrated and described as attached to thruster 1500, the first end of a support member can be attached to any suitable portion of a lighter-than-air system using any suitable method of attachment. Skilled artisans will be able to select a suitable portion of a lighter-than-air system to attach the first end of a support member and a suitable method of attachment according to a particular embodiment based on various considerations, including the materials forming the lighter-than-air system. Example portions of a lighter-than-air system considered suitable to attach the first end of a support member include, but are not limited to, airship 1400, thruster 1500, airfoil module 1700, thrust module 1800, instrument case 1900, and any other portion of a lighter-than-air system considered suitable for a particular application. Example methods of attachment considered suitable between a support member and a portion of a lighter-than-air system include, but are not limited to, releasable attachments (e.g., friction fit, snap fit), fixed attachments (e.g., adhesive), and any other method of attachment considered suitable for a particular application.

While frame 2102 has been illustrated and described as comprising a first support member 2108, second support member 2110, third support member 2112, and a ring member 2114, a frame can have any suitable structural arrangement. Skilled artisans will be able to select a suitable structural arrangement for a frame according to a particular embodiment based on various considerations, including the structural configuration of an airship. For example, a frame can include a first support member, a second support member, and a third support member and omit the inclusion of a ring member. In addition, a frame can include any suitable number of support members and/or ring members. Example number of support members and/or ring members considered suitable to include with a frame include, but are not limited to, one, at least one, two, a plurality, three, four, five, six, and any other number considered suitable for a particular application.

Connecting member 2104 can comprise any suitable structure capable of providing a movable attachment between frame 2102 and tether 2106, and skilled artisans will be able to select a suitable structure according to a particular embodiment based on various considerations, including the material forming the frame. Example structures considered suitable include, but are not limited to, structures that define an aperture through which a portion of a support member is disposed, ring members, and any other structure considered suitable for a particular application.

In the illustrated embodiment, connecting member 2104 is a ring member 2105 disposed about first support member 2108.

Frame 2102 and connecting member 2104 can be formed using any suitable method of manufacture and using any suitable material, and skilled artisans will be able to select a suitable method of manufacture and material for a frame and/or connecting member according to a particular embodiment based on various considerations, including the material forming an airship. Example materials considered suitable include, metals, polymers, and any other material considered suitable for a particular application.

Tether 2106 has a tether first end 2120 attached to ring member 2105 and a tether second end 2122 attached to a ground retrieval device 2124.

The inclusion of frame 2102, connecting member 2104, and tether 2106 is considered advantageous at least because movement of connecting member 2104 along the length of first support member 2108 provides a mechanism for countering horizontal forces that may be applied on lighter-than-air system 1400 during flight, which allows instrument case 1900 to be positioned plumb, or substantially plumb, with the surface.

Figure 27:
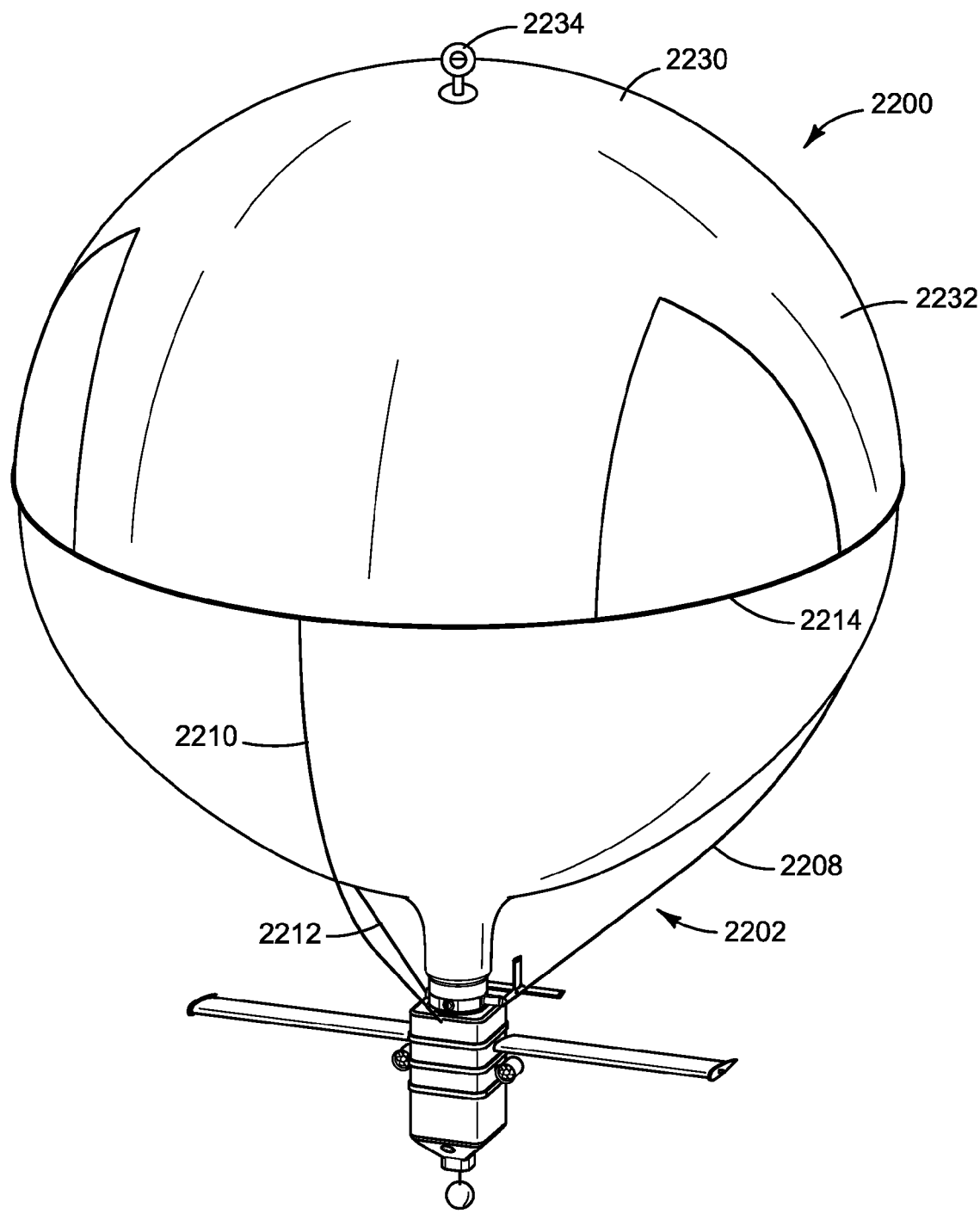
FIG. 27 is a perspective view of another exemplary lighter-than-air system.

FIG. 27 illustrates another exemplary lighter-than-air system 2200, which is similar to lighter-than-air system 2100, except as described. In the illustrated embodiment, lighter-than-air system 2200 includes a frame 2202, omits the inclusion of a connecting member (e.g., connecting member 2104) and tether (e.g., tether 2106), and includes a parachute 2230. With respect to frame 2202, reference numbers in FIG. 22 refer to the same structural element or feature referenced by the same number in FIG. 21, offset by 100. Thus, frame 2202 comprises a first support member 2208, second support member 2210, third support member 2212, and a ring member 2214.

In the illustrated embodiment of FIGS. 26 and 27, ring member 2214 defines an outer diameter that is equal to, substantially equal to, or greater than, than the inflated diameter of first balloon 1440. Parachute 2230 is attached to ring member 2214 and covers the entirety, or a portion of, the upper hemisphere of first balloon 1440. Parachute 2230 comprises a material 2232 and a ring member 2234 disposed at the apex of the parachute 2230 when first balloon 1440 is in the inflated configuration. Parachute 2230 is configured to fill with fluid (e.g., air) when first balloon 1440 and/or second balloon 1450 are moved to a deflated configuration and decreases the rate at which lighter-than-air system 1400 descends relative to systems that do not include a parachute.

Parachute 2230 can be formed of any suitable material and have any suitable structural arrangement, and skilled artisans will be able to select a suitable material to form a parachute and suitable structural arrangement for a parachute according to a particular embodiment based on various considerations, including the total weight of a lighter-than-air system.

Optionally, the outer surface of parachute 2230 can be composed of, or include, photovoltaic materials that are operatively connected to one or more devices housed within instrument case 1900 (e.g., energy storage devices 280). This is considered advantageous to provide a mechanism for charging the one or more devices housed within the instrument case (e.g., energy storage devices (e.g., 280), which enables lighter-than-air system 1400 to remain in flight for longer periods of time relative to systems that do not include photovoltaic materials. Any suitable photovoltaic material can be included on a parachute, and skilled artisans will be able to select a suitable photovoltaic material according to a particular embodiment based on various considerations, including the material forming the parachute. Example photovoltaic materials considered suitable to compose a parachute, or to include on a parachute, include, but are not limited to, rigid photovoltaic modules, flexible photovoltaic modules, and any other material considered suitable for a particular application.

While parachute 2230 has been illustrated and described as attached to ring member 2214, a parachute can be attached to any suitable portion of a lighter-than-air system. Skilled artisans will be able to select a suitable portion of a lighter-than-air system to attach a parachute according to a particular embodiment based on various considerations, including the desired amount of drag intended to be provided by the parachute during descent. For example, a parachute can be attached to one or more of a ring member, support member, airship, thruster, airfoil module, thruster module, instrument case, and any other portion of a lighter-than-air system considered suitable for a particular application.

Figure 28:
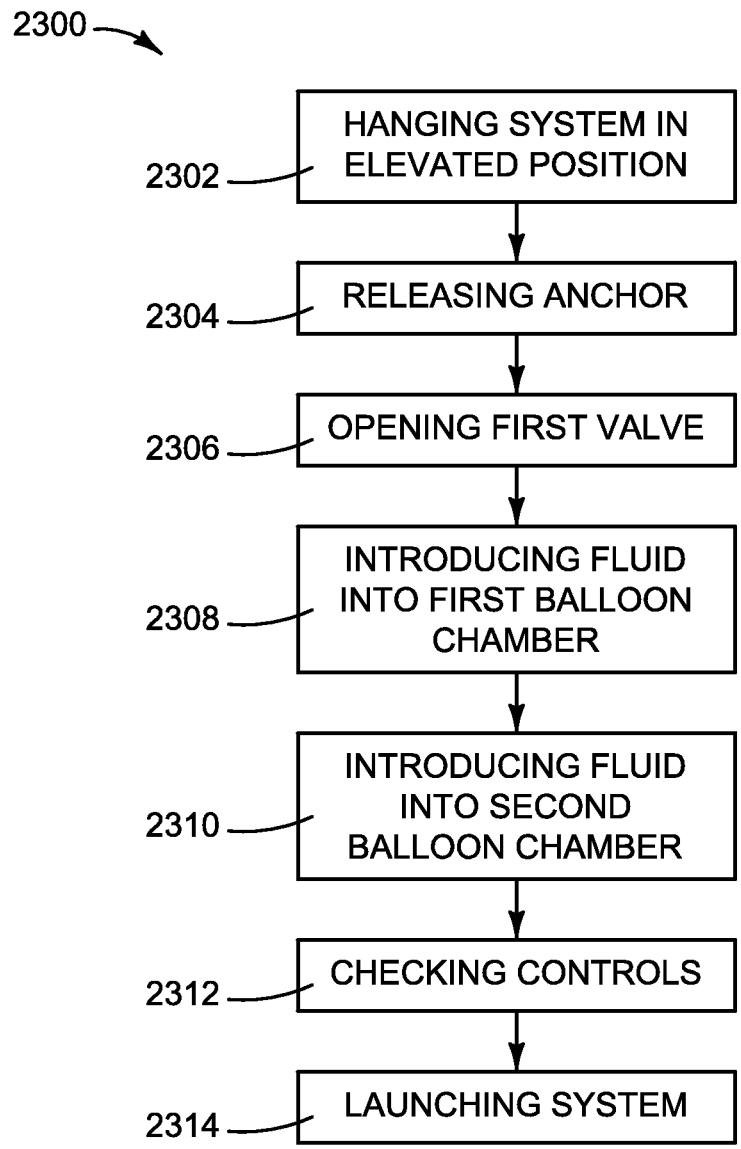
FIG. 28 is a flow chart representation of another exemplary method of obtaining one or more aerial images using a lighter-than-air system.

FIG. 28 is another exemplary method 2300 of obtaining one or more aerial images using a lighter-than-air system (e.g., system 100, system 800, system 900, system 1100, system 1400, system 2100, system 2200). While method 2300 is described as being accomplished using lighter-than-air system 2200, the steps, alternative steps, and optional steps described herein can be accomplished using any suitable lighter-than-air system.

A step 2302 comprises hanging the lighter-than-air system in an elevated position. Another step 2304 comprises releasing the anchor such that anchor is contacting the surface below the lighter-than-air system and slack is provided in wire member between anchor and the instrument case. Another step 2306 comprises opening the first valve such that the second balloon chamber can be emptied, or substantially emptied. Another step 2308 comprises introducing fluid into the first balloon chamber until wire member becomes taut, or substantially taut. Another step 2310 comprises introducing fluid into the second balloon chamber until the anchor is elevated above the surface below the lighter-than-air system. Another step 2312 comprises checking controls of the lighter-than-air system. Another step 2314 comprises launching the lighter-than-air system.

Step 2302 can be accomplished by hanging the lighter-than-air system by ring member 2234 such that it is disposed in an elevated position and free of contact from a surface disposed below the lighter-than-air system.

Step 2304 can be accomplished by activating servo 2004 such that anchor 2018 descends from instrument case 1900 and contacts the surface below the lighter-than-air system 2200.

Step 2306 can be accomplished by moving first servo 1518 to its second position such that any fluid disposed within second balloon chamber 1454 can be released to the environment exterior to the second balloon chamber 1454.

Step 2308 can be accomplished by passing fluid through second valve 1512 and/or fourth valve 1516 and into first balloon chamber 1444.

Step 2310 can be accomplished by passing a fluid through first valve 1510 and into second balloon chamber 1454.

In addition, or alternative, to accomplishing step 2304, step 2306, step 2308, and/or step 2310, an optional step that can be accomplished subsequent to completing step 2308 and step 2310 and achieving neutral buoyancy of the lighter-than-air system comprises adding a weight having a known value (e.g., 20 grams) to a portion of the lighter-than-air system (e.g., instrument case). Another optional step comprises adding fluid to the chamber defined by the first balloon and/or second balloon until neutral buoyancy of the lighter-than-air system is achieved. Another optional step comprises removing the weight from the lighter-than-air system. These steps are considered advantageous at least because they provide a mechanism for determining the lift force applied to the lighter-than-air system during ascent. Another optional step comprises completing a timed opening of a valve in communication with the chamber defined by the first balloon and/or second balloon when a desired altitude has been reached such that the amount of fluid released from the chamber is equal to, or substantially equal to, the amount of fluid introduced into the chamber to offset the weight. Each of these steps can be accomplished by a user, ground control software, and/or on-board software.

Step 2312 can be accomplished by a user interacting with ground control software and/or on-board software to review one or more of lighter-than-air system's 2200 components and its functionality. For example, a user can activate one or more servos or other components to determine if they are functioning as desired.

Step 2314 can be accomplished by removing ring member 2234 from its elevated position.

An optional step comprises attaching a tether to the system such that tethered flight can be achieved. This can be accomplished by attaching tether to frame 2202, or other portion of lighter-than-air system 1400. Another optional step comprises releasing a portion of the length of the tether such that a desired altitude and/or position can be accomplished. Launching the lighter-than-air system using a tether is considered advantageous at least because it provides a mechanism for trimming the system during ascent without deflating the first balloon or second balloon, releasing any material stored within container chamber, or without the need for using a thruster. Another optional step comprises releasing the tether such that the lighter-than-air system can complete a tether free flight.

While various steps, alternative steps, and optional steps have been described above with respect to obtaining aerial images, these steps, alternative steps, and optional steps can be included in, accomplished concurrently with, and/or accomplished in the alternative to, the methodologies, steps, alternative steps, and/or optional steps described above with respect to method 450 and/or method 600.

Any of the herein described elements and/or components can be provided in a kit. For example, a kit can comprise any suitable airship according to an embodiment, such as airship 102, airship 802, airship 902, airship 1102, and/or airship 1402; one or more first balloons 1440, and/or one or more second balloons 1450; an instrument case according to an embodiment, such as instrument case 200, instrument case 890, instrument case 990, instrument case 1190, and/or instrument case 1900; a thruster according to an embodiment, such as thruster 700, thruster 870, thruster 970, thruster 1200, thruster 1300, and/or thruster 1500; a valve according to an embodiment, such as valve 144 (e.g., bi-directional valve), valve 146 (e.g., one way flow valve), valve 340, valve 362, first valve 1510, second valve 1512, third valve 1514, and/or fourth valve 1516; a container according to an embodiment, such as container 1508; one or more lengths of tether; one or more ground retrieval devices, such as ground retrieval device 862, ground retrieval device 962, ground retrieval device 1194, and/or ground retrieval device 2124; an anchor, such as anchor 1195, and/or anchor 2018; one or more modules, such as airfoil module 1700, thrust module 1800, and/or anchor module 2000; one or more sheets that acts as sails, such as sheets 908; one or more frames according to an embodiment, such as frame 2102, and/or frame 2202; one or more connecting members, such as connecting member 2104, and/or connecting member 2105; one or more parachutes, such as parachute 2230; a pair of cloth gloves; and/or instructions for use. One or more of the above described devices, elements, and/or components, and/or any of the herein described devices, elements, and/or components can be provided in a kit.

Any of the systems described herein can optionally include one or more devices for providing deflation and/or detachment of one or more of the balloons. For example, a servo that comprises a blade, pin, or other object can be activated to puncture the wall of one or more balloons to deflate the balloon can be attached to a portion of any balloon and be in communication with one or more of the devices within the instrument case. Upon receipt of a signal, the servo can be activated to puncture the wall of a balloon to cause deflation. Alternatively, a user can deflate the balloon using a source from the ground (e.g., air rifle).

In a further alternative, should retrieval of a lighter-than-air system be desired, a tether having one end attached to a balloon separate from the lighter-than-air system and another end attached to a retrieval device can be utilized to retrieve the lighter-than-air system. In this alternative, the balloon and/or tether comprise one or more magnets attached to a portion thereof and the lighter-than-air system comprises one or more magnets attached to a portion thereof. To retrieve the system the separate balloon/tether are launched at, or near, the coordinates of the lighter-than-air system desired to be retrieved, and the one or more magnets attached to a portion thereof attaches to one or more of the one or more magnets attached to a portion of the lighter-than-air system, thereby allowing for the retrieval device.

The use of an ascent tether attached to a portion of the lighter-than-air system (e.g., retrieval connector 108, a portion of the instrument case) by a mechanical fastener having a first closed position and a second open position can be used during ascent of the system. When a desired altitude is reached, the mechanical fastener, which is in communication with one or more devices within the instrument case, is moved from the first closed position to the second open position to release the lighter-than-air system from the tether. In a further example, the instrument case can be attached to the system using a mechanical fastener having a first closed position and a second open position. The instrument case can be attached to the airship by a length of tether. When desired, the mechanical fastener, which is in communication with one or more devices within the instrument case, is moved from the first closed position to the second open position to release the instrument case from attachment to the airship and allows for the instrument case to be suspended below the airship the length of the tether. This advantageously adds stability to the landing process and allows for an easier target to grasp and guide the landing of the system.

The forgoing detailed description provides exemplary embodiments of the invention and includes the best mode for practicing the invention. The description and illustration of these embodiments is intended only to provide examples of the invention, and not to limit the scope of the invention, or its protection, in any manner.

What is claimed is:

1. A method for acquiring one or more aerial images using at least one lighter-than-air system and ground control software, the ground control software stored on a computer readable medium, the method comprising the steps of:
   determining a location to obtain one or more aerial images to be acquired by a first lighter-than-air system, the first lighter-than-air system comprising:
      an airship comprising a first balloon and a second balloon, the first balloon having a wall defining a first balloon chamber, the first balloon moveable between a deflated configuration and an inflated configuration, the second balloon disposed within the first balloon chamber and having a wall defining a second balloon chamber, the second balloon moveable between a deflated configuration and an inflated configuration;
      an instrument case attached to the airship;
      a communication device stored within the instrument case, the communication device in communication with a network; and
      an observation device stored within the instrument case, the observation device capable of obtaining the one or more aerial images;
   inputting the determined location into said ground control software;
   introducing a first volume of fluid into the first balloon chamber;
   introducing a second volume of fluid into the second balloon chamber; and
   launching the first lighter-than-air system.

2. The method of claim 1, wherein said ground control software is configured to calculate data relating to the first volume of fluid to introduce into the first balloon chamber, and data relating to the second volume of fluid to introduce into the second balloon chamber.

3. The method of claim 1, wherein the airship further comprises a valve in communication with the second balloon chamber and the communication device, the valve configured to have a first configuration and a second configuration, in the first configuration the valve holds fluid within the second balloon chamber, in the second configuration the valve releases fluid held within the second balloon chamber.

4. The method of claim 3, further comprising the step of moving the valve between the first configuration and the second configuration via a signal received from the communication device.

5. The method of claim 1, wherein the first lighter-than-air system further comprises a sensing device capable of detecting atmospheric pressure conditions, the sensing device in communication with the communication device.

6. The method of claim 5, further comprising the step of releasing a portion of the fluid contained within the second balloon chamber based on data received from the sensing device.

7. The method of claim 1, further comprising the step of obtaining the one or more aerial images using the observation device.

8. The method of claim 7, wherein the observation device is in communication with the communication device;
   said method further comprising the step of transmitting the one or more aerial images to the network.

9. The method of claim 1, further comprising the step of launching a second lighter-than-air system, the second lighter-than-air system comprising a second communication device, the second lighter-than-air system in communication with said ground control software, the second communication device capable of transmitting information to said ground control software and receiving information from said ground control software.

10. The method of claim 9, wherein the second lighter-than-air system is launched from a launch site; and
wherein the launch site is based on data received by the first lighter-than-air system.

11. A method for acquiring one or more aerial images using at least one lighter-than-air system and ground control software, the ground control software stored on a computer readable medium, the method comprising the steps of:
determining a location to obtain one or more aerial images to be acquired by a first lighter-than-air system, the first lighter-than-air system comprising:
an airship comprising a first balloon and a second balloon, the first balloon having a wall defining a first balloon chamber, the first balloon moveable between a deflated configuration and an inflated configuration, the second balloon disposed within the first balloon chamber and having a wall defining a second balloon chamber, the second balloon moveable between a deflated configuration and an inflated configuration;
an instrument case attached to the airship;
a communication device stored within the instrument case, the communication device in communication with a network;
an observation device stored within the instrument case, the observation device capable of obtaining the one or more aerial images; and
a valve in communication with the second balloon chamber and the communication device, the valve configured to have a first configuration and a second configuration, in the first configuration the valve holds fluid within the second balloon chamber, in the second configuration the valve releases fluid held within the second balloon chamber;
inputting the determined location into said ground control software;
introducing the first volume of fluid into the first balloon chamber;
introducing the second volume of fluid into the second balloon chamber; and
launching the first lighter-than-air system.

12. The method of claim 11, further comprising the step of moving the valve between the first configuration and the second configuration via a signal received from the communication device.

13. The method of claim 11, wherein said ground control software is configured to calculate data relating to the first volume of fluid to introduce into the first balloon chamber, and data relating to the second volume of fluid to introduce into the second balloon chamber.

14. The method of claim 11, wherein the first lighter-than-air system further comprises a sensing device capable of detecting atmospheric pressure conditions, the sensing device in communication with the communication device.

15. The method of claim 14, further comprising the step of releasing a portion of the fluid contained within the second balloon chamber based on data received from the sensing device.

16. The method of claim 11, further comprising the step of obtaining one or more aerial images using the observation device.

17. The method of claim 16, wherein the observation device is in communication with the communication device; said method further comprising the step of transmitting the one or more aerial images to the network.

18. The method of claim 11, further comprising the step of launching a second lighter-than-air system, the second lighter-than-air system comprising a second communication device, the second lighter-than-air system in communication with said ground control software, the second communication device capable of transmitting information to said ground control software and receiving information from said ground control software.

19. The method of claim 18, wherein the second lighter-than-air system is launched from a launch site; and
wherein the launch site is based on data received by the first lighter-than-air system.

20. A method for acquiring one or more aerial images using at least one lighter-than-air system and ground control software, the ground control software stored on a computer readable medium, the method comprising the steps of:
determining a location to obtain one or more aerial images to be acquired by a first lighter-than-air system, the first lighter-than-air system comprising:
an airship comprising a first balloon and a second balloon, the first balloon having a wall defining a first balloon chamber, the first balloon moveable between a deflated configuration and an inflated configuration, the second balloon disposed within the first balloon chamber and having a wall defining a second balloon chamber, the second balloon moveable between a deflated configuration and an inflated configuration;
an instrument case attached to the airship;
a communication device stored within the instrument case, the communication device in communication with a network;
an observation device stored within the instrument case, the observation device capable of obtaining the one or more aerial images; and
a valve in communication with the second balloon chamber and the communication device, the valve configured to have a first configuration and a second configuration, in the first configuration the valve holds fluid within the second balloon chamber, in the second configuration the valve releases fluid held within the second balloon chamber;
inputting the determined location into said ground control software;
introducing the first volume of fluid into the first balloon chamber;
introducing the second volume of fluid into the second balloon chamber;
launching the first lighter-than-air system; and
moving the valve between the first configuration and the second configuration via a signal received from the communication device.

* * * * *